(12) United States Patent
Ishiyama et al.

(10) Patent No.: US 7,899,418 B2
(45) Date of Patent: Mar. 1, 2011

(54) MOBILE DEVICE AND WIRELESS COMMUNICATION APPARATUS

(75) Inventors: Eiji Ishiyama, Asaka (JP); Tsuneo Sato, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1004 days.

(21) Appl. No.: 11/708,643

(22) Filed: Feb. 21, 2007

(65) Prior Publication Data

US 2007/0196099 A1 Aug. 23, 2007

(30) Foreign Application Priority Data

Feb. 22, 2006 (JP) ................................ 2006-045311
Mar. 27, 2006 (JP) ................................ 2006-084652

(51) Int. Cl.
*H04B 1/04* (2006.01)

(52) U.S. Cl. ................... 455/127.1; 455/572; 455/127.5; 455/142.2; 455/343.2; 455/574; 370/311; 396/301

(58) Field of Classification Search .................. 455/572, 455/127.1, 127.5, 412.2, 343.2, 574; 370/311; 396/301

See application file for complete search history.

(56) References Cited

U.S. PATENT DOCUMENTS

| 4,933,963 | A * | 6/1990 | Sato et al. ..................... 704/224 |
| 5,859,617 | A * | 1/1999 | Fujikawa ....................... 343/702 |
| 6,130,717 | A * | 10/2000 | Arai et al. ...................... 348/360 |
| 6,912,210 | B1 * | 6/2005 | Uchiba et al. .................. 370/300 |
| 2004/0229598 | A1 * | 11/2004 | Tajima et al. ............... 455/414.1 |
| 2004/0235537 | A1 * | 11/2004 | Koga et al. .................... 455/574 |
| 2008/0002045 | A1 * | 1/2008 | Wallach ........................ 348/311 |
| 2008/0207129 | A1 * | 8/2008 | Page et al. ..................... 455/41.3 |
| 2009/0170519 | A1 * | 7/2009 | Wilhoite et al. ............... 455/436 |
| 2009/0197584 | A1 * | 8/2009 | Snow et al. .................... 455/418 |

FOREIGN PATENT DOCUMENTS

| JP | 02-283173 A | 11/1990 |
| JP | 4-294332 A | 10/1992 |
| JP | 10-133786 A | 5/1998 |
| JP | 10-209906 A | 8/1998 |
| JP | 2000-232449 A | 8/2000 |
| JP | 2001-128087 A | 5/2001 |
| JP | 2001-352477 A | 12/2001 |
| JP | 2003-09232 A | 1/2003 |
| JP | 2003-101739 A | 4/2003 |
| JP | 2003-196477 A | 7/2003 |
| JP | 2004-312619 A | 11/2004 |

OTHER PUBLICATIONS

Japanese Notification of Reasons for Refusal, dated Jun. 15, 2010 and issued in corresponding Japanese Patent Application No. 2006-045311. Japanese Decision to Dismiss the Amendment dated Sep. 7, 2010 and issued in corresponding Japanese Patent Application No. 2006-045311.

* cited by examiner

*Primary Examiner* — Patrick N Edouard
*Assistant Examiner* — Justin Y Lee
(74) *Attorney, Agent, or Firm* — Birch, Stewart, Kolasch & Birch, LLP

(57) ABSTRACT

A mobile device is equipped with a transmitting function to transmit data. When a power switch is turned off during data transmission, a transition is made to a transmission-during-power-off mode that continues data transmission. The transition to the transmission-during-power-off mode is performed when an inquiry is made on a screen as to whether transmission will be performed and "continue" is subsequently selected. In this mode, even when the mobile device with the power switch being turned off is carried around, data transmission is continued and data is recorded into a storage section of a home personal computer.

17 Claims, 35 Drawing Sheets

MEMORY SPACE CONFIGURATION

MEMORY SPACE CONFIGURATION

MOBILE DEVICE AND WIRELESS COMMUNICATION APPARATUS

BACKGROUND OF THE INVENTION

1. Field of the Invention

The present invention relates to a mobile device having a transmitting section that transmits data, and a wireless communication apparatus detachably mounted to a mobile device having no transmitting section when necessary.

2. Description of the Related Art

Many electrical devices such as mobile devices are provided with energy-saving designs in order to suppress power consumption within the devices, regardless of whether their power source is a commercial power source or a battery. Therefore, such a device is arranged so that power supply is immediately shut down in response to an off-operation of a power switch to prevent unnecessary power consumption within the device.

However, in some cases, an immediate cutoff of the power supply after an off-operation of the power switch may cause a malfunction in a device due to an interruption of processing currently being executed in the device.

In consideration of the above, Japanese Patent Laid-Open No. H10-133786, Japanese Patent Laid-Open No. 2001-128087 and Japanese Patent Laid-Open No. 2003-101739 propose a technique for allowing processing to continue without immediately cutting off a power supply, and cutting off the power supply only after the processing is completed even when an off-operation of the power switch is performed while the processing is being executed.

Meanwhile, some recent mobile devices are equipped with wireless communication apparatuses that allow outward transmission of data retained in the devices. In addition, some devices are arranged so that, even when a wireless communication apparatus is not deployed on a main body of a mobile device, a wireless communication apparatus may be detachably mounted thereon to enable outward transmission of data or reception of incoming data (for instance, refer to Japanese Patent Laid-Open No. 2001-352477). Among users of mobile devices equipped with such a wireless communication apparatus, some may desire to utilize the wireless communication apparatus to create backup data in their home personal computer or the like.

However, when such backup involves a significant amount of data, transmission of data may require time. Thus, some users may wrongly guess that transmission is completed and may turn off the power switch during transmission, while others may forget to turn off the power switch and may carry the device around without realizing that the power is still on. As a result, communication is terminated before backup data is stored in the home personal computer, or battery power is wastefully consumed while the device is being carried around.

SUMMARY OF THE INVENTION

The present invention has been made in view of the above circumstances and provides a mobile device equipped with a transmission function to outwardly transmit data and a wireless communication apparatus that is detachably mounted on a mobile device not provided with a communication apparatus transmitting and receiving data, which are capable of suppressing wasteful power consumption and reliably storing backup data to an external storage section without having a user be aware of the data being stored.

A first mobile device according to the present invention is a mobile device having a transmitting section that transmits data, the device further having:

a power operating section that performs power-on/off operations; and a power supply control section that supplies power to each section of the mobile device, including the transmitting section, which are activated when power is supplied, in response to a power-on operation by the power operating section, and cuts off supply of power to each section in response to a power-off operation by the power operating section, wherein when data is being transmitted by the transmitting section, the power supply control section causes the transmitting section to continue data transmission by continuously supplying power even when a power-off operation is received from the power operating section, and cuts off the power supply to the transmitting section upon completion of data transmission by the transmitting section.

According to the first mobile device of the present invention, when data is being transmitted by the transmitting section, power supply to the transmitting section is continued even when a power-off operation of the power operating section is received by the power supply control section, and power supply to the transmitting section is cutoff upon completion of data transmission by the transmitting section.

In other words, even when a power-off operation of the power control section is performed, power supply to the transmitting section will be continued until data transmission by the transmitting section is completed, and the power supply will be cut off after, for instance, backup data is stored in a storage section in a personal computer at the transmission destination-side.

This eliminates cases in which backup data is not stored in a personal computer when a power-off operation is performed during transmission. In addition, since power supply will be cut off after completion of transmission, power will no longer be wastefully consumed.

As described above, in a mobile device equipped with a transmitting function to transmit data, a mobile device may be realized that suppresses wasteful power consumption and reliably stores backup data to an external storage section without having a user be aware of the data being stored.

A second mobile device according to the present invention is a mobile device having a transmitting section that transmits data, the device further having:

a power operating section that performs power-on/off operations; and a power supply control section that supplies power to each section of the mobile device, including the transmitting section, which are activated when power is supplied, in response to a power-on operation by the power operating section, and cuts off supply of power to each section in response to a power-off operation by the power operating section, wherein the transmitting section commences data transmission in response to a power-off operation of the power operating section, and the power supply control section causes the transmitting section to perform data transmission by supplying power thereto when receiving a power-off operation from the power operating section, and cuts off the power supply to the transmitting section upon completion of data transmission by the transmitting section.

According to the second mobile device of the present invention, power supply to the transmitting section is performed and data transmission by the transmitting section commences when a power-off operation of the power operating section is received by the power control section, and the power supply to the transmitting section is cut off upon completion of the data transmission.

With the second mobile device, since a power-off operation acts as an instruction for commencing transmission, a user will no longer be bothered to switch to transmitting mode during power-on to transmit data.

As a result, after performing a power-on operation and using the mobile device, data transmission is commenced upon a power-off operation, and backup data is stored in, for instance, a storage section in a home personal computer without having the user be aware of that fact. In addition, since power supply to the transmitting section is automatically cut off by the power supply control section after completion of transmission, power will no longer be wastefully consumed.

As described above, in a mobile device equipped with a transmitting function to transmit data, a mobile device may be realized that suppresses wasteful power consumption and reliably stores backup data to an external storage apparatus without having a user be aware of the data being stored.

For the first mobile device, in the event that data transmission by the transmitting section is not performed when a power-off operation of the power operating section is received by the power supply control section, power supply to all sections including the transmitting section is preferably cut off.

In addition, for the second mobile device, in the event that there are no unsent data when a power-off operation of the power operating section is received by the power supply control section, cutoff of the power supply to the transmitting section is preferably maintained.

Furthermore, the first and second mobile devices are each preferably provided with: a state transition notification section that notifies a user of a transition to a transmission-during-power-off mode in which the transmitting section performs data transmission after a power-off operation by the power operating section; and a transmission completion notification section that notifies a user of a completion of data transmission under the transmission-during-power-off mode in which the transmitting section performs data transmission after a power-off operation by the power operating section.

When data is transmitted after an off-operation of the power control section, since sections other than the transmitting section are inoperative, a user will have a hard time acknowledging that data is being transmitted. Therefore, with this additional feature of the invention, both a notification to the effect that transmission is performed under the transmission-during-power-off mode and a notification of the completion of the transmission will be sent in a reliable manner even after the power operating section has been turned off.

Moreover, the first and second mobile devices are each preferably provided with a transmission result notification section that detects, in response to a power-on operation of the power operating section, whether data transmission was performed by the transmitting section after the previous power-off operation of the power operating section, detects whether the data transmission is completed or not when the data transmission was performed, and notifies a user of a transmission result.

Since results of data transmission performed after power-off of the power operating section are notified by the transmission result notification section upon the power-off of the power operating section, in the event that a failure of the like occurs in the transmission, a retransmission may be performed after a power-on operation.

In the first and second mobile devices, the transmitting section preferably transmits data via wireless.

This enables the transmitting section to transmit data even from a location that is somewhat separated from the transmission destination.

In addition, the first and second mobile devices are each preferably provided with a power saving control section that performs power saving while maintaining receiver sensitivity in the transmission-during-power-off mode in which the transmitting section performs data transmission after a power-off operation of the power operating section.

Consequently, when the mobile device is in an inoperative state after receiving an off-operation of the power operating section, the power saving control section further performs power saving on the transmitting section, and data transmission is performed after power consumption is suppressed. Therefore, wasteful power consumption will be eliminated even when data is transmitted, resulting in a longer operating life of a power supply source, such as a battery, of the mobile device, and in turn achieving reduced running costs in a preferable manner.

The power saving control section may be so configured as to perform power saving either by spreading a transmitting and receiving interval of probe signals used for searching communication destinations, or by limiting frequencies used for communication.

In the first and second mobile devices, the transmitting section is preferably provided with a wireless communication antenna that is movable between a first position having a small volume of projection from a chassis of the mobile device and a second position having a large volume of projection from the chassis of the mobile device, wherein the mobile device is provided with an antenna drive section that moves the antenna to the first position in response to a transition to the transmission-during-power-off mode in which the transmitting section performs data transmission after a power-off operation of the power operating section.

This enables the antenna to be driven by the antenna drive section in response to a transition to the transmission-during-power-off mode, and the antenna will be positioned at, for instance, the first position having a small volume of projection from the chassis of the mobile device. When a mobile device is turned off, a user often holds the mobile device or places the mobile device in a pocket when walking. In such cases, there is a risk that a protruding antenna may catch on something and become damaged. This risk may be reduced by positioning the antenna at the first position.

Furthermore, since a user is aware of transmissions performed when the power operating section is operated to the power-on-side, the user may adjust the orientation and the like of the antenna at will, and the attitude of the mobile device may be arranged so that, for instance, transmission to the home of the user is performed in a preferable manner. Therefore, there is no problem with the antenna having directivity. However, if a mobile device having directivity is being carried around in the user's hand or carried around in a pocket, since a direction of a transmission destination is unclear, there is a risk that a communication state with a transmission destination that is not in the direction indicated by the directivity may deteriorate and transmission will be disabled.

In this light, when an antenna is positioned at the first position, the antenna desirably has an omni-directional communication area with a uniform gain in all directions.

In order to achieve the above, the transmitting section is preferably provided with an antenna consisting of a fixed antenna primary radiating element and a movable antenna secondary element that controls at least a directivity of communication by the antenna primary radiating element, and the mobile device is provided with an antenna drive section that moves the antenna secondary element so that the directivity of the communication by the antenna primary radiating element spreads in a direction that approximates omni-directivity, in response to a transition to the transmission-during-power-off mode in which the transmitting section performs data transmission after a power-off operation of the power operating section.

In addition, the transmitting section may also be provided with a movable antenna that is movable between a first position having a small volume of projection from the chassis of the mobile device and a second position having a large volume of projection from the chassis of the mobile device and functions as an antenna at the second position, and a fixed antenna that is fixed to the chassis of the mobile device and is either built into the chassis or has a volume of projection from the chassis that is less than the volume of projection of the first antenna at the second position, and the mobile device is provided with an antenna drive section that moves the movable antenna to the first position in response to a transition to the transmission-during-power-off mode in which the transmitting section performs data transmission after a power-off operation of the power operating section.

Thus, establishment of communication may be attempted in a wide range of directions during power-off by arranging an omni-directional antenna to be used as the fixed antenna.

Furthermore, the first and second mobile devices are each preferably further provided with a communication function limiting section that limits the communication function of the transmitting section, wherein the communication function limiting section lifts limitations on the communication function of the transmitting section in response to a transition to the transmission-during-power-off mode in which the transmitting section performs data transmission after a power-off operation of the power operating section.

This causes limitations imposed during normal operation on the communication function of the transmitting section to be lifted when a transition is made to the transmission-during-power-off mode, and enables data transmission to be performed in a preferable manner by fully utilizing transmitting capabilities of the transmitting section.

Each of the first and second mobile devices is preferably a device equipped with functions of a digital camera that generates image data of a subject image in response to an image taking operation, and the transmitting section preferably transmits all unsent image data in data transmission.

When the above mobile device is a digital camera, image data is successively recorded when taking images. In this case, by preparing an unsent list and arranging all unsent image data to be transmitted in data transmission, image data obtained through image taking may be recorded on to, for instance, the recording section of a home personal computer on the same day.

Additionally, each of the first and second mobile devices may be a device that is provided with: a lens unit, having an image taking optical system and an image pickup device, which generates image data; and a main body unit, to which the lens unit is detachably mounted, that receives image data from the lens unit and performs image processing.

In this case, the power operating section preferably interprets the detachment of the lens unit from the main body unit as a power-off operation.

Furthermore, it is further preferable that the transmitting section suspends data transmission in response to the mounting of the lens unit when performing data transmission when the lens unit is detached from the main body unit.

A first wireless communication apparatus according to the present invention is provided with a mode selection switch that allows an image pickup apparatus that is a mobile device to select any of multiple operating modes, an image pickup apparatus-side battery and a power switch, the wireless communication apparatus detachably mounted when necessary on the image pickup apparatus, and the first wireless communication apparatus further having:

a wireless communication processing section that performs transmission and reception processing of image data with an external device;

a wireless communication apparatus-side battery that supplies power;

an operating mode determination section that determines what operating mode is selected by the mode selection switch; and a first power control section that suspends power supply from the wireless communication apparatus-side battery to the wireless communication processing section according to an operating mode determined by the operating mode determination section.

According to the first wireless communication apparatus of the present invention, when the wireless communication apparatus is detachably mounted on to the image pickup apparatus that is a mobile device, an operating mode selected by the mode selection switch provided on the image pickup apparatus is determined by the mode determination section, and the power supply from the battery to the wireless communication processing section is controlled by the first power control section according to the determined operating mode.

For instance, when the first power control section determines that the operating mode determined by the mode determination section is an operating mode that requires operation of the wireless communication apparatus, power is supplied from the battery to the wireless processing section. When the operating mode is an operating mode that does not require operation of the wireless communication apparatus, the power supply from the battery to the wireless processing section is suspended by the first power control section. Therefore, power consumption of the battery is suppressed and power saving is achieved.

The first wireless communication apparatus according to the present invention is preferably further provided with:

an attachment/detachment determination section that determines attachment to or detachment from the image pickup apparatus;

a switchover state determination section that determines whether the power switch is turned on or off;

a wireless communication state detection section that detects whether wireless communication is being executed; and a second power control section that, when either detachment from the image pickup apparatus is detected by the attachment/detachment determination section or the power switch is detected to be turned off by the switchover state determination section, maintains power supply to the wireless communication processing section as long as execution of wireless communication is being detected by the wireless communication state detection section, and suspends power supply when the execution of wireless communication is no longer detected.

As a result, in the same manner as with the first mobile device according to the present invention, power supply is maintained by the second power control section and backup data is reliably stored in a personal computer even when a power-off operation is performed during transmission. In addition, since the second power control section cuts off power supply from the battery to the wireless processing section after completion of wireless transmission, wasteful power consumption will no longer be an issue.

As described above, in a wireless communication apparatus detachably mounted on to a mobile device that is not equipped with a transmitting function that transmits data, a wireless communication apparatus may be achieved that suppresses wasteful power consumption and reliably stores backup data to an external recording section without having a user be aware of the data being stored.

A second wireless communication apparatus according to the present invention is provided with a mode selection switch that allows an image pickup apparatus that is a mobile device to select any of a plurality of operating modes, an image pickup apparatus-side battery and a power switch, the wireless communication apparatus detachably mounted when necessary on the image pickup apparatus, and the wireless communication apparatus having:

an attachment/detachment determination section that determines attachment to or detachment from the image pickup apparatus;

an operating mode determination section that determines what operating mode is selected by the mode selection switch;

a wireless communication processing section that performs transmission and reception processing of image data to an external device;

a wireless communication apparatus-side battery that supplies power;

a switchover state determination section that determines whether the power switch is turned on or off;

a first remaining battery level monitoring section that monitors a remaining battery level of the image pickup apparatus-side battery;

a second remaining battery level monitoring section that monitors a remaining battery level of the wireless communication apparatus-side battery; and a charging control section that executes charging from the image pickup apparatus-side battery to the wireless communication apparatus-side battery either when the power switch is detected to be turned off by the switchover state determination section, in the event that mounting to the image pickup apparatus is detected by the attachment/detachment determination section, a remaining battery level exceeding a predetermined level is detected by the first remaining battery level monitoring section and the second remaining battery level monitoring section detects that the wireless communication apparatus-side battery is not fully charged, or when the power switch is detected to be turned on by the switchover state determination section and a selection of an operating mode other than an image taking mode that performs image taking is detected by the operating mode determination section.

According to the second wireless communication apparatus of the present invention, when a remaining battery level of the image pickup apparatus-side battery exceeding a predetermined level is detected by the first remaining battery level monitoring section, and the wireless communication apparatus-side battery is determined to be not fully charged, or when the switch state detection section determines that the image taking mode is selected, the charging control section performs charging from the image pickup apparatus-side battery to the wireless communication apparatus-side battery.

This enables the capacity of the wireless communication apparatus-side battery to be secured through charging so as to prevent interruption of a transmission that is not yet completed due to the wireless communication apparatus-side battery running out of power during power supply from the battery to the wireless processing section.

A third wireless communication apparatus according to the present invention is detachably mounted when necessary on an image retaining apparatus that retains image data and serves as a mobile device, the wireless communication apparatus having:

an inter-apparatus communication section that, in a mounted state to the image retaining apparatus, receives image data from the image retaining apparatus;

an image data storage section that stores image data received from the inter-apparatus communication section;

an image size conversion section that converts image size of image data stored in the image data storage section; and a wireless communication section that performs wireless transmission of image data converted by the image size conversion section to an external device.

According to the third wireless communication apparatus of the present invention, wireless transmission of image data subsequent to size conversion by the image size conversion section is performed by the wireless communication section.

For instance, by reducing size, the time required for wireless transmission may be reduced, and power consumption of the battery may be suppressed.

In addition, a fourth wireless communication apparatus according to the present invention is detachably mounted when necessary on an image pickup apparatus that retains image data and serves as a mobile device, the wireless communication apparatus comprising:

an inter-apparatus communication section that, in a mounted state to the image pickup apparatus, receives image data from the image pickup apparatus;

an operation type selection section that selects whether an operation will be performed as a memory operation that stores image data or as a wireless communication operation that transmits image data to an external device;

an image data storage section that stores image data received by the inter-apparatus communication section;

a memory management section that prohibits overwriting of image data on the image data storage section when a memory operation is selected by the operation type selection section and allows overwriting of image data on the image data storage section when a wireless communication operation is selected by the operation type selection section; and a wireless communication section that performs wireless transmission of image data stored in the image data storage section to an external device when a wireless communication operation is selected by the operation type selection section.

The wireless communication apparatus according to the present invention is preferably provided with a wireless communication apparatus-side battery that supplies power, and the wireless communication section is preferably provided with a function that performs wireless communication when separated from the image pickup apparatus.

As a result, even if the wireless communication apparatus is not mounted onto the image pickup apparatus, data stored in the data storage section inside the wireless communication apparatus is transmitted to an external device when separated from the image pickup apparatus.

The image pickup apparatus and the wireless communication apparatus are preferably connected by an interface based on the IEEE 1394 standard or an interface based on the USB standard.

This allows high-speed transfer of large-volume digital data such as image data, and enables processing to be completed in a short period of time.

As described above, in a mobile device equipped with a transmission function to outwardly transmit data and in a wireless communication apparatus, which is detachably mounted on a mobile device not provided with a communication apparatus, which outwardly transmits data and receives incoming data, a mobile device and a wireless communication apparatus are achieved which suppress wasteful power consumption and reliably store backup data to an external storage section without having a user be aware of the data being stored.

In addition, in the first wireless communication apparatus according to the present invention, since power consumed by the wireless communication apparatus may be suppressed and a mounted battery may be downsized by providing the first power control section, downsizing of the entire apparatus may be achieved. Furthermore, a lowered power consumption provides an economic advantage for users. Moreover, in the first wireless communication apparatus according to the present invention, even when a user either mistakenly turns off power of the image pickup apparatus during communication by the wireless communication apparatus or detaches the wireless communication apparatus from the image pickup apparatus, the communication in progress may be continued until completion thereof without cutoff by providing the second power control section. Therefore, since it is no longer necessary to retry communications, usability for the user may be improved.

Additionally, in the second wireless communication device, the mounted battery may be downsized by providing the charging control section. Therefore, the entire apparatus may be downsized. Furthermore, since batteries are not required to be replaced daily, economic advantages and improvements in usability may be achieved for the user.

Moreover, in the third wireless communication apparatus according to the present invention, by providing the size conversion section on the wireless communication apparatus connected to the image data retaining apparatus, the volume of data accumulated in an internal memory of the wireless communication apparatus, due to a difference between a speed of wireless communication between these apparatuses and a speed of wireless communication speed with a printer, may be reduced. As a result, communication processing capabilities may be improved, and advantages in cost reduction, such as reduced memory capacity and the like, may be gained.

Additionally, by providing the fourth wireless communication apparatus according to the present invention with the operation type selection section, the wireless communication apparatus may be used for a purpose other than communication as a storage memory for image data, thereby improving the usability of the user.

In the first to fourth wireless communication apparatuses, usability by the user may be improved by enabling independent wireless communication to be performed using a battery provided on the apparatus even when the wireless communication apparatus is detached from the mobile device.

Furthermore, versatility may be improved by realizing the connection between the mobile device and the wireless communication apparatus using a general-purpose interface based on the IEEE1394 standard or the USB standard. Moreover, the availability of general-purpose parts provides an advantage in cost reduction.

DETAILED DESCRIPTION OF THE INVENTION

A configuration and operations of a digital camera 1 will now be described as an embodiment of the mobile device according to the present invention.

Figure 1:
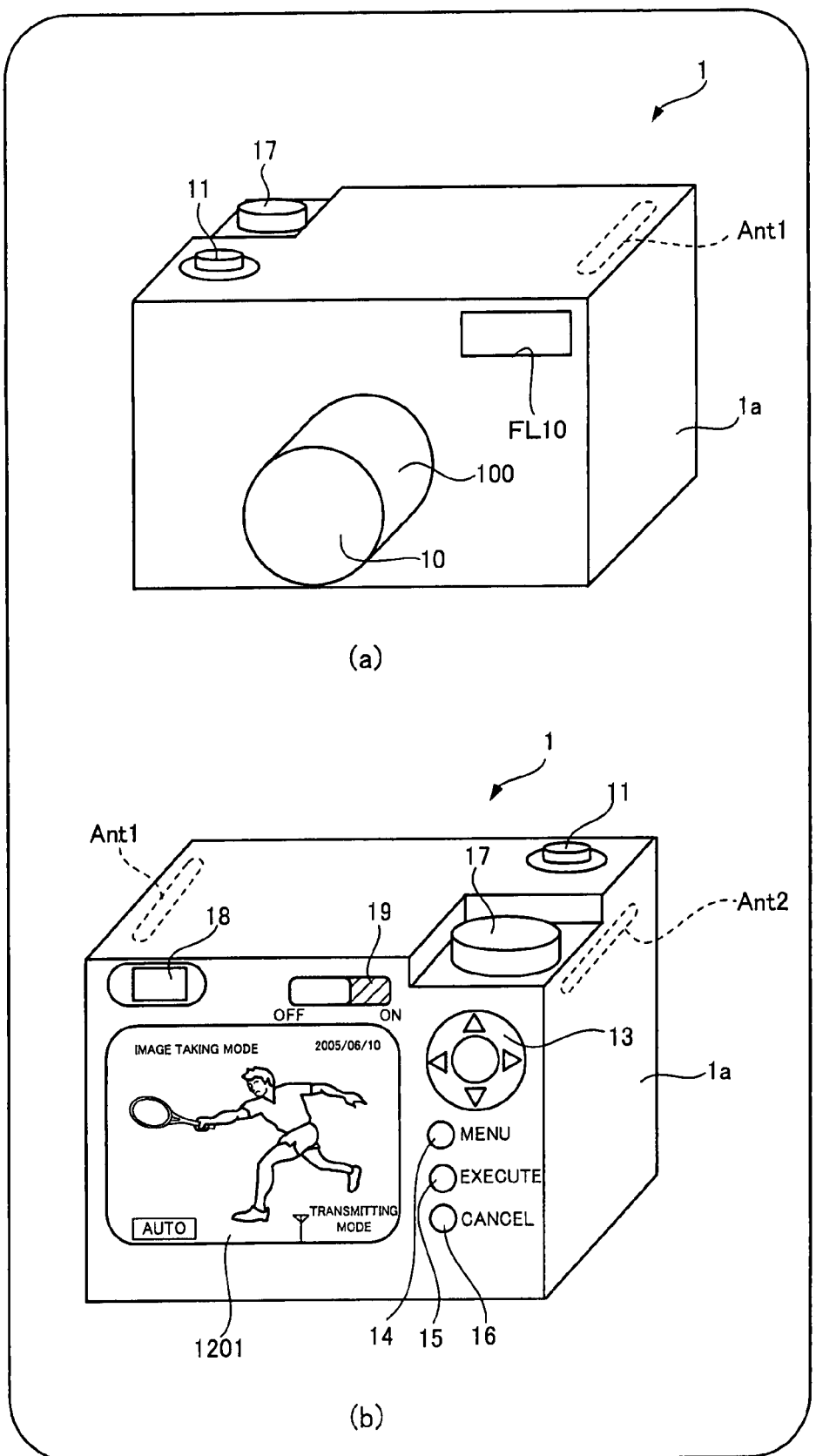
FIG. 1 is a diagram showing an exterior view of a digital camera that is an embodiment of a mobile device according to the present invention.

FIG. 1 is a diagram showing an exterior view of a digital camera that is an embodiment of the mobile device according to the present invention.

Part (a) of FIG. 1 shows a perspective view of a digital camera 1 seen from front diagonally upward, while Part (b) of FIG. 1 shows a perspective view of the digital camera 1 seen from rear diagonally upward. The digital camera 1 operates by receiving power from an internal battery (to be described later).

A lens barrel 100 is provided at the center of front of the digital camera 1 shown in Part (a) of FIG. 1. An image taking optical system 10 is built into the lens barrel 100. In addition, a flash window FL10 is provided diagonally upward right of the lens barrel 100, and a shutter button 11 is provided on an upper face of a camera body 1a.

Furthermore, as shown in Part (b) of FIG. 1, a display screen 1201 is arranged on a rear face of the digital camera 1. A group of operators, such as a direction key 13, a menu button 14, an execution key 15, a cancel button 16 and the like are provided beside the display screen 1201. Moreover, a recess is provided at a corner section besides the shutter button 11 on the upper face of the camera body 1a, and a mode selection dial 17 is arranged in the recess.

Furthermore, a view finder 18 and a power switch 19 are arranged above the display screen 1201. In the event that the power switch 19 is operated to an on-side when the mode dial 17 is set to an image taking mode, a live image representing a subject is displayed as shown in Part (b) of FIG. 1.

In addition, the digital camera 1 according to the present invention is provided with a transmitting section (to be described later) that outwardly transmits data stored inside the digital camera 1. Two internal antennas Ant1 and Ant2 are arranged at the transmitting section at a distance from each other on the upper face-side of the camera body 1a. When a transmitting mode is selected via operations of the menu button 14 and the direction key 13, the after-mentioned transmitting section performs outward wireless transmission of data stored inside the digital camera 1 via the internal antennas Ant1 and Ant2. At this point, a text that reads "transmitting mode" is displayed at the bottom of the display screen 1201 to notify a user that the current mode is transmission mode.

In addition, in the digital camera 1 according to the present invention, a mode called transmission during power-off mode is installed which continues data transmission even when an off-operation of the power switch 19 is performed during the transmitting mode. When the transmission-during-power-off mode is activated in response to an operation of the power switch 19 to the off-side, transmission of data by the transmitting section (to be described later) will be continued until transmission of data to be sent (in this case, image files) contained in a memory card (to be described later) loaded into the digital camera 1 is completed. The term "image file" will also be used hereinafter as a term representing data according to the present invention.

A configuration and operations of sections involved in operations under the transmission-during-power-off mode will now be described with reference to FIG. 2.

Figure 2:
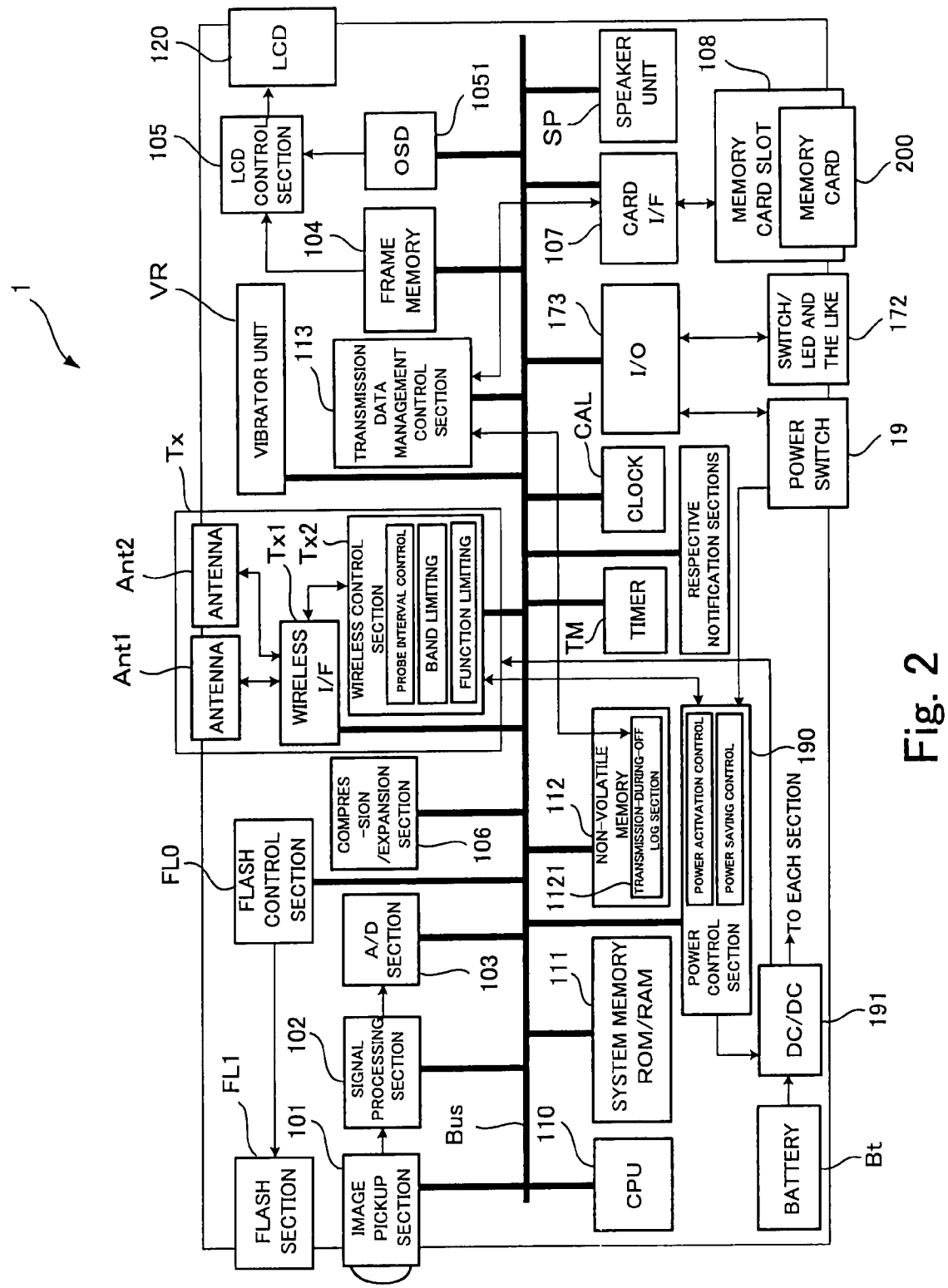
FIG. 2 is a block diagram showing an internal configuration of the digital camera 1 shown in FIG. 1.

FIG. 2 is a block diagram showing an internal configuration of the digital camera 1 shown in FIG. 1.

As shown in FIG. 2, operations of the digital camera 1 are comprehensively controlled by the CPU 110. In this example, the CPU 110 executes processing according to procedures of a program stored in a system memory (ROM/RAM) 111 in order to control operations of the entire digital camera 1.

Additionally, in order to achieve operations during the transmitting mode, the digital camera 1 according to the present embodiment is equipped with a transmitting section Tx. When a user wishes to create backup data and the transmitting mode is selected via a user operation, data is outwardly transmitted via radio from the transmitting section Tx to, for instance, a home personal computer. The transmitting section Tx commences processing based on an instruction from the CPU 110. In the following description, it is assumed that, upon completion of the execution, the transmitting section Tx outputs a signal indicating the completion to a power control section 190 (or, also to the CPU 110).

Furthermore, in order to enable operations upon transition to the transmission-during-power-off mode in the event that an off-operation of the power switch 19 is performed during transmission of data by the transmitting section Tx when transmitting mode is selected, the digital camera 1 according to the present embodiment is equipped with the power control section 190 to enable constant monitoring of on/off operations of the power switch 19. While operations of the power control section 190 are also controlled by the CPU 110, the power control section 190 is also arranged so that operations of a DC/DC converter 191 and the transmitting section Tx may be directly controlled in response to on/off operations of the power switch 19, without instructions from the CPU 110.

Since such an arrangement enables the power control section 190 to directly control operations of the DC/DC converter 191 (hereinafter referred to as DC/DC) when the power switch 19 is operated to the off-side, the power supply to each section except the transmitting section Tx may be immediately cut off. At the same time, after completion of data transmission by the transmitting section Tx, the completion of the transmission operation under the transmission-during-power-off mode is recognized by a signal outputted from the transmitting section Tx, which then enables immediate cutoff of the power supply from the DC/DC 191 to the transmitting section Tx. Moreover, since the power control section 190 is capable of instructing a wireless control section Tx2 provided at the transmitting section Tx to perform transmission while saving power, an advantage may be gained in that power consumption by the transmitting section Tx necessary for transmission may be reduced. The power control section 190 corresponds to the power supply control section according to the present invention, while the wireless control section Tx2 corresponds to the power saving control section according to the present invention. Additionally, the power switch 19 corresponds to the power operating section according to the present invention.

Furthermore, the digital camera 1 according to the present embodiment is provided with a transmission data management control section 113 that manages data transmitted during transmission-during-power-off mode. When image files are successively transmitted by the transmitting section Tx during transmission-during-power-off mode, the transmission data management control section 113 arranges the commencement and completion of transmission of respective image files to be successively recorded as transmission history into a non-volatile memory 112.

When the power switch 19 is re-activated, this arrangement enables the CPU 110 to reference the contents contained in a transmission-during-off log section 1121 inside the non-volatile memory 112 to easily grasp to what extent transmission has been performed under the transmission-during-power-off mode, and such transmission results may be notified via display using an LCD 120.

In addition, when the power switch 19 is operated to the on-side once again, the CPU 110 references the transmission-during-off log section 1121 inside the non-volatile memory 112 and will be able to grasp to what extent backup was performed during a previous power-off according to the contents of the transmission-during-off log section 1121 which indicates that, for instance, transmission was completed up to an image file having a certain image file name. The CPU 110 will also be able to notify the user of a backup data creation status using the LCD 120. The transmission data management control section 113 and the transmission-during-off log section 1121 inside the non-volatile memory 112 configures a portion of the transmission completion notification section according to the present invention.

Before providing a detailed description of the configurations and operations of the power control section 190, the transmitting section Tx and the transmission data management control section 113, which are characteristic components of the present invention, a brief description of image taking operations of the digital camera 1 shown in FIG. 1 will now be provided with reference to FIG. 2.

When the power switch 19 is operated to the on-side in the event that the image taking mode dial 17 (it is assumed that the image taking mode dial 17 is included in the element described "switch/LED and the like 172" in FIG. 2) is switched to image taking mode, power is supplied to each section from the DC/DC 191 under the control of the power control section 190, and image taking processing is commenced by the CPU 110. First, the CPU 110 receives an operation of the power switch to the on-side via an I/O 173, and issues an instruction to an image pickup section 101 to output signals representing a subject image captured by the image pickup section 101 to a signal processing section 102 per a predetermined timing. An image pickup optical system built into the lens barrel 10 shown in FIG. 1 and an image pickup device that forms a subject image in the image pickup optical system are arranged at the image pickup section 101. During image taking mode, image signals representing a subject captured by the image pickup optical system using the image pickup device inside the image pickup section 101 are generated. The image signals generated by the image pickup section 101 are repetitively outputted to the signal processing section 102 per a predetermined timing. At this point, not all image signals generated by the image pickup device in the image pickup section 101 are outputted. Instead, pixels are culled and outputted at a predetermined frame rate.

A signal processing section 102 of a subsequent stage converts the culled and outputted image signals into YC signals and performs gamma correction processing thereon according to gamma characteristics of the LCD 120 before supplying the image signals to an A/D section 103 of a next stage. The A/D section 103 further converts the analog image signals into digital image signals, which are then supplied to a frame memory 104 via a bus (Bus). As described above, since image signals are repetitively outputted to the signal processing section 102, the image signals inside the frame memory 104 will be updated per a predetermined timing. Therefore, images based on the image signals inside the frame memory 104 will be switched over per a predetermined timing and displayed on the display screen 1201 of the LCD 120 under the control of a LCD control section 105, and as a result, a subject image captured by the image pickup section 101 will appear as though displayed "live". In the following description, this image will be referred to as a "live view".

When the shutter button 11 is pressed while this live view is displayed on the display screen 1201 of the LCD 120, live view processing is replaced by image taking processing that commences under the control of the CPU 110 and is triggered by a timing of full-pressing of the shutter button 11.

The CPU 110 first causes the image pickup section 101 to commence exposure at a timing that is synchronized with a pressing down of the shutter button 11. After a lapse of a predetermined shutter second time, the CPU 110 then causes exposure to be terminated, and at the same time, causes the image pickup section 101 to output image signals to the signal processing section 102. Signal processing of image signals outputted from the image pickup section 101 is performed at the signal processing section 102. Image signals signal-processed at the signal processing section 102 are supplied to a compression/expansion section 106 via the Bus. Compression of image signals is performed at the compression/expansion section 106, and the compressed image signals are supplied to a card I/F 107 together with compression information. The card I/F 107 stores an image file consisting of image signals and compression information onto a memory card 200 mounted in a memory card slot 108. A clock section CAL and an OSD (On Screen Display) 1051 are also provided so that dates and texts such as "image taking mode" or "transmitting mode", as shown in FIG. 1, may be displayed on the display screen 1201 of the LCD 120. In addition, a speaker unit SP for audio reproduction that is used for performing notifications to the user, and a flash control section FL0 and a flash section FL1 are also provided for emitting a flash from the flash window FL10 shown in FIG. 1 in case of a dark field.

The following image taking processing is performed by the digital camera 1 shown in FIG. 1.

Operations of the digital camera 1 according to the present embodiment during transmission-during-power-off mode and a configuration of portions involved in the operations and mounted on the digital camera 1 will now be described.

First, the digital camera 1 shown in FIG. 2 is provided with the transmitting section Tx that performs outward data transmission. The transmitting section Tx is provided with a wireless I/F Tx1, the wireless control section Tx2 that controls operations of the wireless I/F Tx1, and the two antennas Ant1, Ant2 also shown in FIG. 1. In the event that the transmitting mode is selected, image files to be transmitted in the memory card 200 are transmitted outwards by the transmitting section Tx.

In addition, as described above, the digital camera 1 according to the present embodiment has a transmission-during-power-off mode to ensure that image files to be transmitted will be transmitted without exception even when the power switch 19 is operated to the off-side during sequential transmission of a number of image files stored in the memory card 200. This transmission-during-power-off mode is a mode that is activated in response to the power switch 19 operated to the off-side when transmission is being performed under the transmitting mode. When this mode is activated, data transmission is continued until the last image file is transmitted even when the power switch 19 is operated to the off-side during sequential transmission of image files to be transmitted. In addition, when the transmission-during-power-off mode is activated, since an off-operation of the power switch 19 has already been performed, transmission processing is arranged to be executed after a transition of the entire digital camera 1 and the transmitting section Tx to power saving mode under the control of the wireless control section Tx2 according to an instruction from the power control section 190.

Therefore, the wireless control section Tx2 that performs power saving while maintaining receiver sensitivity under the transmission-during-power-off mode is provided at the transmitting section Tx, which performs transmission of all image files to be transmitted under transmission-during-power-off mode. The wireless control section Tx2 is provided with a function to perform power saving by spreading a transmitting/receiving interval of probe signals for searching a communication destination, a function to perform power saving by limiting frequencies used for communication, and the like. As described earlier, this wireless control section Tx2 corresponds to the power saving control section according to the present invention. The wireless control section Tx2 is additionally provided with functions including a functional restriction function that restricts operations by the wireless I/F Tx1 in the event that a clock frequency that determines operations of the CPU 110 inadvertently enters a frequency band used by the wireless I/F when the power switch 19 is operated to the on-side.

Furthermore, in the present embodiment, the power control section 190 is provided in order to perform power saving on the entire digital camera 1, in addition to a function to perform power saving of the transmitting section Tx.

As described above, the power control section 190 corresponds to the power supply control section according to the present invention. The power control section 190 supplies power to each section of the digital camera 1, including the transmitting section Tx that operates by receiving power supply, in response to a power-on operation of the power switch 19, and cuts off power supplied to each section in response to a power-off operation of the power switch 19.

Operations of the power control section 190 and the wireless control section Tx2, which are provided at the transmitting section Tx, will now be described in detail.

In this example, power from the battery Bt is constantly supplied to the power control section 190 and the DC/DC 191 shown in FIG. 2, and the operational state of the power switch 19 is constantly monitored. When an operation of the power switch 19 to the on-side is detected, the power control section 190 causes power from the battery Bt to be supplied to each section via the DC/DC 191. In the present embodiment, when power from the battery Bt is also supplied to the CPU 110, the CPU 110 commences control of operations of the digital camera 1 according to a program inside the system memory 111.

The power control section 190, which corresponds to the power supply control section according to the present invention, is provided with two functions: a power activation control function and a power saving control function. The power activation control function controls operations of the DC/DC 191 in response to on/off operations of the power switch 19, while the power saving control function cuts off power supplied to each section excluding the transmitting section Tx (or, although described later, in some cases the LCD control section 105, the LCD 120 and the OSD 1051 in addition to the transmitting section Tx) from the DC/DC 191 in response to an off-operation of the power switch 19 and controls operations of the transmitting section Tx so as to achieve power saving mode.

The transmitting section Tx is equipped with the wireless I/F Tx1 that outwardly transmits data such as image files via the antennas Ant1 and Ant2 shown in FIG. 1. Upon transition to the transmission-during-power-off mode, the wireless control section Tx2 switches operations of the wireless I/F Tx1 to the power saving mode under instructions from the power control section 190. The wireless control section Tx2 is equipped with functions for performing power saving such as a probe interval control function and a band restriction function.

Since this arrangement allows transmission to continue even when the power switch 19 is operated to the off-side during transmission under the transmitting mode, an advantage may be gained in that image files in the memory card 200 may be reliably recorded on, for instance, a storage section of a personal computer at the transmission destination. In addition, since the power control section 190 controls the DC/DC 191 so that the entire digital camera 1 transitions to power saving mode and transmission of image files is performed after the transmitting section Tx transitions to the power saving mode after an off-operation of the power switch 19, a further advantage may be gained in that draining of the battery Bt is suppressed.

A procedure of processing performed by the CPU 110 and the power control section 190 under the transmission-during-power-off mode will now be described with reference to FIG. 3.

Figure 3:
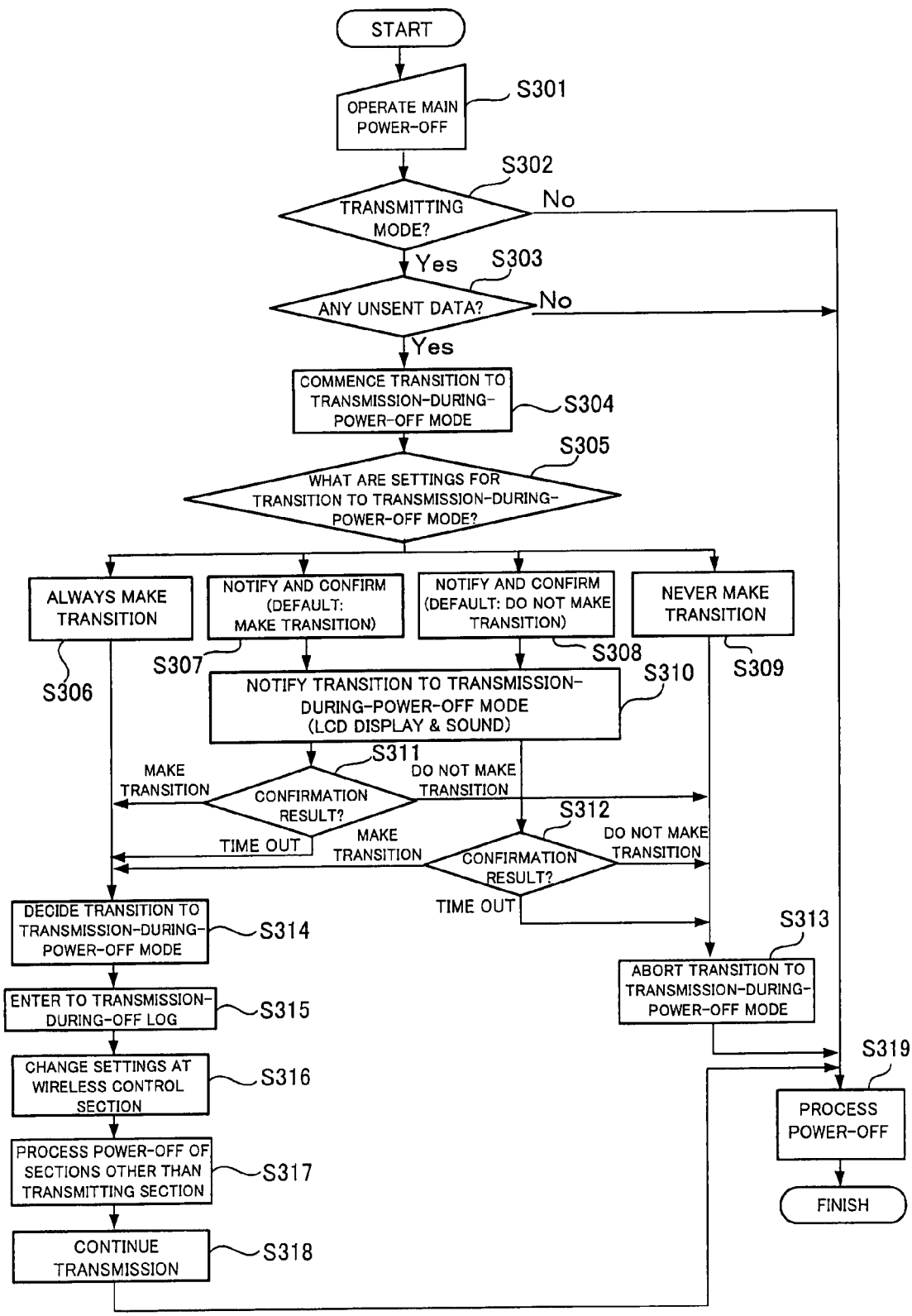
FIG. 3 is a flowchart showing a procedure of processing performed by a CPU 110 and a power control section 190 under transmission-during-power-off mode.

FIG. 3 is a flowchart showing a procedure of processing performed by the CPU 110 and the power control section 190 under the transmission-during-power-off mode.

As shown in step S301, the processing of this flow commences upon an off-operation of the main power source or, in other words, when the power switch 19 (refer to FIG. 1) is operated to the off-side.

In step S302, a determination is made on whether the CPU 110 is in the transmitting mode. When it is determined in step S302 that the CPU 110 is not in transmitting mode, the procedure proceeds to a No-side in which the power control section 190 performs a power-off processing or, in other words, cuts off the power supply from the DC/DC 191 according to an instruction from the CPU 110, thereby concluding the processing of this flow.

When it is determined in step S302 that the CPU 110 is in transmitting mode, the procedure proceeds to a Yes-side in which determination is performed via the memory card I/F 107 on whether unsent data exists in the memory card 200.

If it is determined in step S303 that there is no unsent data, the procedure proceeds to a No-side to perform a power-off processing in step S319, thereby concluding the processing of this flow.

If it is determined in step S303 that unsent data exists, the procedure proceeds to a Yes-side, and a transition to the transmission-during-power-off mode is made in step S304. The procedure then proceeds to step S305 in which determination is performed on how transition settings to the transmission-during-power-off mode have been configured via a user operation. The present embodiment is arranged so that four different transition settings are configured according to operations. Therefore, FIG. 3 shows respective setting contents of the four transition settings arranged below the determination step S305. In the following description, it will be assumed that any of the four setting contents is selected in advance by the user.

For instance, if it is determined in step S305 that a setting has been configured in which a transition to the transmission-during-power-off mode is performed at all times, the procedure proceeds via step S306 to step S314, in which the processing of steps S315 to S319 is sequentially performed on the basis that the transition to transmission-during-power-off mode is performed in step S314.

In step S315, the CPU 110 instructs the transmission data management control section 113 to prepare for making entries in the transmission-during-off log, and in step S316, the power control section 190 changes the settings of the wireless control section Tx2 inside the transmitting section Tx to the power saving mode. In the next step S317, the power control section 190 cuts off power supplied from the DC/DC 191 to each section with the exception of the transmitting section Tx. In step S318, the power control section 190 causes transmission to continue under the power saving mode set in step S316. Once the power control section 190 detects that the transmission has been completed, the procedure proceeds to step S319 in which a power-off processing is performed to cut off power supplied to the transmitting section Tx, thereby concluding the processing of this flow.

Furthermore, if a setting that allows selection of transition to the transmission-during-power-off mode via notification and a user operation has been configured in step S305, the procedure proceeds via step S307 or step S308 to step S310, in which the CPU 110 instructs the LCD control section 105 via the OSD 1051 (refer to FIG. 2) to perform notification of whether a transition to the transmission-during-power-off mode should be performed, by displaying such notification on the display screen 1201 of the LCD 120, and at the same time instructs the speaker unit SP to perform notification of the transition to the transmission-during-power-off mode by means of sound or the like. Upon proceeding to the next step S311 or S312, if it is determined that a user operation has selected to perform a transition, the procedure proceeds to step S314 to perform the processing of steps S314 to S319, thereby concluding the processing of this flow.

Moreover, if it is determined that a user operation has selected not to perform a transition in step S311 or step S312, the procedure proceeds to step S313 in which a transition to the transmission-during-power-off mode is not performed, and a power-off processing that cuts off power supplied to each section is performed in step S319, thereby concluding the processing of this flow. Since the present flow includes processing that is executed in response to user operations, timeout processing is arranged to be performed in steps S311 and S312 in order to prevent disruption of the processing of this flow in the event that no operations are performed by the user.

The CPU 110 and the power control section 190 perform processing during the transmission-during-power-off mode as described above.

Since the flow shown in FIG. 3 indicates processing performed after settings are configured via user operations and may therefore be somewhat difficult to understand, setting operations by the user will now be described with reference to FIGS. 4 and 5.

Figure 4:
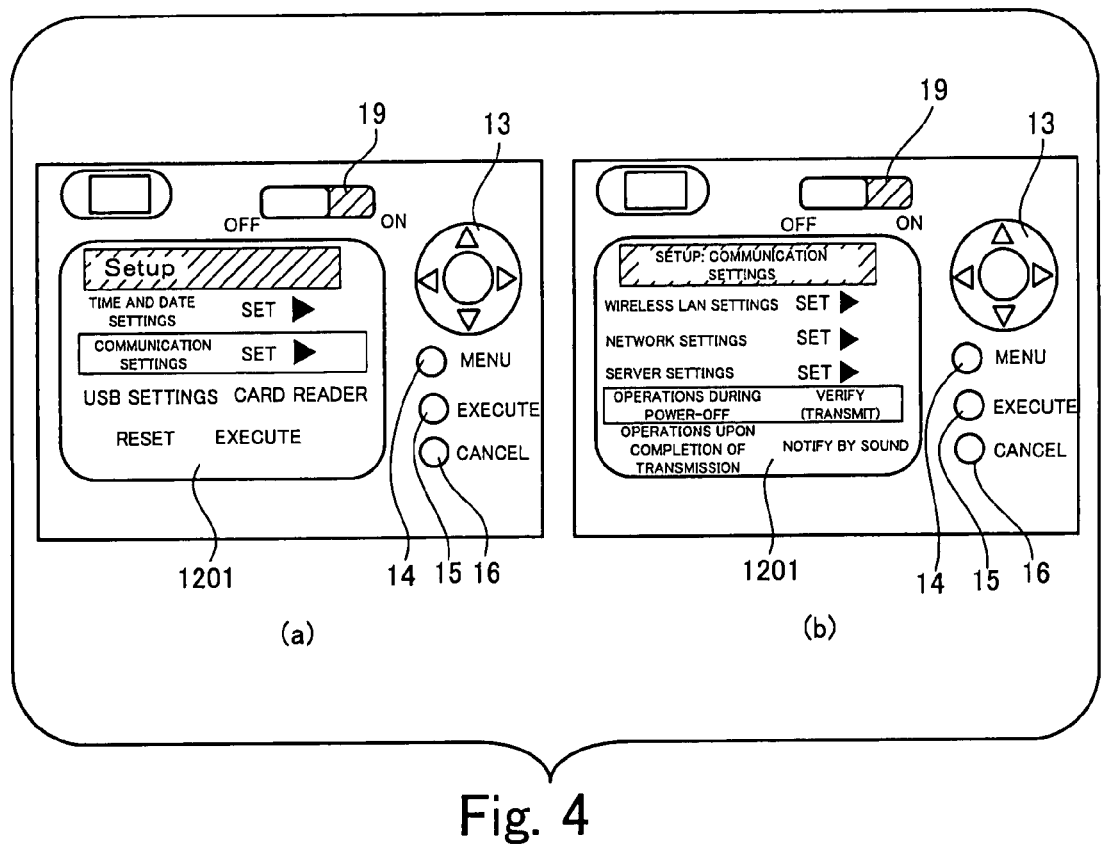
FIG. 4 is a diagram showing a screen that is displayed when a user attempts to configure any of four different transition settings of steps S306, S307, S308 and S309 shown in FIG. 3.

FIG. 4 is a diagram showing a screen that is displayed when a user attempts to configure any of four different transition settings of steps S306, S307, S308 and S309 shown in FIG. 3. In addition, FIG. 5 is a diagram describing a switchover state of a screen displayed on the display screen in the event that the operation at power-off is set to "verify (transmit)" as shown in FIG. 4, the transmitting mode is then selected via an operation and data transmission is being performed. When "verify (transmit)" shown in FIG. 4 is set, the processing of step S308 or S309 shown in FIG. 3 is performed. The contents of the processing of step S308 and S309 shown in FIG. 3 are the same, with the sole exception being that the setting state in a reset state is either at a "perform transition"-side or a "do not perform transition"-side. In either case, the same processing will be performed when the "perform transition"-side or the "do not perform transition"-side is selected via an operation.

First, contents of settings configured via user operations will be described with reference to FIG. 4.

As shown in FIG. 4, in the digital camera according to the present embodiment, a "setup" menu shown in Part (a) of FIG. 4 is first displayed when the menu button 14 is pressed. When an item named "communication settings" that is included in the "setup" menu is selected via operations of the direction key 13 and the execution key 15, the display switches to a screen shown in Part (b) of FIG. 4 and a setup communication settings menu is displayed.

The communication settings menu shown in Part (b) of FIG. 4 includes items for settings when incorporating the digital camera 1 shown in FIG. 1 into a wireless LAN, items for settings when incorporating the digital camera 1 into a network, and server settings or the like. In addition, an item regarding transition settings during transmission-during-power-off mode (denoted as "operations during power-off" in Part (b) of FIG. 4) is also provided.

Display contents after the transmission-during-power-off mode is set to "verify (transmit)" are shown in FIG. 4. Additionally, there is a setting item for selecting what kind of notification will be performed. In this case, the diagram shows display contents after notification via sound has been set.

Figure 5:
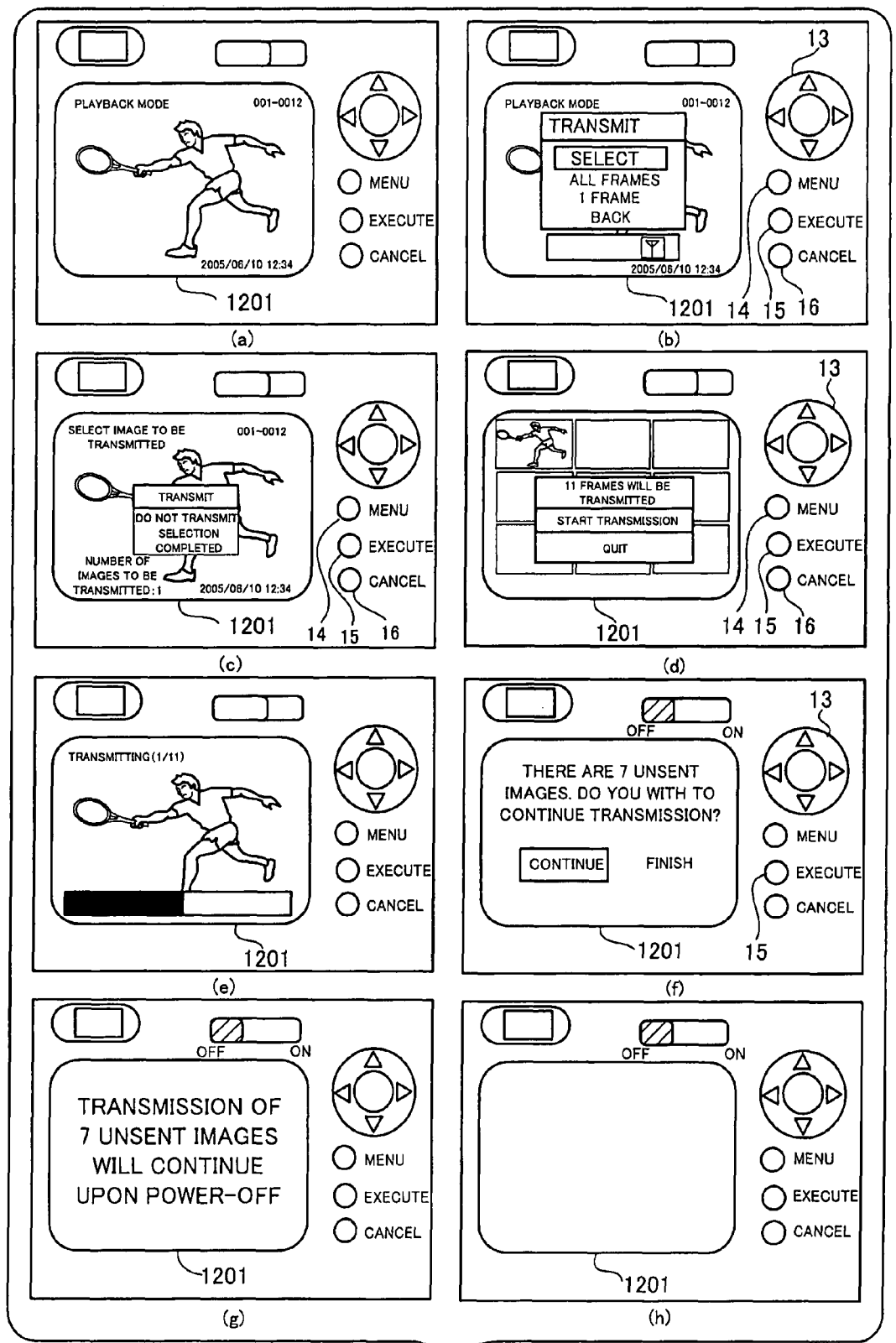
FIG. 5 is a diagram describing a switchover state of a screen displayed on a display screen in the event that the operation during power-off is set to "verify (transmit)" as shown in FIG. 4, a transmitting mode is then selected via an operation, and data transmission is being performed.

After such settings are configured, once processing is executed according to the flow shown in FIG. 3, screens are successively switched over and displayed as shown in FIG. 5.

FIG. 5 shows a switchover state of screens on the display screen in the event that the transmitting mode is selected via operations of the menu button 14 or the direction key 13 to commence transmission and a transition is made to the transmission-during-power-off mode by an off-operation of the power switch 19 when the mode dial 17 has been switched to a playback mode and an image based on image data contained in a single image file in the memory card is played back and displayed on the display screen 1201.

When the menu button 14 is operated when a playback image shown in Part (a) of FIG. 5 is displayed, multiple selection items are displayed while being superimposed on the playback image and indicating whether all image files will be transmitted or any of image files will be selected, as shown in Part (b) of FIG. 5. When, for instance, "select" is selected via an operation of the direction key 13 from the selection items, the internal CPU 110 instructs the transmission data management control section 113 and the memory card I/F 107 to prepare for transmission of image files selected from the image files in the memory card 200. The internal CPU 110 further instructs the LCD control section 105 via the OSD 1051 to switch the display to the screen shown in Part (c) of FIG. 5. When "transmit" is selected via an operation of the direction key 13 on this screen, the CPU 110 instructs the memory card I/F 107, and the LCD control section 105 via the OSD 1051, to display all images based on respective image data in all image files to be transmitted on the display screen 1201 in a multi-screen format shown in Part (d) of FIG. 5.

The CPU 110 further instructs the OSD 1051 to notify the user that there are 11 frames of selected images by displaying that "11 frames will be transmitted". Then, when "begin transmission" among the selection items is selected via operations of the direction key 13 and the execution key 15, the CPU 110 causes the transmitting section Tx to commence transmission of image files. Once transmission is commenced by the transmitting section Tx, the OSD 1051 is instructed to notify the user of the progress of the transmission processing by filling in a bar graph according to the number of image files transmitted to the transmitting section Tx from the card I/F 107. For instance, in the event that the user views the bar graph and operates the power switch 19 to the off-side thinking that the transmission will take time, the CPU 110 instructs the LCD control section 105 via the OSD 1051 in response to the operation to have the display on the display screen 1201 of the LCD 120 switched to the display screen shown in Part (f) of FIG. 5. The processing of the flow shown in FIG. 3 commences from this point.

In this example, since "verify (transmit)" has been selected as described with reference to Part (b) of FIG. 4, the processing of step S310 shown in FIG. 3 is performed in response to the off-operation of the power switch 19, and the screen shown in Part (e) of FIG. 5 switches over to a screen shown in Part (f) of FIG. 5.

When the screen shown in Part (f) of FIG. 5 is displayed and "continue" in the screen is selected via operations of the direction key 13 and the like, the processing of step S310 shown in FIG. 3 is performed and the screen switches over to a screen shown in Part (g) of FIG. 5.

Notification to the user of a transition to the transmission-during-power-off mode is performed via the screen shown in Part (g) of FIG. 5 to have the transmitting section Tx continue transmission. The processing of steps S315 to S318 shown in FIG. 3 is performed while this notification is displayed. Once data transmission by the transmitting section Tx has completed, the power control section 190 instructs the DC/DC 191 to cut off power supplied to each section excluding the CPU 110 and the power control section 190, thereby turning off the display screen 1201 of the LCD 120 as shown in Part (h) of FIG. 5 to achieve a complete power-off state.

While the present embodiment has been arranged so that an image file for which the user wishes to create backup data is selected from the image files in the memory card 200 and only the selected image file is transmitted, it is also possible to transmit all image files (unsent files) in the memory card 200. The CPU 110, the LCD control section 105, the LCD 120 and the OSD 1051, which perform the display processing on the display screen 1201, correspond to the state transition notification section as well as the transmission completion notification section according to the present invention.

As described above, in a mobile device equipped with a transmitting function to transmit data, a mobile device may be achieved that suppresses wasteful power consumption and reliably creates backup data without having a user be aware of the data being created.

Figure 6:
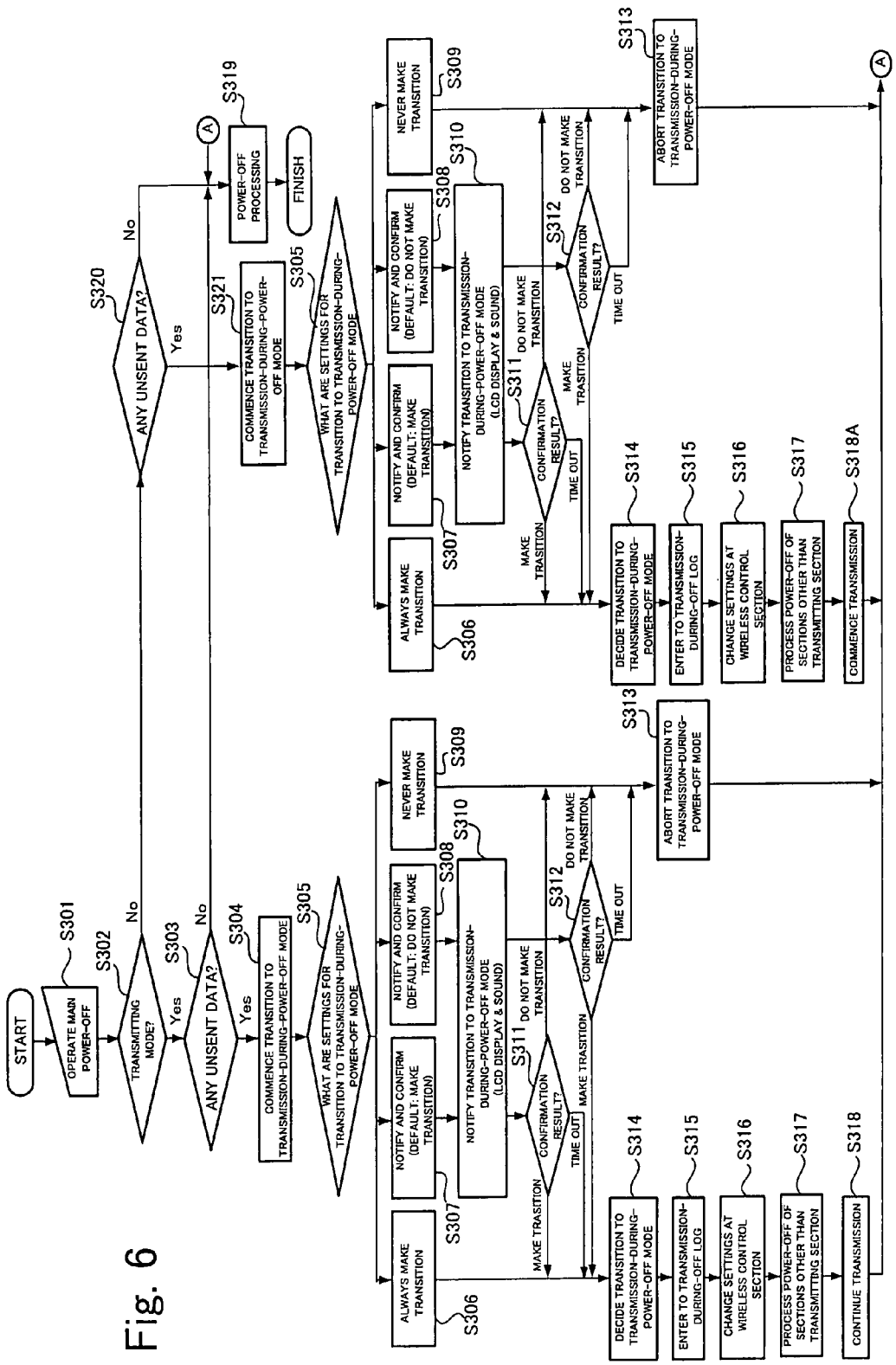
FIG. 6 is a diagram describing a second embodiment.
Figure 7:
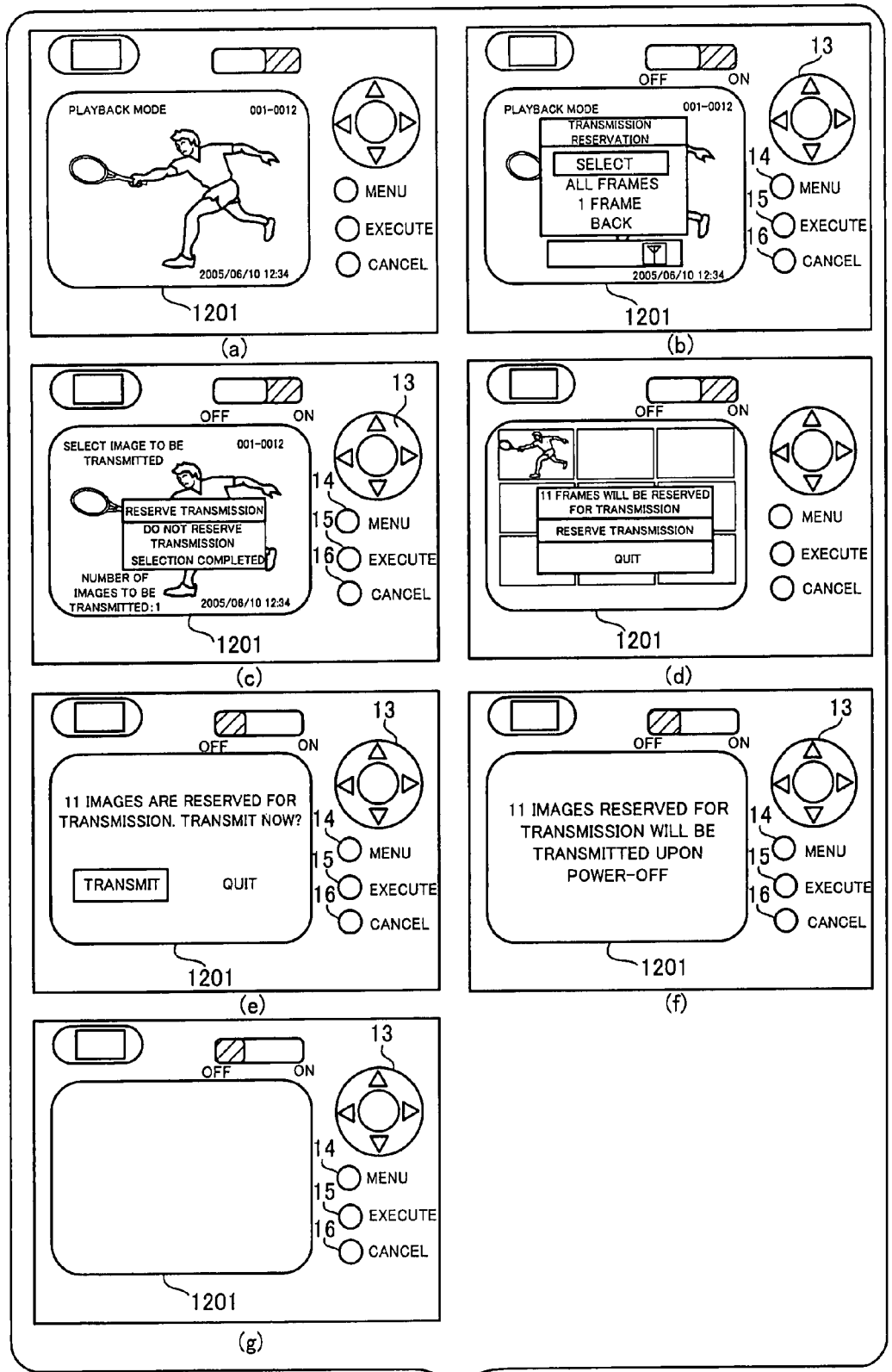
FIG. 7 is a diagram describing the second embodiment.

FIGS. 6 and 7 are diagrams describing a second embodiment.

FIG. 6 is a flowchart showing a procedure of processing performed by the CPU 110 and the power control section 190 under the transmission-during-power-off mode. FIG. 7 is a diagram describing a screen displayed on the display screen 1201 provided at the LCD 120 when processing is performed according to the processing procedure shown in FIG. 6.

An example in which processing is performed by the digital camera 1 shown in FIGS. 1 and 2 is also used in the second embodiment. As shown in FIG. 6, processing that differs from that shown in FIG. 3, described in the first embodiment, will be performed by the CPU 110 and the power control section 190. In the example shown in FIG. 6, an improvement has been made so that a transition to the transmission-during-power-off mode is automatically performed when unsent data exists in the memory card 200, even when the transmitting mode has not been set.

Step S320 shown in FIG. 6, as well as the processing of steps S314 to S318 that is performed when "Yes" is determined in step S320, have been added. Otherwise, the processing is identical to that shown in FIG. 3, and only the added portions will be extracted and described.

In step S302, if it is determined that the transmitting mode is not selected, the procedure proceeds to step S320 to determined whether there are unsent data. If it is determined in step S320 that unsent data exists, the procedure proceeds to step S321 to perform the processing of step S314 to step S318. However, the processing of step S318 has been changed from "continue" to "commence transmission", as indicated by step S318A.

In the event that unsent data exists during power-off, this arrangement enables transmission data to be automatically transmitted without attracting the attention of the user.

FIG. 7 is a diagram describing processing contents when the CPU 110, the power control section 190, the LCD control section 105, the OSD 1051 and the LCD 120, which correspond to the state transition notification section as well as the transmission completion notification section according to the present invention, perform processing according to the procedure of the flow shown in FIG. 6. In FIG. 7, a state is shown in which screens displayed on the display screen 1201 are successively switched over according to the progress of the processing.

When the menu button 14 is operated when a playback image shown in Part (a) of FIG. 7 is displayed, multiple selection items are displayed indicating whether an image file will be selected on the playback image to be transmitted or all frames will be transmitted, as shown in Part (b) of FIG. 7. When, for instance, "select" is selected via an operation of the direction key 13 from the selection items, the internal CPU 110 instructs the transmission data management control section 113 to prepare for transmission of image files selected from those in the memory card 200. The internal CPU 110 further instructs the LCD control section 105 to switch the display to the screen shown in Part (c) of FIG. 7. At this point, when "reserve transmission" is selected by an operation of the direction key 13, the CPU 110 instructs the LCD control section 105 to display images based on respective image data in the selected image file on the display screen 1201 in a multi-screen format shown in Part (d) of FIG. 7. Furthermore, the CPU 110 instructs the OSD 1051 to display a text stating "11 frames will be reserved for transmission", "Reserve transmission" and "Quit" onto the OSD 1051. At this point, when "Reserve transmission" is selected by operations of the direction key 13 and the execution key 15, a transmission reservation is performed.

Subsequently, in response to an operation of the power switch 19 (refer to FIG. 1) to the off-side, the CPU 110 instructs the LCD control section 105 and the OSD 1051 to display a text stating "11 images are reserved for transmission. Transmit now?", "Transmit" and "Do not transmit" together with a cursor formed of a frame on the display screen 1201. When "Transmit" is selected by operations of the direction key 13 and the execution key 15, the CPU 110 and the power control section 190 perform transition from normal mode to the transmission-during-power-off mode, and instruct the LCD control section 105 and the OSD 1051 to display a text stating "11 images reserved for transmission will be transmitted upon power-off", as shown in Part (f) of FIG. 7 to notify the user of the transition to the transmission-during-power-off mode. Furthermore, once data transmission by the transmitting section Tx (refer to FIG. 2) is completed, power-off processing is performed by the CPU 110 and the power control section 190, and erases the display screen as shown in Part (g) of FIG. 7 by cutting off power supplied to the LCD control section 105, the LCD 120 and the like to notify that the data transmission has been completed.

In this case, power from the battery Bt is being continuously supplied to the transmitting section Tx, the memory card I/F 107 and the transmission data management control section 113 even after the power switch 19 is turned off. Power-off processing of these portions will be performed when the processing of this flow advances to step S319.

With the configuration of the second embodiment, when there are unsent image files that should have been transmitted, the image files will be transmitted in response to an off-operation of the power switch 19. Therefore, backup image files will be recorded on the storage section of a home personal computer without attracting the attention of the user. In addition, since a power-off processing is performed after completion of the transmission of the image files, power will no longer be wastefully consumed.

As described above, in a mobile device equipped with a transmitting function to transmit data, a mobile device may be achieved that suppresses wasteful power consumption and reliably creates backup data without having a user be aware of the data being created.

Functions of the digital camera of the first embodiment and the digital camera of the second embodiment that are related to the present invention will now be individually described.

First, descriptions will be provided on the functions of the state transition notification section and the transmission completion notification section according to the present invention.

As described above, these functions are configured by the CPU 110, the LCD control section 105, the OSD 1051 and the LCD 120.

When the transmission-during-power-off mode is activated, since data transmission is performed after an off-operation of the power switch 19, the user has no idea what the transmission state of the data transmission is. Therefore, the digital camera according to the first or second embodiment has been equipped with a notification function that performs notifications to the user upon transition to the transmission-during-power-off mode and upon completion of data transmission by the transmitting section Tx.

Both the first and second embodiments are arranged so that a notification of a transition to the transmission-during-power-off mode is made to the user by displaying the transition on the display screen 1201 provided at the LCD 120, and additionally by using sound, vibration and light.

Therefore, as shown in FIG. 2, a speaker unit SP for notifying by sound and a vibrator unit VR for notifying by vibration are provided. In addition, the arrangement also enables notification to the user by light, using a flash emission control section FL0 and a flash section which emit flashes. This example is arranged so that, in response to a setting state of "operations upon transmission completion", indicated in the last row in Part (b) of FIG. 4, the CPU 110 is able to control the speaker unit SP, the vibrator unit VR, or the flash emission control section FL0 to notify the user of completion of transmission using either sound, vibration or light.

Figure 8:
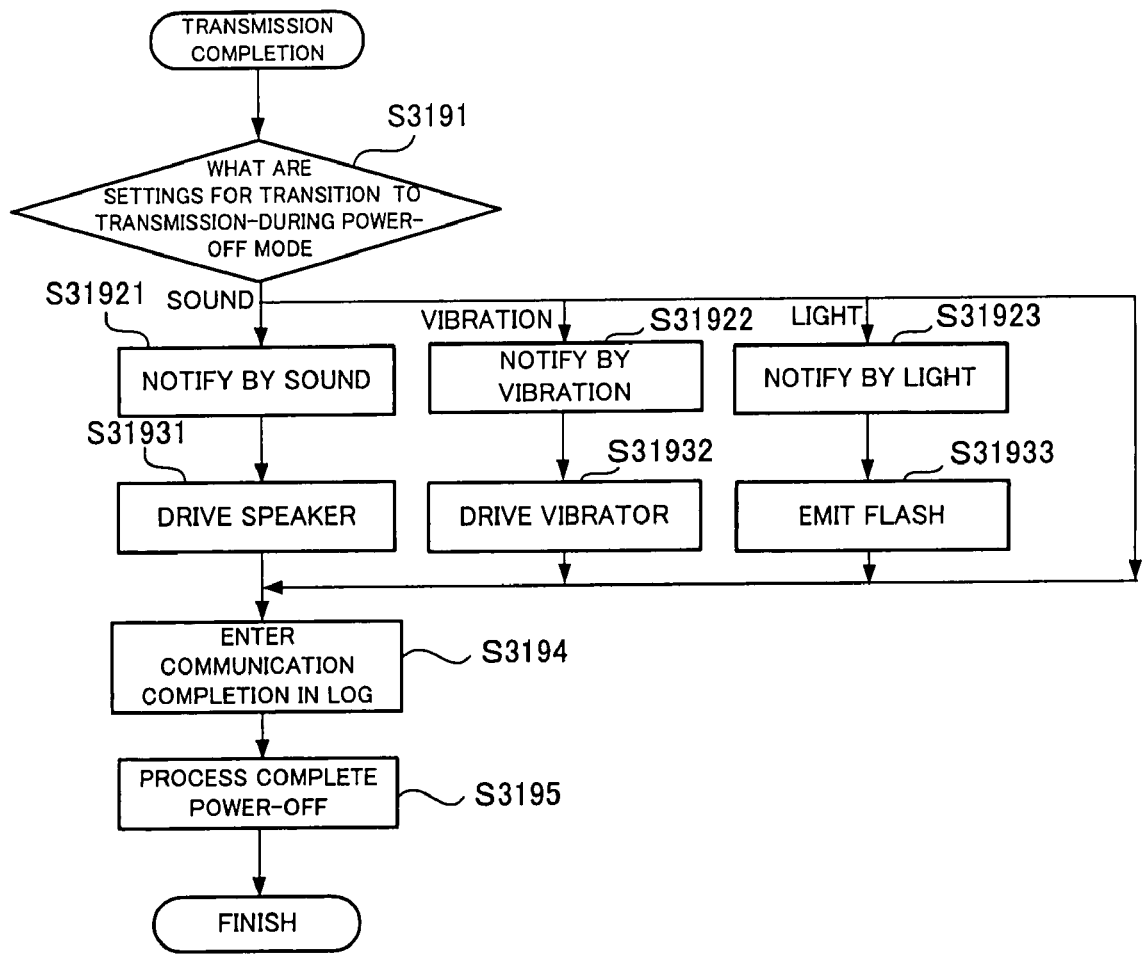
FIG. 8 is a flowchart showing a procedure of completion notification processing under the transmission-during-power-off mode, performed by the CPU 110.

FIG. 8 is a flowchart showing a procedure of completion notification processing under the transmission-during-power-off mode, performed by the CPU 110.

FIG. 8 shows details of the processing of step S319 shown in FIG. 3. For the processing of this flow, processing according to the setting contents of "operations upon transmission completion" shown in the last row of Part (b) of FIG. 4 is performed. Since "notification by sound" is set in Part (b) of FIG. 4, in the following description, it will be assumed that sound is set.

A procedure of the processing will now be described with reference to FIG. 8.

The processing of this flow commences after transmission is completed in step S318 and the process advances to step S319.

In step S3191, if it is determined that "notify by sound" is set, the procedure proceeds to a sound-side to instruct the speaker unit SP that notification will be made by sound in step S31921 to have the speaker unit SP notify the user of transmission completion using sound in step S31931. In step S3194, the data transmission management control section 113 is induced to store the file name of a transmitted image file onto a non-volatile memory, and a complete power-off processing is performed in the next step S3195, thereby concluding the processing of this flow.

Additionally, in step S3191, if it is determined that "notify by vibration" has been set via an operation, the procedure proceeds to a vibration-side (step S31922) and vibrates the vibrator VR in step S31932. The processing of this flow is concluded after performing the processing of steps S3194 to S3195.

Furthermore, in step S3191, if it is determined that "notify by light" has been set via an operation, the procedure proceeds to a light-side (step S31923). Light is emitted by having the flash control section FL0 control the flash section FL1 (step S31933), and the processing of steps S3194 to S3195 is performed to conclude the processing of this flow.

Moreover, when it is determined in step S3191 that no settings have been made, the procedure skips steps S31921 through S31923 and proceeds to step S3194, at which the transmission management section 113 is induced to store the file name of a transmitted image file onto the non-volatile memory 112, and a complete power-off processing is performed in the next step S3195, thereby concluding the processing of this flow.

Figure 9:
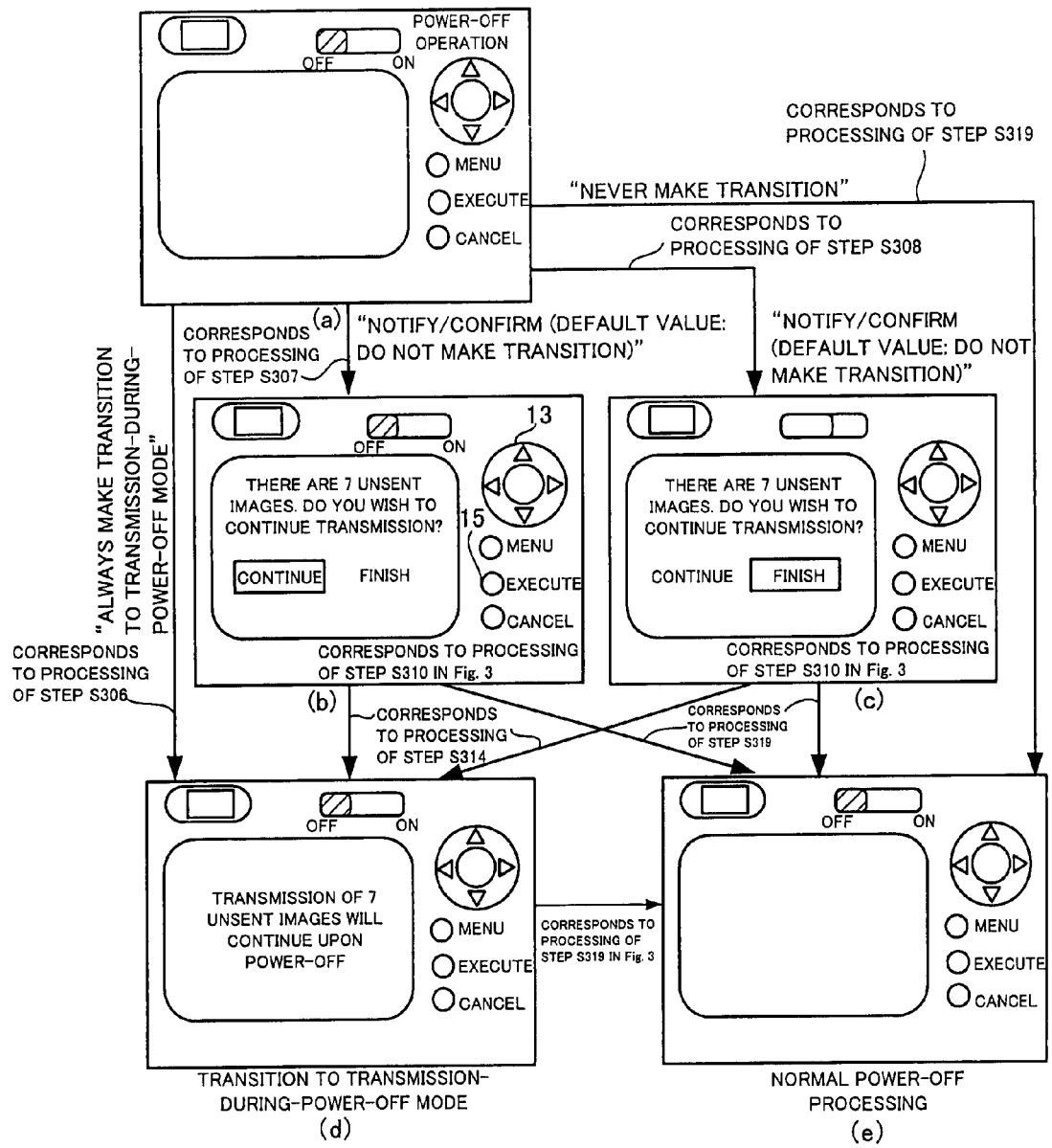
FIG. 9 is a diagram describing processing of a state transition notification section configured by the CPU 110, the power control section 190, an OSD 1051, an LCD control section 105 and an LCD 120.

FIG. 9 is a diagram describing processing of the state transition notification section configured by the CPU 110, the power control section 190, the OSD 1051, the LCD control section 105 and the LCD 120.

FIG. 9 shows how the display screen switches over according to how "operations during power-off" shown in Part (b) of FIG. 4 or, in other words, how a transition setting to the transmission-during-power-off mode has been made via user operation. The screens shown in FIG. 9 respectively represent screens when the processing of step S306, S307, S308 or S309 has been performed according to setting contents.

For clarity, the following description will begin with the assumption that the current state is the same setting state as described with reference to FIG. 5 or, in other words, a state in which the "operation during power-off" field shown in Part (b) of FIG. 4 is set to "transmit (verify)".

When "transmit (verify)" is set as the operation upon power-off shown in Part (b) of FIG. 4, a screen shown in Part (a) of FIG. 9 first switches over to a screen shown in Part (b) of FIG. 9 in response to an off-operation of the power switch 19, as described with reference to FIG. 5. On this display screen, when "continue" is selected via an operation of the direction key 13 or the like, the screen switches over to Part (d) of FIG. 9 (refer to Part (g) of FIG. 5), then to Part (e) of FIG. 9 (refer to Part (h) of FIG. 5), and so on. In addition, when "finish" is selected on the screen shown in Part (b) of FIG. 9 via an operation of the direction key 13 or the like, the screen immediately switches over to Part (e) of FIG. 9.

Furthermore, as described above, with the sole exception being the difference in default settings, the same processing will be performed in steps S307 and S308. This difference is clearly indicated in FIG. 9 by the position of a cursor (frame). If the default setting is the setting shown in Part (c) of FIG. 9, the screen shown in Part (a) of FIG. 9 switches over to the screen shown in Part (c) of FIG. 9 in response to an off-operation of the power switch 19.

When "finish" is selected on the screen shown in Part (b) or Part (c) of FIG. 9, the screen switches over to the screen shown in Part (e) of FIG. 9. When "continue" is selected on the screen shown in Part (b) or Part (c) of FIG. 9 via operations of the direction key 13 or the like, the screen switches over to the screen shown in Part (d) of FIG. 9, and then to the screen shown in Part (e) of FIG. 9.

In addition, when the operation upon power-off shown in Part (b) of FIG. 4 is set to, for instance, "no verification (always transmit)", the screen immediately switches over from the screen shown in Part (a) of FIG. 9 to that shown in Part (d) of FIG. 9, at which data transmission is performed. Once data transmission is completed, the screen switches over to that shown in Part (e) of FIG. 9.

Furthermore, when the operation upon power-off shown in Part (b) of FIG. 4 is set to, for instance, "do not transmit", the screen unconditionally switches over to the screen shown in Part (e) of FIG. 9.

As seen, by utilizing the functions of the state transition notification section and the transmission completion notification section according to the present invention to enable various notifications to be made to the user in response to user operations, the usability of the digital camera may be further improved.

In the digital camera according to the present embodiment, since data transmission from the transmission-during-power-off mode is performed without attracting the attention of the user, the transmission data management control section 113 is provided as described earlier in order to manage data transmission states.

A description will now be provided as to what kind of management is performed by the transmission data management control section 113.

Figure 10:
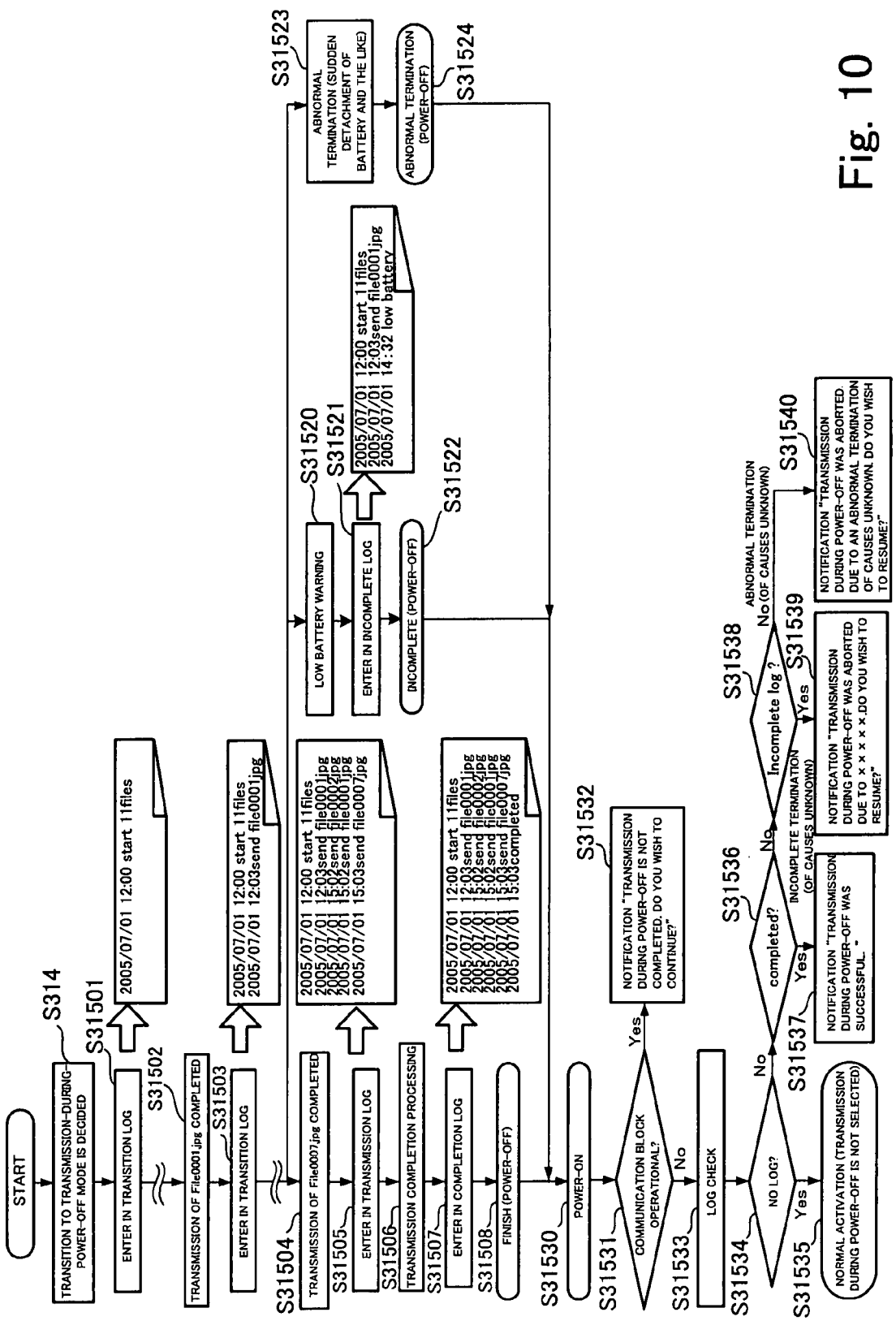
FIG. 10 is a diagram describing details of the processing of step S315 shown in FIG. 3.

FIG. 10 is a diagram for describing details of the processing of step S315 shown in FIG. 3.

In the processing of step S315, the CPU 110 and the power control section 190 instruct the transmission data management control section 113 to enter names of transmitted image files as transmission history to the transmission log section 1121 inside the non-volatile memory 112. Since a form containing historical entries is shown for clarity in FIG. 10, the term "enter" will be used hereinafter in place of terms such as "write in" or "record" to signify an entry made on a log.

Entry processing to the transmission log section 1121 of the non-volatile memory 112, which the CPU 110 induces the transmission data management control section 113 to perform, will now be described with reference to FIG. 10.

When a transition to the transmission-during-power-off mode is determined in step S314, a transition log indicating how many image files (four, in the case shown in FIG. 10) the transmission data management control section 113 will be induced to transmit is first entered in the transmission-during-off log section 1121 in the non-volatile memory 112 in step S31501. In the following step S31502, the transmitting section Tx is induced to transmit the image files to, for instance, a home personal computer. The CPU 110 acknowledges completion of the transmission by the transmitting section Tx from a completion notification issued by the transmitting section Tx, and instructs the transmission data management control section 113 to enter a transition log indicating the completion of the transmission and a transition to transmission processing of a new image file to be transmitted into the transmission-during-off log section 1121 in the non-volatile memory 112.

The processing from step S31502 to step S31503 is processing that the CPU 110 and the power control section 190 induce the transmission data management control section 113 to repetitively perform on the four images files to be transmitted, namely: File0001.jpeg, File0002.jpeg, File0005.jpeg and File0007.jpeg. For each image, the transmission data management control section 113 is instructed to enter a transmission completion log into the transmission-during-off log section 1121 in the non-volatile memory 112 in the same manner as with the first image file File0001.jpeg.

After completion of transmission of the last file File0007.jpg in step S31504 and the transmission log is entered by the transmission data management control section 113 in step S31505, transmission completion processing is performed in step S31506. In the next step S31507, the transmission data management control section 113 is instructed to enter a text stating "completed" that indicates a normal completion into the transmission-during-off log section 1121 in the non-volatile memory 112 as a transmission completion log.

The procedure proceeds to step S31508 in which the power control section 190 instructs the DC/DC 191 to perform complete power-off processing that cuts off power supplied to each section. The process is interrupted at this point.

Additionally, for this example, when having the transmitting section Tx perform the processing of steps S31501 to S31506, an instruction for commencement is issued to the transmission section Tx, which then performs transmission on its own. Meanwhile, the CPU 110 and the power control section 190 monitor the state of the battery Bt, and when an abnormality is found around the battery during the processing of steps S31520 to S31524, the DC/DC 191 is instructed to perform a power-off processing even in an incomplete state in which the transmission is not yet completed. Therefore, the flow indicates that the processing of steps S31520 to S31524 is performed parallel to the transmission processing. When a battery check is performed in step S31520 and a drop in the voltage of the battery Bt is detected, a text stating "Low Battery" is entered in step S31521 in the transmission-during-off log section 1121 as an incomplete log, and a power-off processing is performed to interrupt processing. In addition, when an abnormality such as a sudden removal of the battery or the like occurs in step S31523, the processing is interrupted as an abnormal termination without performing power-off processing.

At this point, if the power switch 19 is once again operated to the On-side (step S31530), a check is performed on whether the transmitting section Tx is operational (step S31531). In this step S31531, if, for some reason, it is determined that the transmitting section Tx is transmitting image files, the procedure proceeds to a Yes-side and arranges an inquiry reading "Transmission during power-off has not completed. Continue?" to be displayed on the display screen 1201 in step S31532. In this step S31532, when either the execution key or the cancel key is operated, processing according to the operation will be performed, and image taking processing or playback processing will be subsequently performed.

In step S31531, if it is determined that power-off processing has been properly performed by the transmitting section Tx and the same is inoperative, the procedure proceeds to a No-side and references the transmission-during-off log section 1121 in the non-volatile memory 112 to perform a check (log check) on whether a log has been entered in step S31533.

After proceeding to step S31534, if no logs have been recorded and a "no log" is determined, the procedure proceeds to a Yes-side. In step S31535, a normal activation of the image taking mode or the playback mode is performed on the assumption that transmission during power-off has not been selected.

When it is determined in step S31534 that a log has been recorded, the procedure proceeds to a No-side, and in step S31536, a determination is performed on whether a text reading "completed" has been entered. When it is determined in step S31536 that a text reading "completed" has been entered, the procedure proceeds to a Yes-side, and arranges "Transmission during power-off was successful" to be displayed on the display screen in step S31537 to conclude the processing of this flow.

When it is determined in step S31536 that a text reading "completed" does not exist, the procedure proceeds to a No-side, and determines in step S31538 whether an "incomplete log" (refer to step S31521) has been entered. If so, the procedure proceeds to a Yes-side and arranges "Transmission during power-off was aborted due to xxxx. Do you wish to resume?" to be displayed in step S31539 to conclude the processing of this flow.

If it is determined in step S31538 that an "incomplete log" does not exist, the procedure proceeds to a No-side and arranges "Transmission during power-off was aborted due to an abnormal termination of causes unknown" on the assumption that an abnormal termination of causes unknown has occurred in step S31540, and concludes the processing of this flow.

The CPU 110, the power control section 190, the LCD control section 105, the LCD 120, the OSD 1051, the transmission data management control section 113, and the non-volatile memory 112, which are involved in the processing of this flow, correspond to the transmission result notification section according to the present invention.

The above arrangement of the transmission result notification section according to the present invention makes it possible to provide the user with effective information, since the user may now easily understand whether the transmission performed by the transmitting section Tx had resulted in a normal termination or an abnormal termination.

Figure 11:
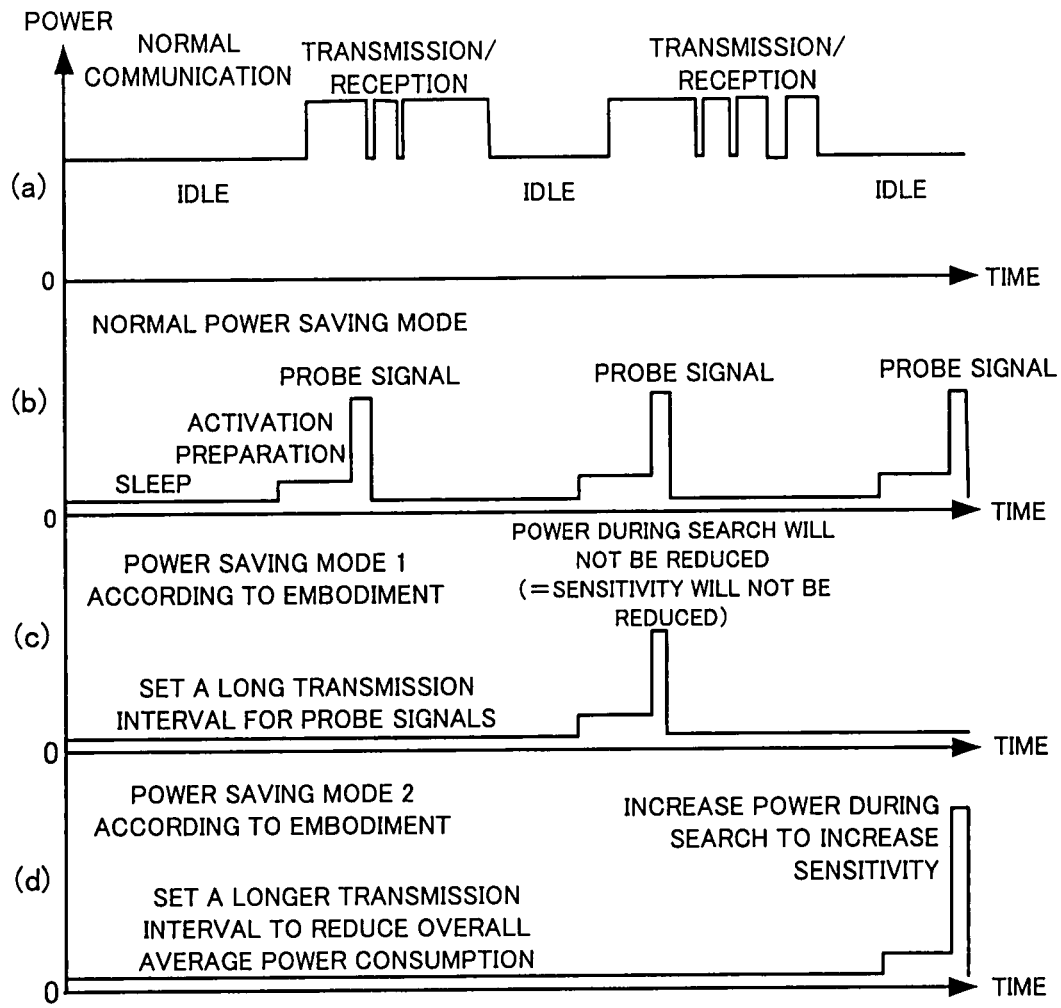
FIG. 11 is a diagram describing transmission processing during power saving mode, performed by a wireless control section Tx2 provided at a transmitting section Tx during power-off.
Figure 12:
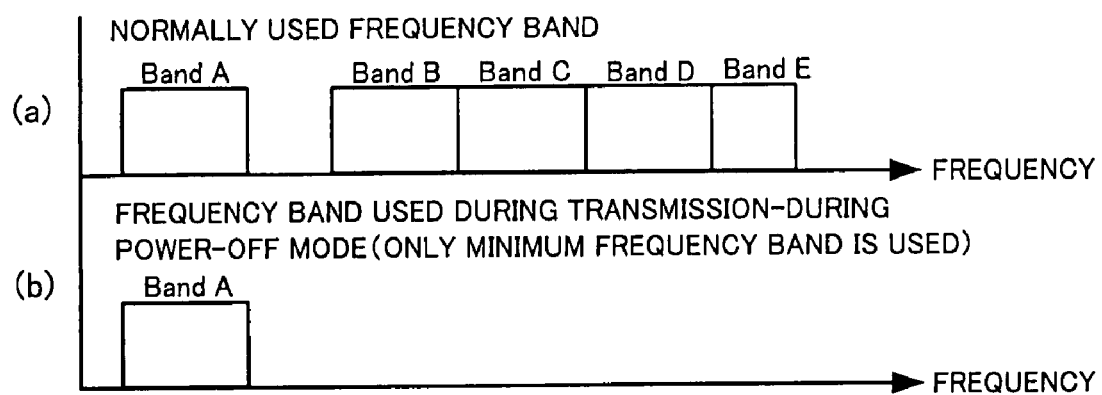
FIG. 12 is a diagram describing transmission processing during power saving mode, performed by the wireless control section Tx2 provided at the transmitting section Tx during power-off.

FIGS. 11 and 12 are diagrams describing transmission processing during power saving mode, performed during power-off by the wireless control section Tx2 provided at the transmitting section Tx. As described above, the wireless control section Tx2 in the transmission-during-power-off mode, in which data transmission is performed by the transmitting section Tx after a power-off operation of the power switch 19, corresponds to the power saving control section that performs power saving while maintaining receiver sensitivity.

A description will be provided on how the wireless control section Tx2 achieves power saving, with reference to FIG. 11.

Part (a) of FIG. 11 shows a state of change of the power consumption of the digital camera 1 in the event that the transmitting mode has been selected via an operation and transmission is performed when the power switch 19 has been operated to the on-side and a normal operation state exists. When the power switch 19 has been operated to the on-side and a normal operation state exists, data transmission is performed by pointing the antenna in the direction of the transmission and after confirming the destination through transmission and reception.

At this point, if the power switch 19 is operated to the off-side, each circuit including the power control section (and the CPU 110) enters sleep mode. Since power consumption is reduced during sleep mode, merely entering this mode will achieve effective reduction of power consumption.

In the first embodiment, when the power switch 19 is operated to the off-side, transmission is continued by performing a transition to the transmission-during-power-off mode. However, since a digital camera is typically carried around by the user, there may be cases in which the digital camera is carried to a location that does not allow transmission. In such cases, a transmission of a probe signal for searching will be required to establish communication with a destination.

Additionally, in the second embodiment, since data transmission is commenced upon an off-operation of the power switch 19, transmission of a probe signal for searching a transmission destination is essential.

In this respect, the power control section 190 attempts to reduce power consumption by instructing the transmitting section Tx to change transmission intervals of the probe signal when a transition is made to the transmission-during-power-off mode.

Part (b) of FIG. 11 shows a state in which transmission intervals of the probe signal have been adjusted by a conventional power saving control function.

The present embodiment attempts to achieve further reduction in power consumption by further spreading the transmission intervals of the probe signal of the state shown in Part (b) of FIG. 11 in response to an off-operation of the power switch 19.

Part (c) and Part (d) of FIG. 11 show how much power consumption is suppressed as compared to Part (a) of FIG. 11 when a wireless control section Tx0, which corresponds to the power saving control section according to the present invention, performs power saving while maintaining receiver sensitivity during transmission-during-power-off mode, in which data transmission is performed by the transmitting section Tx after a power-off operation of the power switch 19.

Part (c) and Part (d) of FIG. 11 show that power saving effects are enhanced by having the wireless control section Tx2 spread the transmission/reception intervals of the probe signal for communication destination search.

The transmitting section Tx according to the present embodiment is equipped with two power saving modes. Part (c) of FIG. 11 shows transmission intervals of a probe signal according to power saving mode 1, while Part (d) of FIG. 11 shows transmission intervals of a probe signal according to power saving mode 2. Part (d) of FIG. 11 shows a state in which the power of the probe signal has been increased in consideration of the fact that an increase in the transmission interval, as compared to power saving mode 1, results in a reduction of average power over time.

As seen, an advantage may be gained in that the wider the transmission/reception interval, the greater the reduction of an average power consumption over time. In addition, even if the transmission search frequency is lengthened, since a communication path will be reliably established at some point when, for instance, moving closer to home with the digital camera, no problems will occur unless the frequency is too long.

Furthermore, depending on the type of the wireless I/F Tx1, power saving may be achieved by restricting the frequency used for transmission instead of spreading the transmission/reception interval of the probe signal.

FIG. 12 is a diagram describing a case in which power saving is achieved by restricting frequencies.

As shown in Part (a) of FIG. 12, when multiple working bands (frequency bands) Band A to Band E are available, power saving may be performed in a preferable fashion during transmission-during-power-off mode by transmitting probe signals using any one of the bands (for instance, Band A) as shown in Part (b) of FIG. 12.

Although the digital camera shown in FIG. 1 has a built-in antenna, directivity may be easily acquired when using an antenna that protrudes to the outside. However, since a digital camera is typically carried around, an antenna that stays protruding out during power-off is susceptible to damage.

In a case in which an antenna is arranged on the digital camera, the antenna preferably has directivity since the user will then be able to freely point the antenna in various directions when the power switch is operated to the on-side. After transition to the transmission-during-power-off mode, an antenna with omni-directivity is preferable so that transmission is performed towards all directions. Therefore, an antenna drive section that freely changes the directivity of the antenna between power-on and power-off may conceivably be provided.

Figure 13:
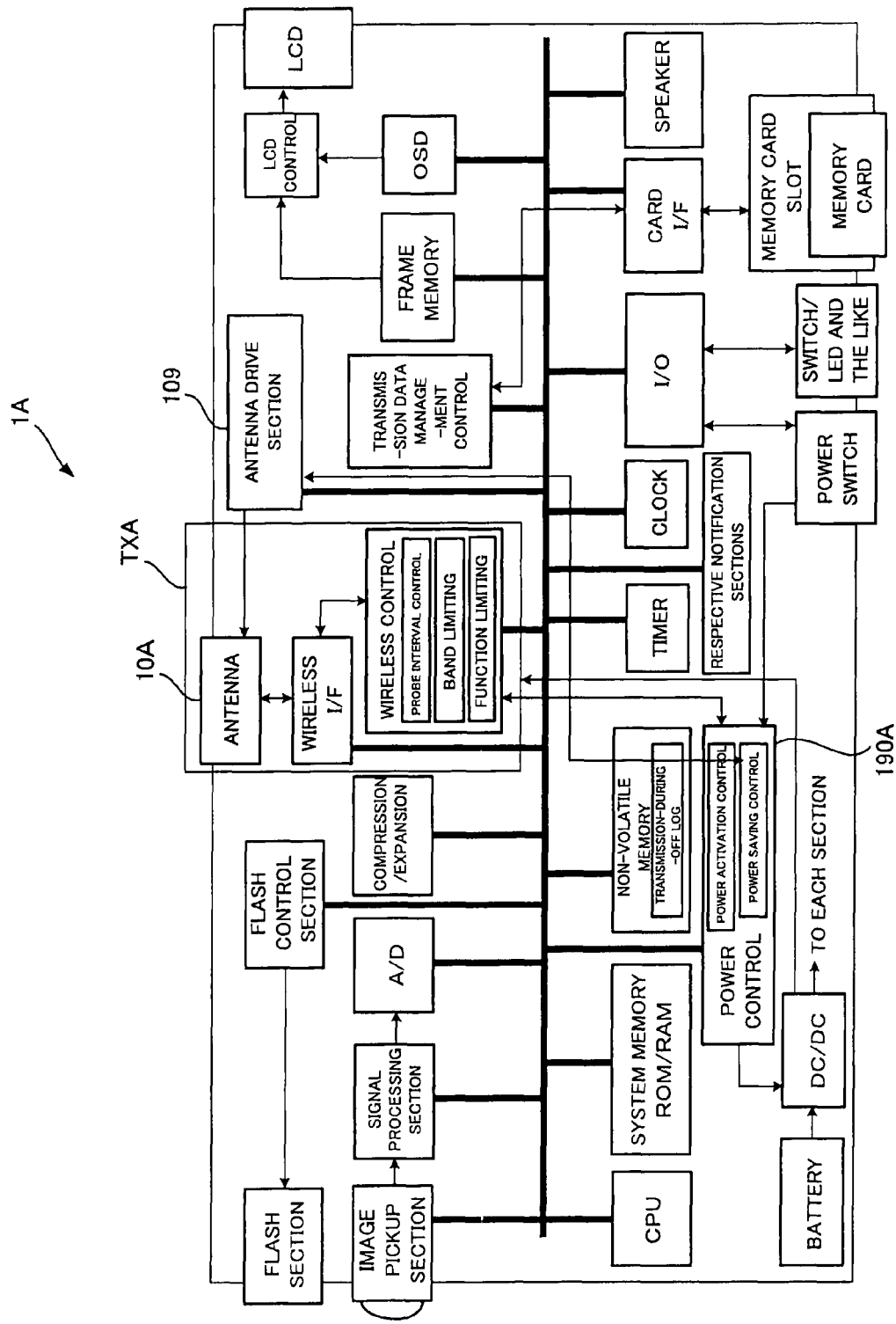
FIG. 13 is a diagram describing a digital camera provided with an antenna drive section.
Figure 14:
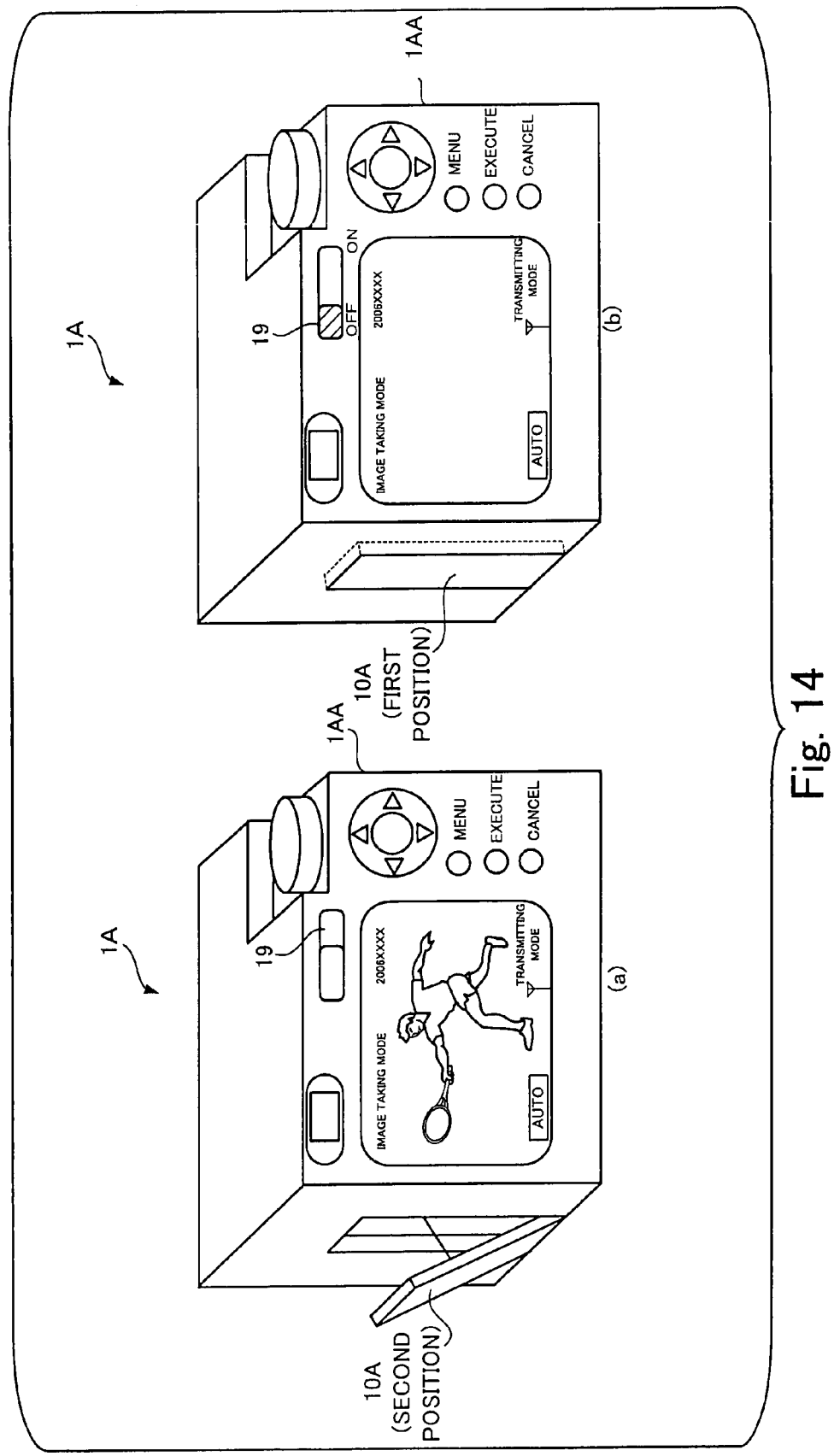
FIG. 14 is a diagram showing an external view of the digital camera provided with the antenna drive section shown in FIG. 13.

FIGS. 13 and 14 are diagrams describing an example in which a digital camera 1A is equipped with an antenna drive section 109.

FIG. 13 shows an example in which the antenna drive section 109 has been added to the configuration shown in FIG. 2.

In addition, FIG. 14 shows an example of an antenna 10A that is driven by the antenna drive section 109. The antenna 10A shown in FIG. 14 is an antenna that is movable between a first position having a small volume of projection from the chassis 1AA of the digital camera 1A and a second position having a large volume of projection from the chassis 1AA, and is configured so that the antenna drive section 109 moves the antenna 10A to the first position in response to a transition to the transmission-during-power-off mode in which a transmitting section TxA performs data transmission after a power-off operation of the power switch 19. In this case, a power control section 190A is arranged to issue a drive instruction to the antenna drive section 109 to integrally incorporate the antenna 10A into the chassis 1AA (in other words, to drive the antenna to the first position) when a transition is made to the transmission-during-power-off mode.

Since the antenna 10A is integrated with the chassis 1AA after the power switch 19 is operated to the off-side, the risk of the antenna being damaged when the digital camera 1A is carried around will be reduced. In addition, after an on-operation of the power switch 19, since the antenna drive section 109 drives the antenna 10A to the second position at which the antenna 10A is projected, the directivity of the antenna 10A may be narrowed as compared to a state in which the antenna is incorporated into the chassis by, for instance, arranging the chassis 1AA to act as a reflector.

A wide variety of configurations besides that shown in FIG. 14 may be considered to either narrow or widen the directivity of the antenna.

Figure 15:
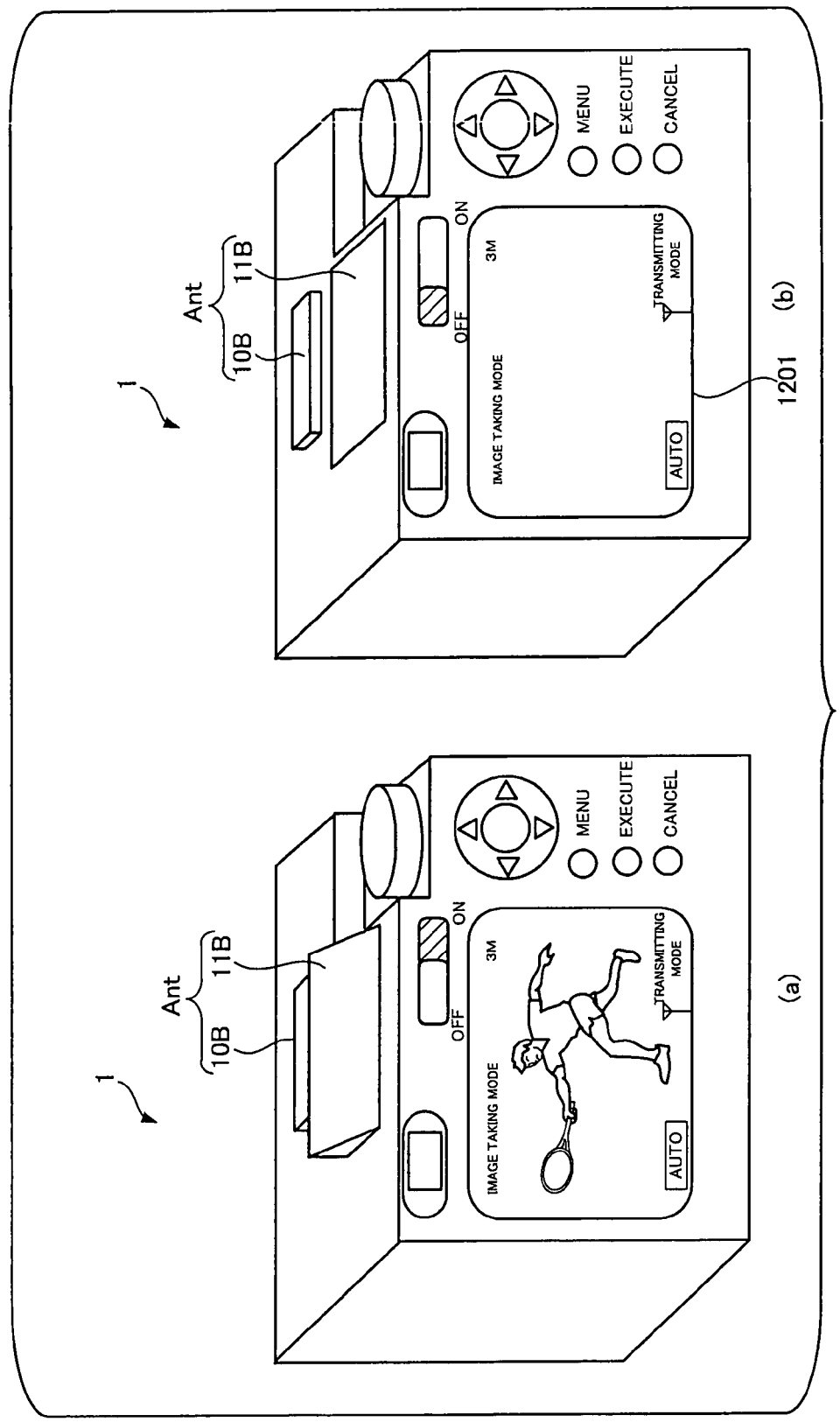
FIG. 15 is a diagram showing an exemplary arrangement for adjusting the directivity of the antenna that differs from the configuration shown in FIG. 14.

FIG. 15 is a diagram showing an example of an arrangement for adjusting the directivity of the antenna, which differs from the configuration shown in FIG. 14.

In the configuration, the transmitting section is provided with an antenna Ant in which a fixed antenna primary radiating element 10B for wireless communication, and a movable antenna secondary element 11B that controls at least a directivity of communication by the antenna primary radiating element 10B. In response to a transition to the transmission-during-power-off mode in which the transmitting section performs data transmission after a power-off operation of the power switch 19, the antenna drive section moves the antenna secondary element 11B so that the directivity of the communication by the antenna primary radiating element 10B spreads in a direction that approximates omni-directivity.

The above configuration may be employed.

Figure 16:
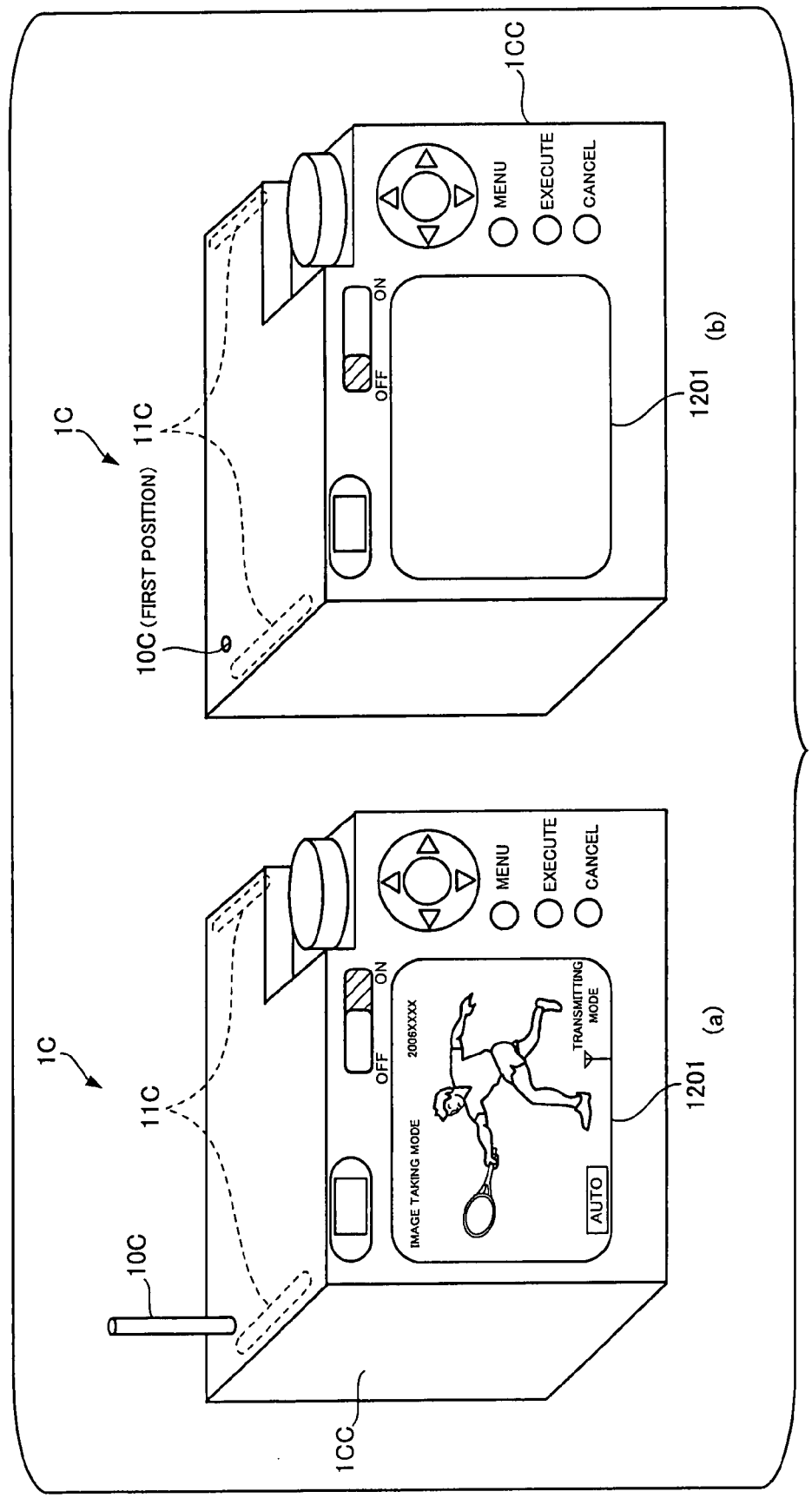
FIG. 16 is a diagram showing yet another modification.

FIG. 16 is a diagram showing yet another modification.

The transmitting section is provided with a movable antenna 10C that is movable between a first position having a small volume of projection from a chassis 1CC of this mobile device and a second position having a large volume of projection from the chassis 1CC and which functions as an antenna at the second position, and a fixed antenna 11C that is fixed onto and built into the chassis 1CC of this digital camera. The transmitting section is arranged so that the movable antenna 10C is moved to the first position (embedded into the chassis) by the antenna drive section in response to a transition to the transmission-during-power-off mode in which the transmitting section performs data transmission after a power-off operation of the power switch 19. This configuration may be employed.

Figure 17:
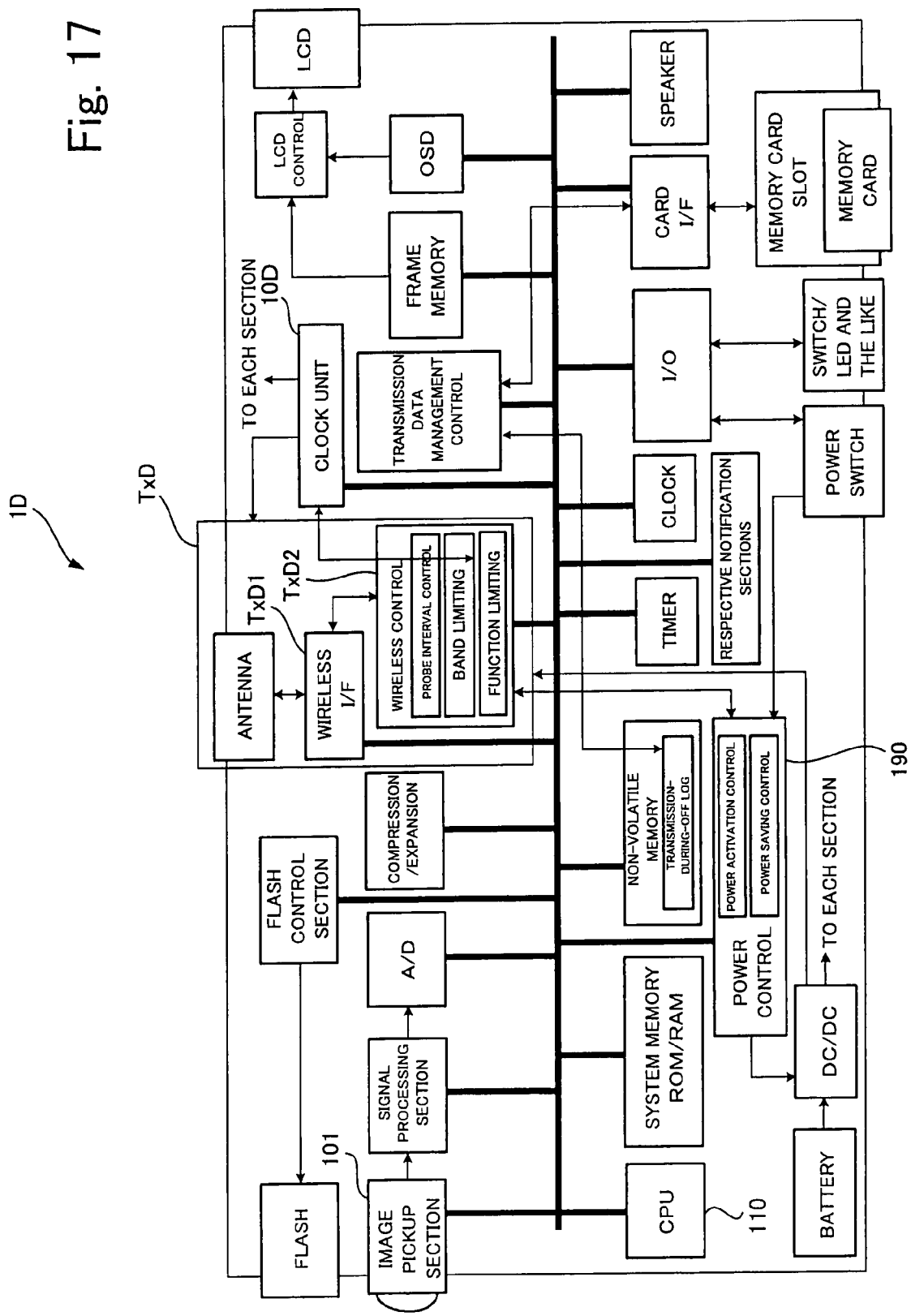
FIG. 17 is a diagram describing a function for restricting communication functions, provided at a wireless control section TxD2.
Figure 18:
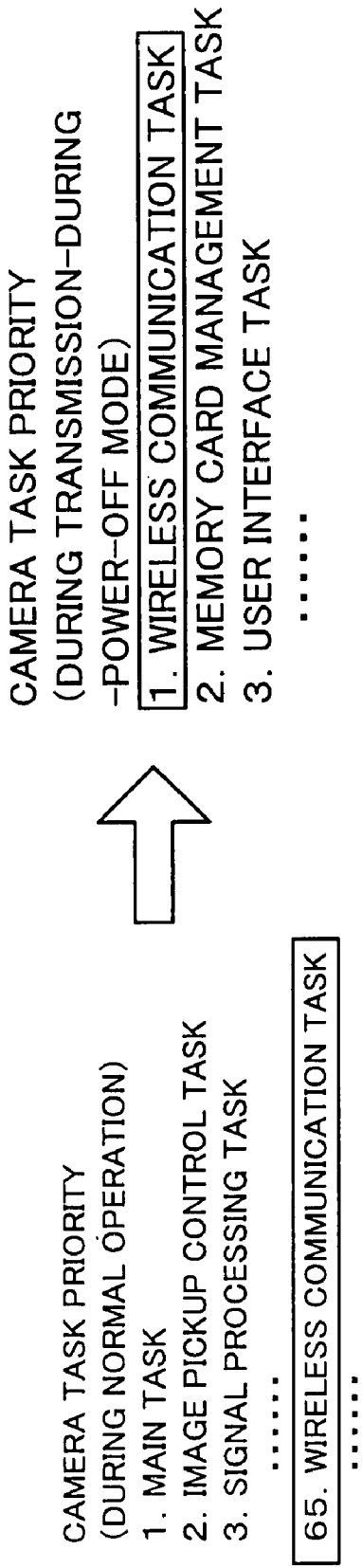
FIG. 18 is a diagram describing another function for restricting communication functions, provided at the wireless control section TxD2.

FIGS. 17 and 18 are diagrams describing a function that restricts communication functions of a wireless control section TxD2 that is provided at a transmitting section TxD.

Figure 19:
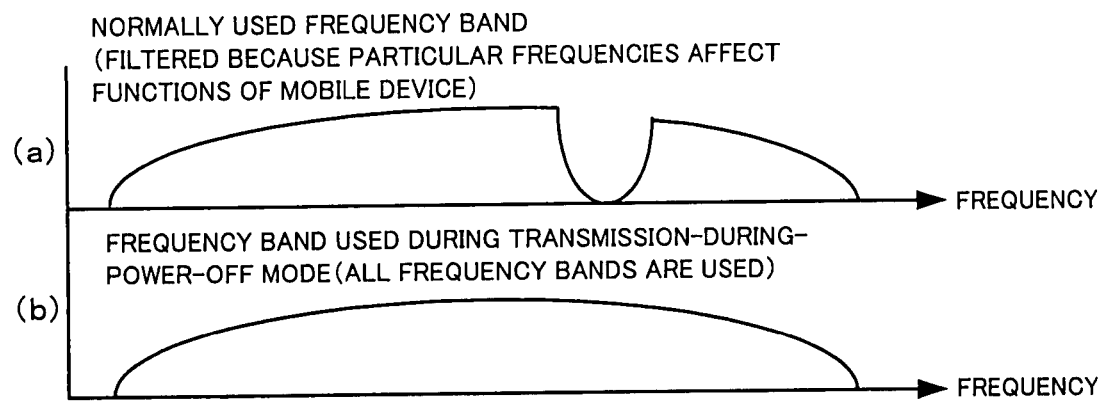
FIG. 19 is a diagram describing yet another function for restricting functions, provided at the wireless control section.

FIG. 17 shows an internal configuration, similar to that of the digital camera shown in FIG. 2, to which a clock unit 10D has been added. In addition, FIG. 18 is a diagram describing a function that restricts functions. Furthermore, FIG. 19 is a diagram describing another function that restricts functions, which is provided at the transmitting section.

FIG. 18 shows a difference between a priority sequence of tasks executed by the CPU during normal operation and a priority sequence of tasks executed by the CPU during transmission-during-power-off mode. As shown in FIG. 18, during normal operation, processing of main tasks is given priority, followed by the execution of processing of image taking processing tasks and signal processing tasks. When the power switch is operated to the off-side at this point, the priority of the wireless communication task, which had a low priority during power-on, is elevated and the wireless communication task will be executed immediately.

At this point, for instance, the power control section 190 (refer to FIG. 17) may be configured to issue an instruction to lift the restriction on the transmitting function of the transmitting section TxD in response to a transition to the transmission-during-power-off mode in which the transmitting section performs data transmission after a power-off operation of the power switch 19, in order to extract maximum transmitting capabilities of the transmitting section Tx when performing transmission.

For instance, the clock frequency outputted from the clock unit 10D to the transmitting section Tx may be set to a low frequency in order to prevent adverse effects during normal operation to a clock supplied to the image pickup device that is provided at the image pickup section 101 or to the CPU 110. In such a case, in consideration of the fact that the image pickup device is inoperative when an operation to the power-off-side is performed, the clock frequency may be switched to a maximum frequency when having the transmitting section TxD perform transmission.

Furthermore, as shown in FIG. 19, since a particular frequency has an adverse effect on any of the circuits inside the main body, frequency bands that are normally band-limited via filtering may be released during transmission-during-power-off mode.

In consideration of the features of a digital camera according to the present invention heretofore described, advantages gained by taking images with this digital camera will finally be described.

Figure 20:
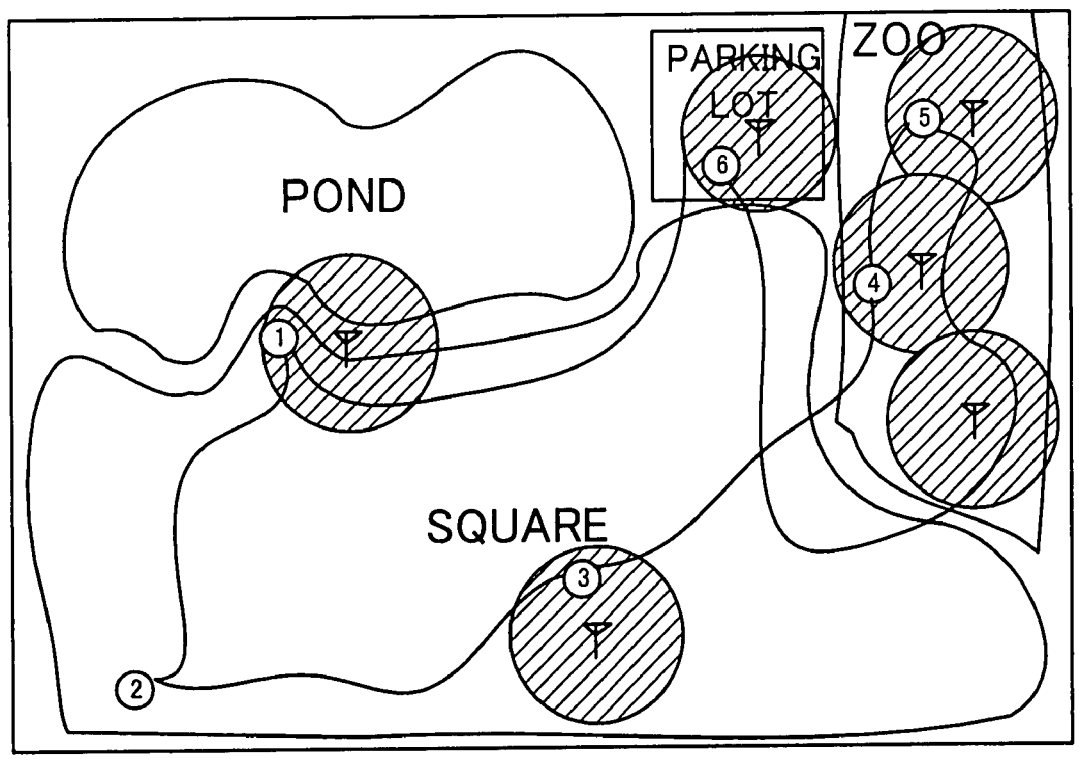
FIG. 20 is a diagram describing a local geography of a location visited with a digital camera according to the present invention to take images.
Figure 21:
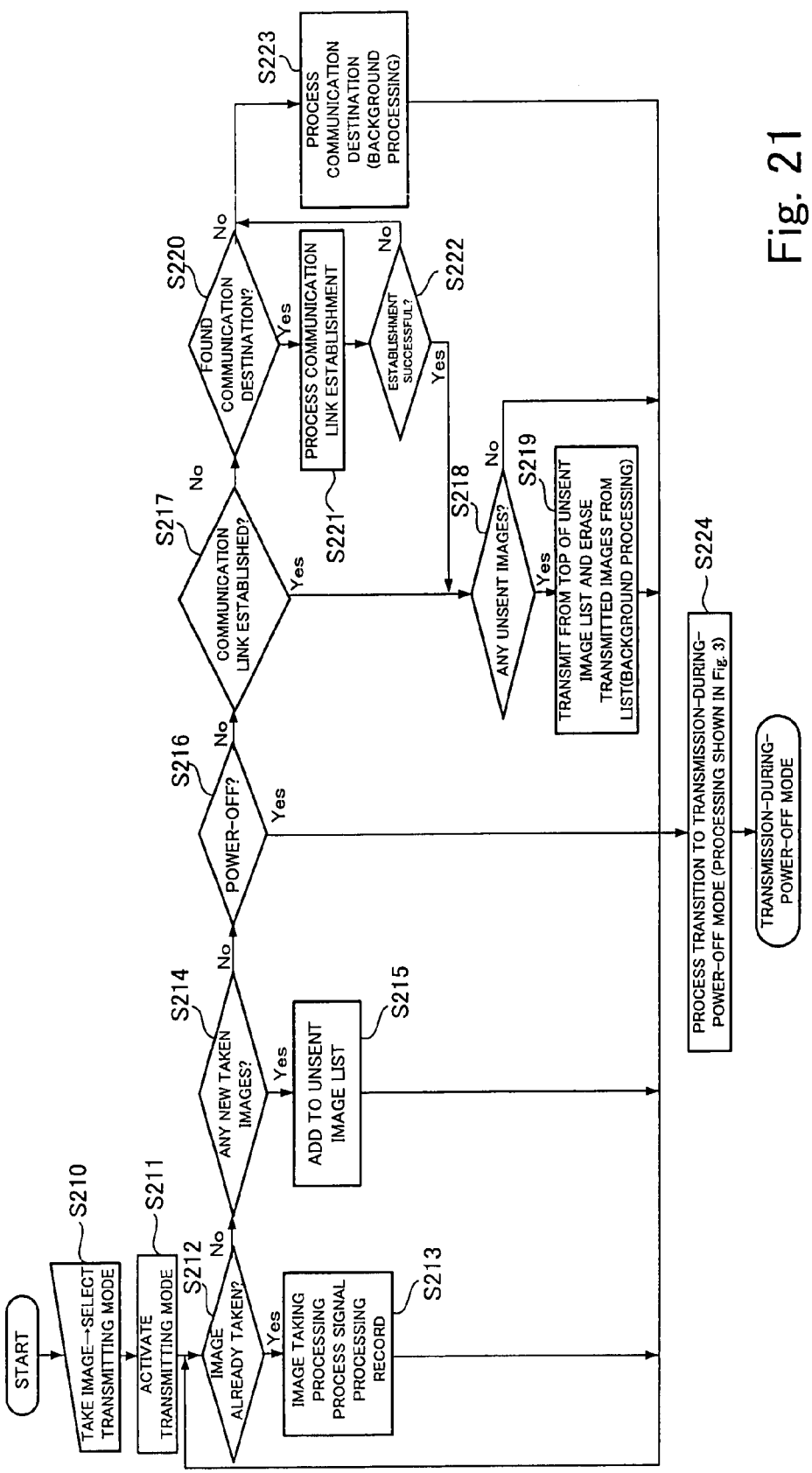
FIG. 21 is a flowchart showing a procedure of image taking processing performed by the CPU and the power control section inside the digital camera and a procedure of data transmission under the transmitting mode when taking images at the location shown in FIG. 20.

With reference to FIGS. 20 and 21, a description will now be given on how backup data will be recorded onto a home personal computer when the digital camera according to the present invention is carried to a park or the like and image taking is performed.

FIG. 20 is a diagram describing a local geography of a location visited to perform image taking. FIG. 21 is a flowchart showing procedures of image taking processing performed by the CPU 110 inside the digital camera shown in FIG. 1 and processing related to a transition to the transmission-during-power-off mode performed by the CPU 110 and the power control section 190 when taking images with the digital camera.

FIG. 20 shows an example of a case in which a large number of wireless access points, arranged to be used freely, are in place. Transmission of image files to the home personal computer may be performed inside the regions indicated by the hatchings around each access point as shown in FIG. 20. FIG. 20 shows circled numbers 1 to 6 for distinguishing the various locations.

For instance, assume that a photographer is carrying the digital camera shown in FIG. 1, first takes eight images of a pond at location 1 shown in FIG. 20, subsequently switches to transmitting mode and transmits three image files, and proceeds to further transmit image files at which point the power switch 19 (refer to FIG. 1) of the digital camera is operated to the off-side.

The digital camera 1 transitions to the transmission-during-power-off mode in response to the off-operation of the power switch 19. At this point, when the photographer starts walking towards location 2, the photographer will move outside the communication area and a transition is made to the power saving control mode 1 or the power saving control mode 2 shown in FIG. 11.

The photographer takes four images at location 2 and switches to the transmitting mode. However, since there is no wireless access point at location 2, wireless transmission will not be performed even when switching to the transmitting mode, resulting in an increasing number of unsent image files.

Furthermore, as the photographer starts walking from location 2 towards the zoo-side, passing location 3 on the way, the photographer at one point will walk by a wireless access point at location 3. If the photographer stops here, communication will be established when a probe signal is transmitted via the wireless access point 3. However, if the photographer passes this location without stopping, since the digital camera is in the power saving control mode 1 or 2 described with reference to FIG. 11, it is likely that the photographer will pass by without communication being established.

As the photographer continues walking towards the zoo, since the vicinity of location 4 is within a communication area, a transmission destination is recognized via a transmission of a probe signal by the transmitting section provided in the digital camera, and transmission will be recommenced by the transmitting section. Assume now that five image files are transmitted, and there are two unsent image files at which point the power switch is operated to the on-side and ten images are taken.

Since the entire vicinity of the zoo is within a communication area in which communication may be established, if the photographer activates the transmitting mode at this point, transmits nine image files from the twelve image files consisting of ten image files taken at the zoo and two unsent image files, and walks towards the parking lot and thereby moves out from a communication area, three image files will remain as unsent image files.

Furthermore, since the photographer passes a communication area when continuing to walk towards the parking lot, for instance, two image files are transmitted. At this point, assuming that the photographer drives away without waiting for the transmission to be completed, the photographer soon moves out of a communication area, and one unsent image file will remain.

Upon returning to a studio, after confirming that the transmitted twenty-one image files are recorded onto the home personal computer, the photographer performs an operation to record the last image onto the personal computer, thereby reliably completing the creation of backup data.

As seen, by utilizing the transmission-during-power-off mode, creation of backup data may be performed without being aware of such creation, and any remaining data may be recorded in a simple manner.

FIG. 21 is a flowchart showing a procedure of processing performed by the CPU 110 and the power control section 190 inside the digital camera in the case described above.

In the event that the transmitting mode is selected when image taking is performed in step S210, the CPU 110 (refer to FIG. 1) activates the transmitting mode, in which data transmission is performed by the transmitting section Tx, in step S211. Determination is performed in the next step S212 on whether image taking was performed. If it is determined in step S212 that an image has been taken, the procedure proceeds to a Yes-side to perform image taking processing, signal processing and recording processing in step S213 to record image files not yet recorded on a memory card, and then returns to the processing of step S212.

If it is determined in step S212 that image taking was not performed, the procedure proceeds to step S214 where a determination is performed on whether there are newly taken images. If it is determined in step S214 that there are newly taken images, the procedure proceeds to a Yes-side to additionally record in an unsent image list written on a nonvolatile memory in step S215, and then returns to the processing of step S212.

Furthermore, if it is determined in step S214 that there are no newly taken images, the procedure proceeds to a No-side to determine whether the power switch has been operated to the off-side in step S216. If it is determined in step S216 that an off-operation of the power switch 19 was performed, the procedure proceeds to a Yes-side to commence transition processing in step S224 to the transmission-during-power-off mode, described with reference to FIG. 3.

At this point, if it is determined that the power switch has not been operated to the off-side, the procedure proceeds to step S217 to determine whether a communication link has been established. If it is determined in step S217 that a communication link is established, the procedure proceeds to a Yes-side to verify in step S218 whether there are unsent images using the unsent image list in the non-volatile memory. If it is determined in step S218 that unsent image files exist, the procedure proceeds to a Yes-side, and in step S219, commences transmission from the top of the unsent image list and deletes images in an order of completed transmissions from the unsent image list. The procedure returns to step S212 to repetitively perform the processing of steps S212 to S217.

If it is determined in step S217 that a communication link is not established, the procedure proceeds to a No-side, and in step S220 determines whether a destination has been found by a transmission of a probe signal. If it is determined that a destination has been found by the transmission of the probe signal, the procedure proceeds to a Yes-side, and in step S221, performs establishment processing of a communication link and determines whether the establishment was successful in step S222. In step S222, if it is determined that communication has been established by a negotiation with the destination according to a communication protocol, the establishment is determined as a success. The procedure then proceeds to a Yes-side to perform in sequence the processing of steps S218 and S219.

If it is determined in step S222 that communication is not established, the procedure proceeds to a No-side, and in step S223 arranges for a negotiation to be performed with the communication destination, and returns to step S212 while the negotiation is in progress.

By performing such processing, backup images will be reliably recorded into a home personal computer as described with reference to FIG. 20.

In addition, backup image files will also be reliably recorded into a home personal computer by first setting data transmission under the transmission-during-power-off mode to "do not transmit", and then switching to a "transmit"-side on the way home.

As described above, in a mobile device equipped with a transmitting function to transmit data, a mobile device may be achieved that suppresses wasteful power consumption and reliably creates backup data without having a user be aware of the data being created.

Some digital cameras are detachably mounted with a lens unit, equipped with an image taking optical system and an image pickup device, which generates image data. Such digital cameras receive image data from the lens unit to perform image processing at the camera main body, and perform recording onto a memory card.

Figure 22:
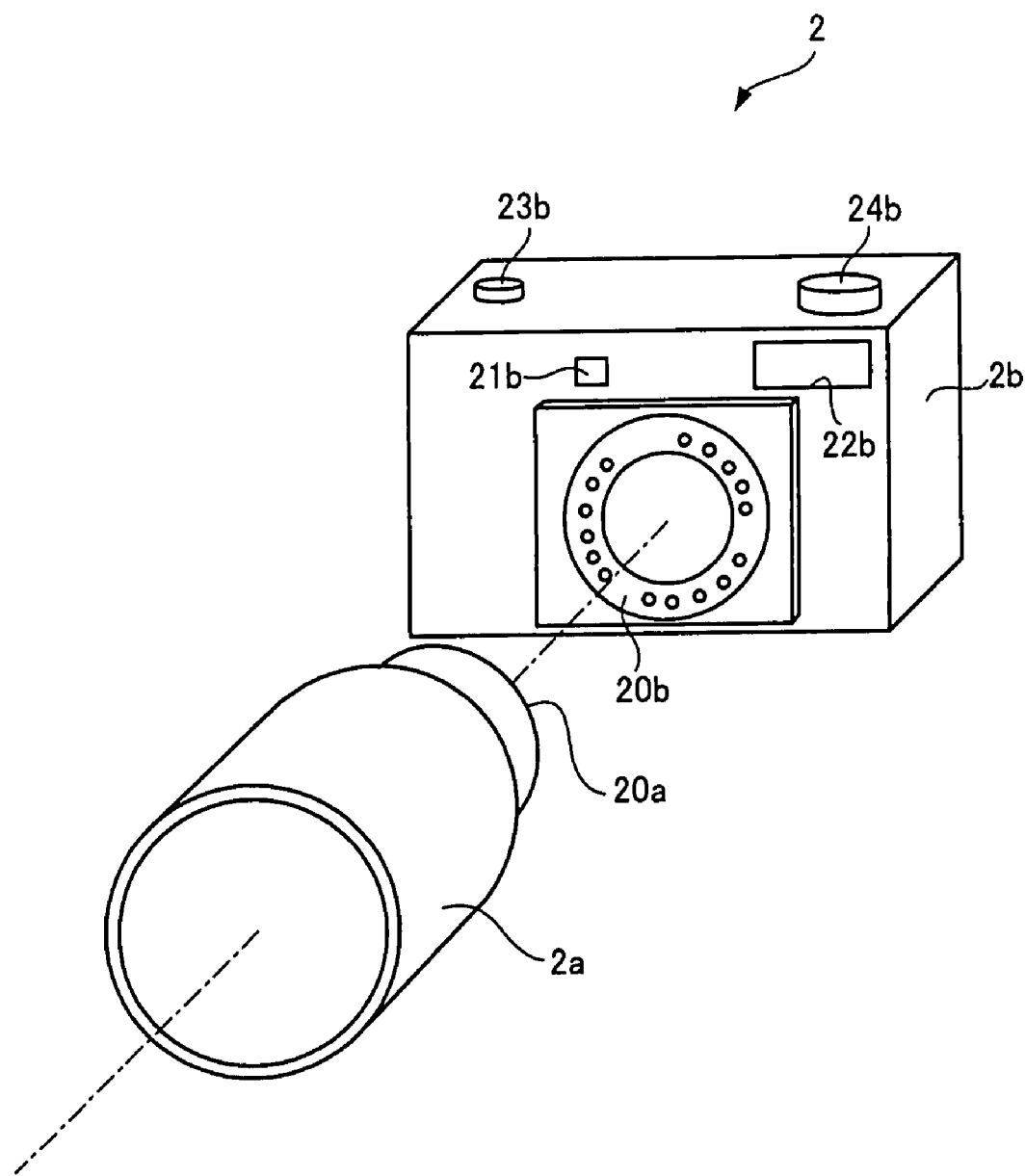
FIG. 22 is a diagram showing a digital camera equipped with a lens unit 2a that is provided with an image taking optical system and an image pickup device, and which generates image data, and a main body unit 2b, to which the lens unit 2a is detachably mounted, that receives image data from the lens unit 2a to perform image processing.

FIG. 22 is a diagram showing a digital camera 2 equipped with a lens unit 2a, equipped with an image taking optical system and an image pickup device, which generates image data, and a main body unit 2b, to which the lens unit 2a is detachably mounted, which receives image data from the lens unit 2a to perform image processing.

As shown in FIG. 22, a lens mount 20b having a number of mount contacts is provided at the center of the camera main body 2b. A similar mount section 20a is also provided at the lens unit 2a-side. When a rotational operation is performed so that the positions of the respective mount contacts match each other and the lens unit 2a is mechanically mounted onto the camera main body 2b along a dashed line shown in FIG. 22, the multiple contacts respectively connect with each other, and the lens unit 2a is also electrically connected to the camera main body 2b. In addition, a release button 23b and a mode dial 24b are provided on an upper face of the camera main body 2b. In the event that the image taking mode is selected by the mode dial 24b and the release button 23b is pressed when the lens unit 2a is mounted onto the camera main body 2b, image taking is performed by the digital camera 2. The mode dial 24b is provided with items other than the image taking mode such as a playback mode, and an item is selected from these items by a rotational operation.

For the present embodiment, an example is used in which the mode dial 24b doubles as a power switch. In addition, an AWB sensor 21b, a flash emission window 22b and the like are also provided on a front face of the camera main body 2b. The digital camera 2 is equipped with a battery on the camera main body 2b. Power from the battery is supplied to the camera main body 2b, as well as to the lens unit 2a via power contacts among the mount contacts shown in FIG. 22. When power is supplied from the battery of the camera main body 2b to the lens unit 2a via the power contacts, both the lens unit 2a and the camera main body 2b change to an activated state.

The digital camera 2 according to the present embodiment also has a transmission-during-power-off mode. When the mode dial 24b, which doubles as a power switch, is operated to the off-side, the transmission-during-power-off mode is activated if a setting such as that shown in FIG. 4 has been made.

Furthermore, the present embodiment is configured so that the transmission-during-power-off mode is also activated when the lens unit is detached.

Operations of the digital camera 2 shown in FIG. 22 will now be described.

Figure 23:
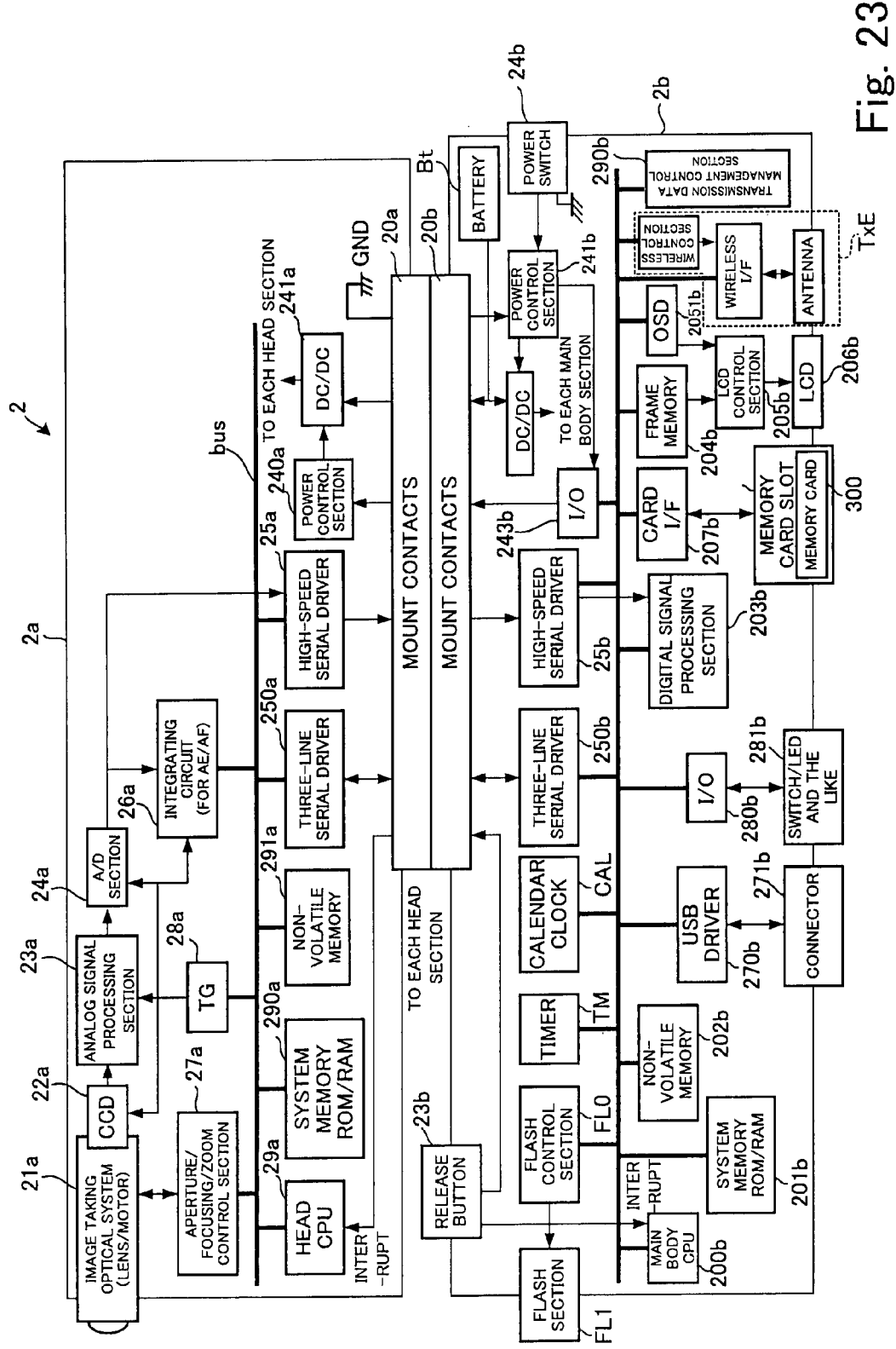
FIG. 23 is a block diagram showing a configuration of an electrical system when a lens unit 1a is mounted onto a camera main body 1b.

FIG. 23 is a block diagram showing a configuration of an electrical system when the lens unit 2a is mounted onto the camera main body 2b.

First, internal configurations of the lens unit 2a and the camera main body 2b will be described with reference to FIG. 23.

The upper-side of FIG. 23 shows a configuration of the lens unit 2a, while the lower-side thereof shows a configuration of the camera main body 2b.

First, the configuration of the lens unit 2a-side will be described.

The lens unit 2a, which is part of the digital camera 2 of the present embodiment, is mounted onto the camera main body 2b, and is activated by receiving power supplied from a battery Bt of the camera main body 2b.

This example is configured so that, upon operation of the lens unit 2a, a GND signal (center-right-side of FIG. 23) is supplied to a power control section 241b of the camera main body 2b, causing an I/O section 243b to be rewritten, and a main body CPU 200b detects the mounting of the lens unit 2a. At this point, the power control section 241b supplies power to each section of the camera main body 2b so that the camera main body 2b changes to an activated state.

In addition, at this point, power from the battery Bt of the main body 2b-side is also supplied to a DC/DC converter (hereinafter referred to as DC/DC) 241a of the lens unit 2a-side via mount contacts 20a and 20b. In turn, power is supplied from the DC/DC 241a to the power control section 240a, and the power control section 240a changes to an activated state. At this point, the fact that the lens unit 2a has been mounted onto the camera main body 2b is also conveyed from the I/O section 243b to the power control section 240a of the lens unit-side. Power is supplied to each section from the DC/DC 241a under the control of the power control section 240a of the lens unit 2a-side, and the lens unit 2a enters an activated state. Furthermore, the camera main body 2b according to the present embodiment is equipped with a transmission data management control section 290b and the transmitting section TxE, and is thereby equipped with the same functions provided at the digital camera shown in FIGS. 1 and 6.

This power control section 241b corresponds to the power control section according to the present invention. In the present embodiment, when the I/O 243b is rewritten by the power control section 241b as the lens unit 2a is about to be detached from the camera main body 2b, the transmitting section TxE detects the rewriting of the I/O 243b and transitions to the transmission-during-power-off mode.

A simple description will now be provided on image taking processing and the like when the lens unit 2a is mounted onto the camera main body 2b.

As shown in FIG. 23, the lens unit 2a mounted onto the camera main body 2b is provided with an image taking optical system 21a and an image pickup device (hereinafter referred to as CCD, since a CCD solid state image pickup device is used in this case) 22a. An image taking lens, an aperture and the like are arranged inside the image taking optical system 21a. A subject image is formed on the CCD 22a using the image taking lens inside the image taking optical system 21a, and image data is generated at the CCD 22a. The image data generated by the CCD 22a is outputted to an analog signal processing section 23a at which processing such as noise reduction is performed, and then at a subsequent-stage A/D section 24a, analog image signals are converted into digital image signals. Furthermore, image signals converted into digital signals are supplied to a high-speed serial driver 25a.

Image signals supplied to the camera main body 1b by the high-speed serial driver 25a consist of three types: image signals for live views (hereinafter referred to as live view signals), which are used to display images captured by the image taking lens inside the image taking optical system 21a on an LCD panel (not shown) when any of the image taking modes is selected by the mode dial 24b; image signals for displaying still images (hereinafter referred to as still image signals) obtained by operations of the release button 23b when a still image taking mode is selected among the image taking modes; and image signals for displaying moving images (hereinafter referred to as moving image signals) obtained by operations of the release button 23b when a moving image taking mode is selected among the image taking modes. When requested by the camera main body 2b, any of these image signals is transmitted from the high-speed serial driver 25a to the camera main body 2b.

On the other hand, image signals converted into digital signals at the A/D section 24a are also supplied to an integrating circuit 26a provided at a subsequent stage of the A/D section 24a. The integrating circuit 26a achieves an AF function (hereinafter referred to as AF) and an AE function (hereinafter referred to as AE), and performs measurement of subject luminance to enable the AE function and measurement of subject distance to enable the AF function. Subject distance and subject luminance measured by the integrating circuit 26a are supplied to an aperture/focus/zoom control section 27a via a data bus. The aperture/focus/zoom control section 27a adjusts the diameter of the aperture inside the image taking optical system 21a as well as the position of a focusing lens inside the image taking optical system 21a. This arrangement enables activation of the AF and AE every time the lens inside the image taking optical system 21a provided at the lens unit 2a is pointed at a different subject so that adjustments of focus and luminance are immediately performed. As a result, image data representing a subject image in focus is generated at and outputted from the CCD 22a.

The CCD 22a, the analog signal processing section 23a, the A/D section 24a and the integrating circuit 26a operate in synchronization with a timing signal from a timing generator (hereinafter referred to as TG) 28a. Operations of the TG 28a are controlled by a head CPU 29a. The head CPU 29a controls the TG 28a and the aperture/focus/zoom control section 27a or the like according to a procedure of a program stored in a system memory 290a. The system memory 290a stores software and the like that indicate a processing procedure for initialization, processing procedures for AE and AF, and processing procedures or the like regarding communication by the high-speed serial driver 25a and the like. In addition, a three-wire serial driver 250a for receiving instructions from the camera main body 2b, and a non-volatile memory (EEPROM and the like) 291a that stores configuration information and the like of the lens unit 2a are also provided.

The lens unit 2a is configured as described above.

Next, the configuration of the camera main body 2b will be described.

Operations of the camera main body 2b is comprehensively controlled by the main body CPU 200b, in the same manner as the lens unit 2a. The camera main body 2b is equipped with a system memory 201b storing software and the like that indicate processing procedures, a non-volatile memory 202b to which configurations are recorded and the like.

Under the control of the main body CPU 200b, image signals transmitted from the lens unit 2a-side by the high-speed serial driver 25a are received by a main body-side high-speed serial driver 25b.

As described above, in the present embodiment, a transmitted image signal from the lens unit 2a will be any of the three types of live view signals, still image signals, and moving image signals. For instance, in the case of a live view signal, the live view signal is stored onto a frame memory 204b. An LCD control section 205b reads out the live view signal stored in the frame memory 204b, and a live view based on the live view signal is displayed on an LCD panel on an LCD 206b. The LCD control section 205b is also supplied with information from an OSD (On Screen Display) 2051b-side, enabling a selection menu and the like to be displayed on a display screen of the LCD 206b together with the live view.

In addition, the camera main body 2b is provided with a section that performs processing of image signals as described above, as well as a timer TM that generates data for displaying time and data information on the display screen via the OSD 2051b, a calendar clock CAL, a USB driver 270b and a USB connector 271b that provide connection to external devices, a switch/LED and the like 281b that issue operation instructions, and the like. Operation instructions of the switch and the like 281b are supplied to the main body CPU 200b via an I/O 280b, and the main body CPU 200b performs processing according to such operation instructions. However, the release button 23b is directly connected to both an interrupt terminal of the main body CPU 200b and an interrupt terminal of the head CPU 29a. When the release button 23b is pressed, interrupts are performed by both CPUs 29a and 200b to activate either a still image processing program or a moving image program.

Figure 24:
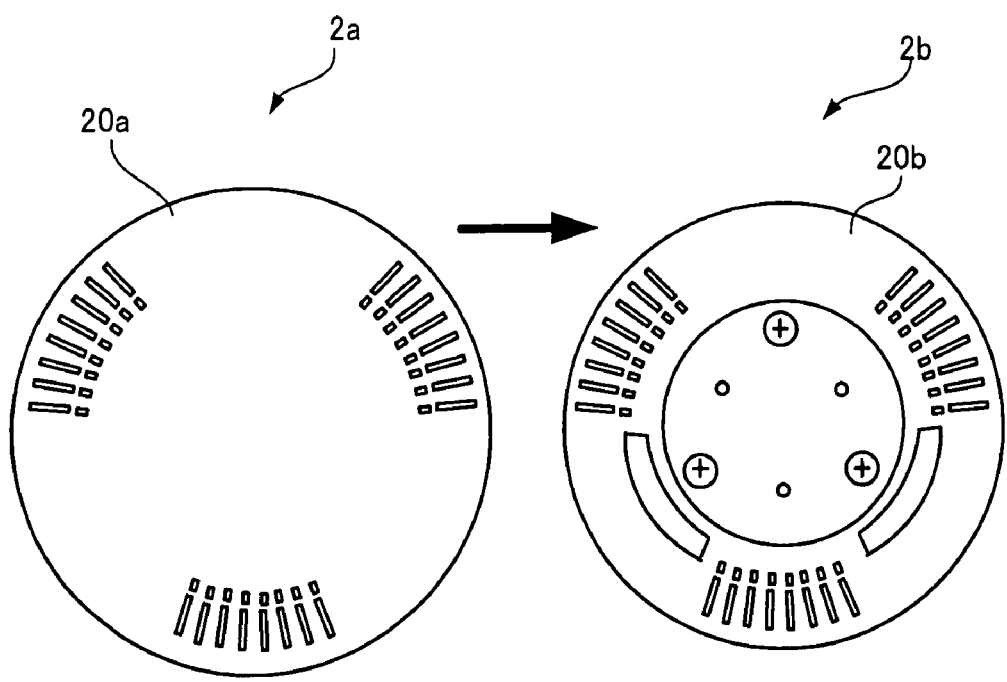
FIG. 24 is a diagram describing a configuration of multiple contact points provided at both mount sections of the head-side and the main body-side.

FIG. 24 is a diagram describing a configuration of multiple contacts provided at both mount sections of the lens unit 2a and the main body 2b. As shown in FIG. 24, the configuration is similar to that of a so-called bayonet mount, in which the mount section 20a of the lens unit 2a-side is inserted into the mount section 20*b* of the main body-side and rotationally moved so as to mount the lens unit 2*a* onto the camera main body 2*b*.

Figure 25:
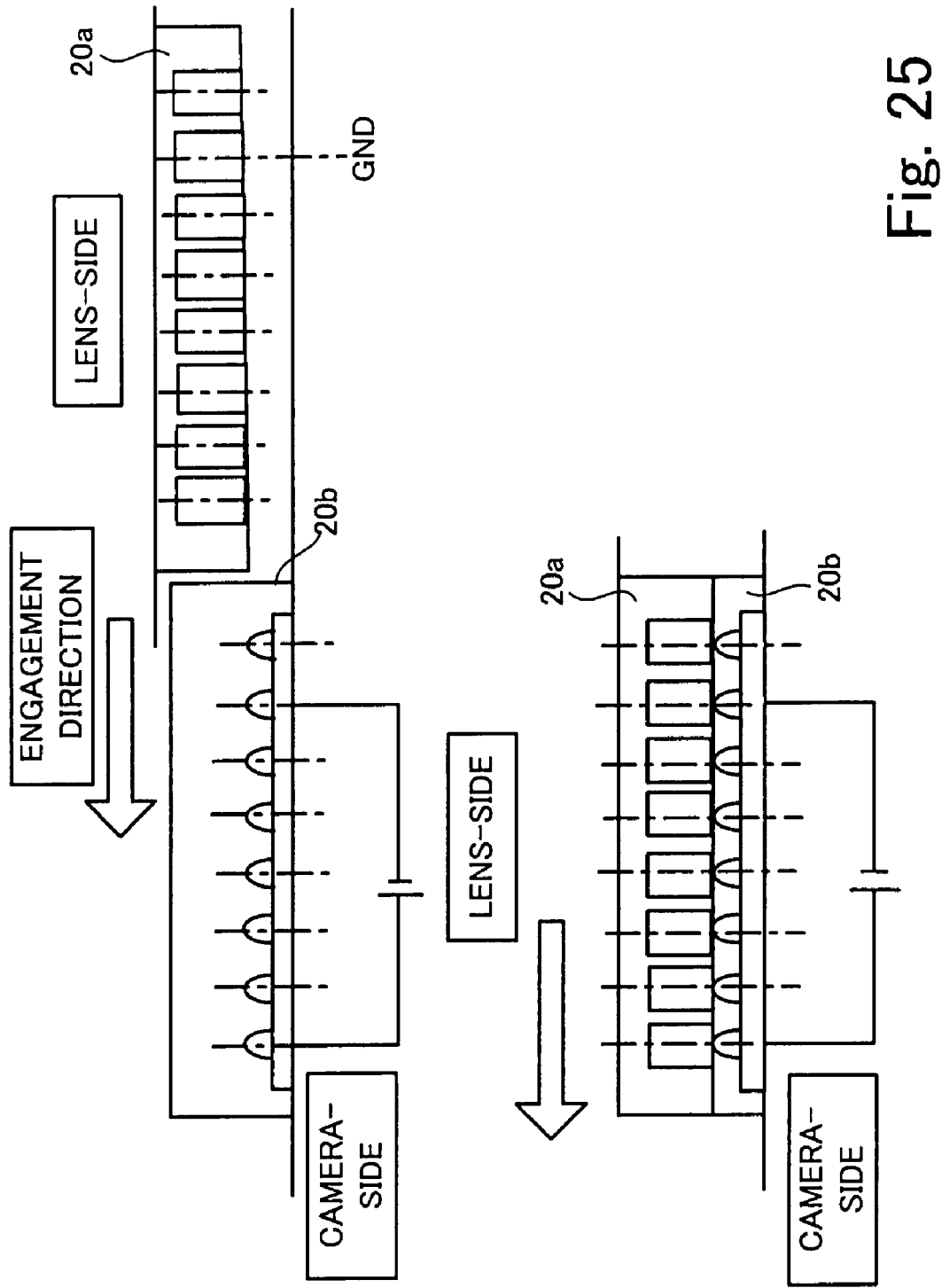
FIG. 25 is a diagram showing a planer representation of both contact points for describing the rotational operation.

FIG. 25 is a diagram providing a planer representation of both contacts for describing the rotational operation.

As shown in FIG. 25, for instance, assuming that the contact connected to ground GND is the second contact from the right, both contacts will come in complete contact when the lens unit 2*a* is completely mounted onto the camera main body 2*b*, and a GND signal will be supplied to the main body CPU 200*b* of the camera main body 2*b*. The main body CPU 200*b* detects the mounting of the lens unit 2*a* by sensing that the I/O section 243*b* has been rewritten. As described above, power from the camera main body 2*b* is also supplied to the lens unit 2*a*, and both the lens unit 2*a* and the camera main body 2*b* enter an activated state.

After image taking is performed in this activated state, when the lens unit 2*a* is about to be detached from the camera main body 2*b*, the GND signal that has been received by the power control section 241*b* of the main body 2*b* switches to a high-side and the I/O 243*b* is rewritten. The main body CPU 200*b* and the power control section 241*b*, as well as the wireless control section inside the transmitting section TxE and the transmission data management control section 290*b* respectively detect the rewriting of the I/O 243*b*, causing the transmission-during-power-off mode to be activated, and the transmitting section TxE commences transmission.

Additionally, the present embodiment is also configured so that, when the lens unit 2*a* is detached from the main body unit 2*b* and transmission is being performed, the transmitting section TxE suspends data transmission in response to a remounting of the lens unit 2*a* onto the main body unit 2*b*.

Figure 26:
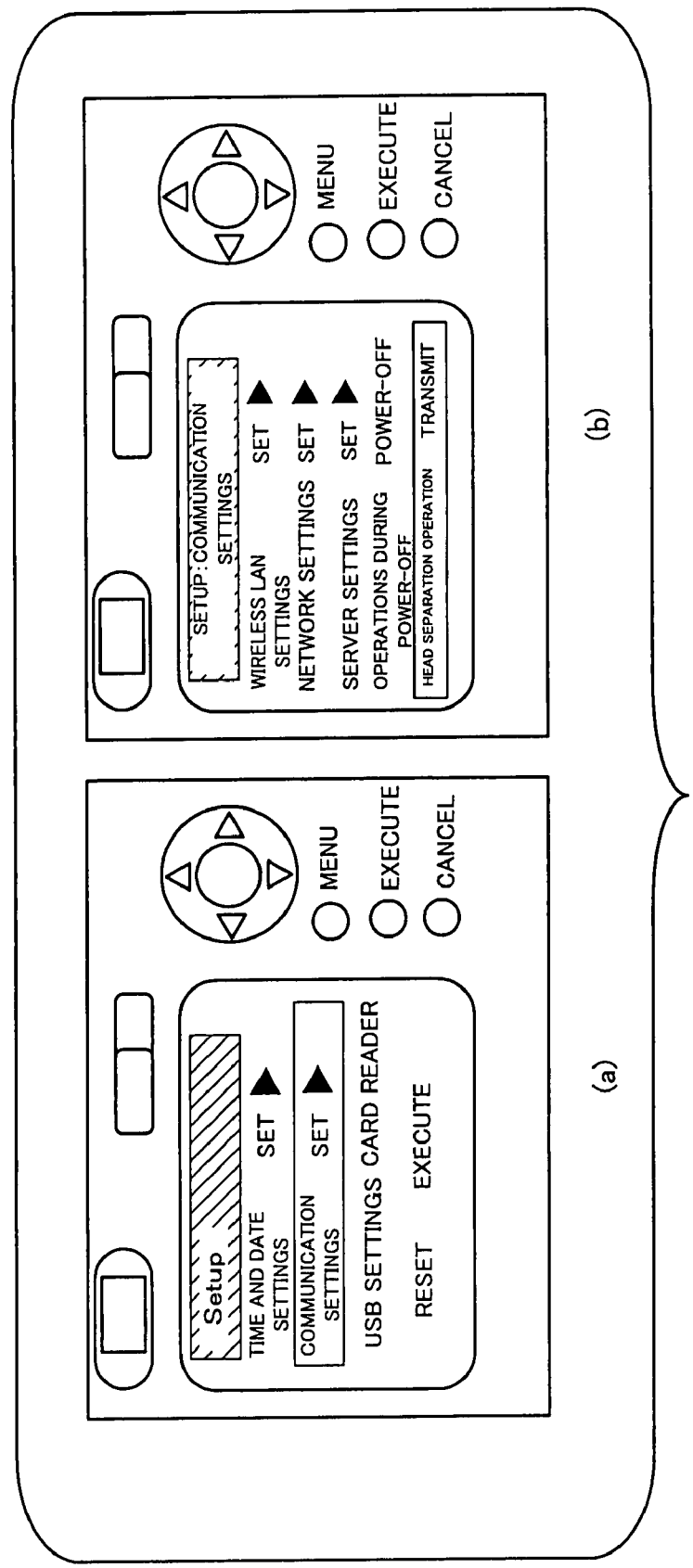
FIG. 26 is a diagram showing a screen in a case in which a camera main body is provided with the same function as that shown in FIG. 4 and a setup menu is displayed on a display screen provided on the camera main body.

FIG. 26 is a diagram showing a screen in a case in which the camera main body 2*b* is provided with the same function as that shown in FIG. 4 and a setup menu is displayed on a display screen provided on the camera main body 2*b*.

In the event that transmission is set to commence upon a head separation operation, as indicated by the last row in Part (b) of FIG. 26, a transition is made to the transmission-during-power-off mode when the lens unit 2*a* is detached and image files are transmitted. Such an arrangement is also possible.

As described above, in a mobile device equipped with a transmitting function to transmit data, a mobile device may be achieved that suppresses wasteful power consumption and reliably stores backup data to an external storage section without having a user be aware of the data being stored.

While a digital camera has been exemplified in the present embodiment, the present invention may be applied to any other mobile device.

Next, a wireless communication apparatus to be detachably mounted onto a mobile device that is not provided with an internal transmitting function will be described.

Figure 27:
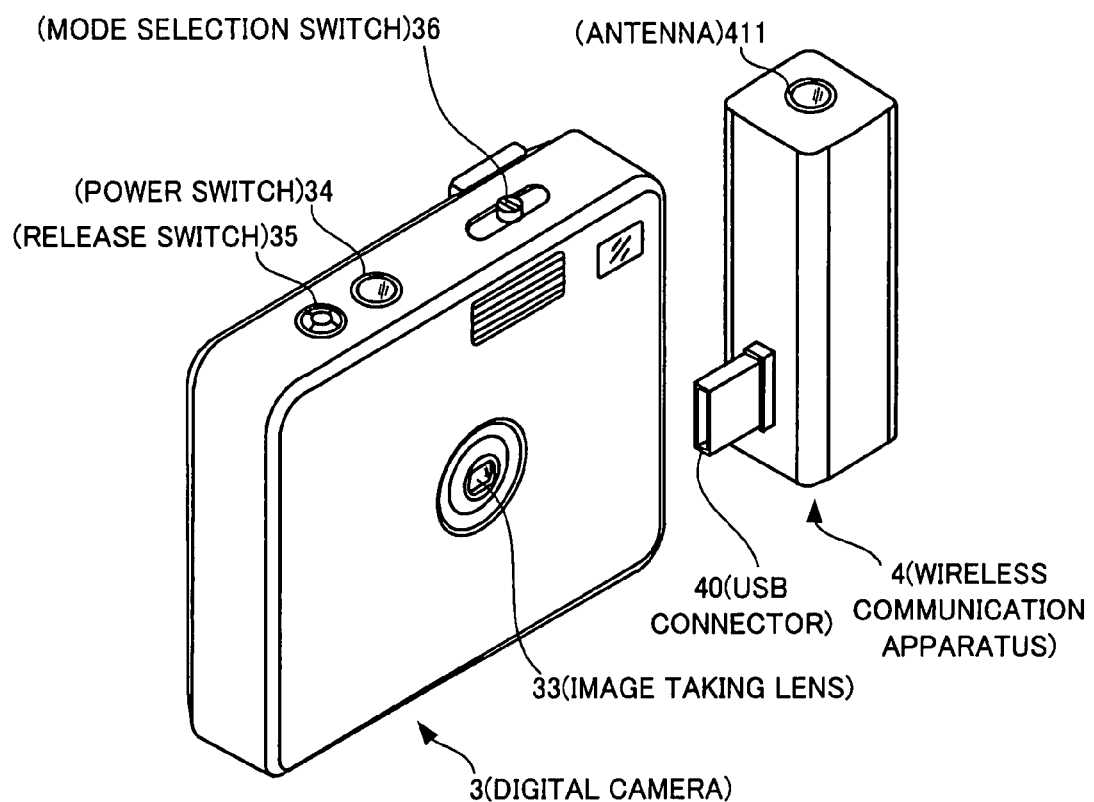
FIG. 27 is a perspective view (seen from the front) showing an image pickup apparatus and a wireless communication apparatus according to the present invention.
Figure 28:
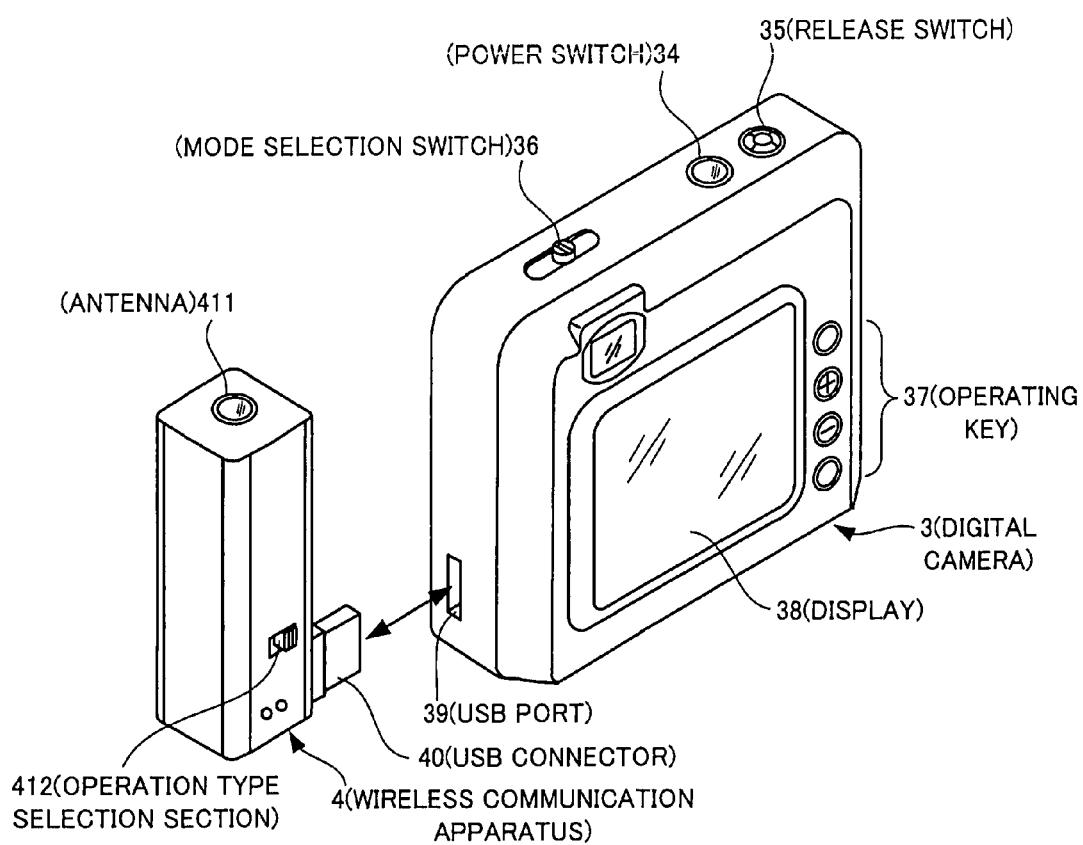
FIG. 28 is a perspective view (seen from the rear) showing the image pickup apparatus and the wireless communication apparatus according to the present invention.

A digital camera 3 that is a mobile device according to the present invention, and a wireless communication apparatus 4 are shown in FIGS. 27 and 28.

FIG. 27 is a perspective front view of the digital camera 3 and the wireless communication apparatus 4. FIG. 28 is a perspective rear view of the digital camera 3 and the wireless communication apparatus 4.

An image taking lens 33 for taking an image of a subject is provided on a front face of the digital camera 3, while an upper face thereof is provided with a power switch 34 that turns power on/off, a release switch 35 that is pressed during image taking, and a mode selection switch 36 that is a sliding switch that switches various operations according to a position of a tab. In this case, it is assumed that such various operations consist of: an image taking mode in which images are taken; a setting mode in which settings and the like related to image taking are made; a playback mode that plays back and displays arbitrary, taken image data on a display 38 and transmits the same to an external device from the wireless communication apparatus 4; and a communication mode that transmits an arbitrary piece among the image data to an external device such as a printer via the wireless communication apparatus 4, and conversely receives image data from the external device.

A display 38 that displays live views during image taking, images already taken, and menus and the like during setting is arranged on a rear face of the digital camera 3. In addition, an operating key 37 configured by four push buttons is arranged adjacent to the display 38. A user is able to establish image taking settings such as a number of pixels of images to be taken or exposure and the like, environmental settings such as an internal time of the camera, and settings and the like for image size conversion, which will be described later.

A USB port 39 that provides connection to the wireless communication apparatus 4 is provided on a side face of the digital camera 3. Connection may be established by inserting a USB connector 40 provided on the side face of the wireless communication apparatus 4 into this USB port 39 to perform communication via USB (Universal Serial Bus). It is also possible to apply a connector and a port conforming to the IEEE 1394 standard instead of USB. In addition, an antenna 411 is provided on an upper face of the wireless communication apparatus 4, and is capable of performing communication with an external device such as a printer via wireless communication. Furthermore, the wireless communication apparatus 4 is provided with an operation type selection section 412 that enables selection between having the wireless communication apparatus 4 operate as a dedicated memory for storing image data, and having the wireless communication apparatus 4 operate as originally intended as a wireless communicator, by switching over the switch.

Figure 29:
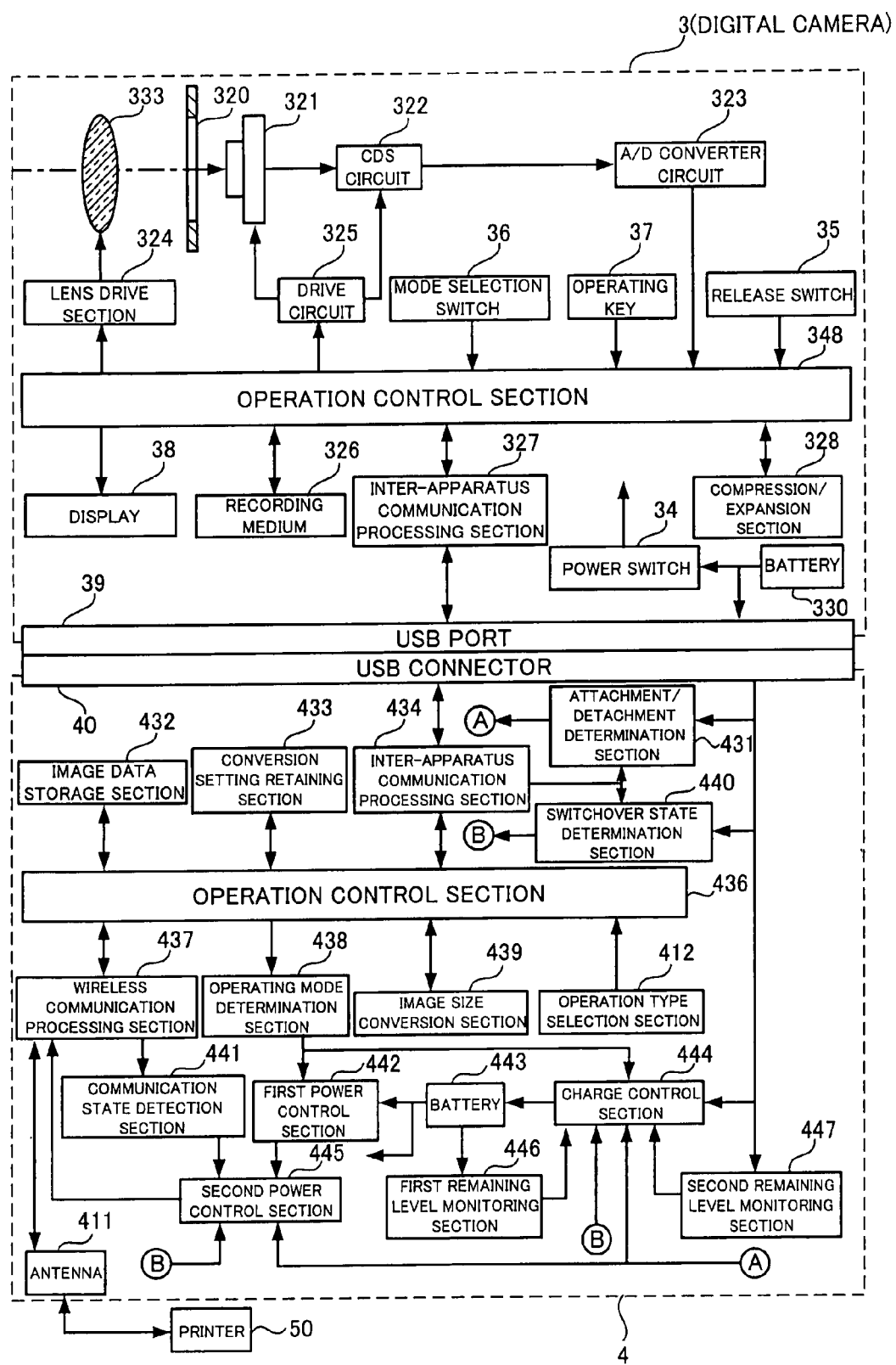
FIG. 29 is a configuration diagram of the image pickup apparatus and the wireless communication apparatus according to the present invention.

Next, configurations and functions of the various sections of the digital camera 3 and the wireless communication apparatus 4 will be described with reference to FIG. 29.

The description will commence with the digital camera 3. As mentioned above, the image taking lens 33 is arranged on the front face of the digital camera 3. The image taking lens 33 is moved in a direction of an optical axis by a lens drive section 324 that includes a motor, a motor driver, a driving mechanism and the like. The lens drive section 324 is driven by instruction signals from an operation control section 348 according to input from the operating key 37. A mechanical shutter 320 that opens and closes an image taking light path is arranged behind the image taking lens 33 in the direction of the optical axis. The mechanical shutter 320 is opened or closed when the operation control section 348 outputs an instruction signal at an appropriate timing upon detecting that the release switch 35 has been pressed.

A CCD image pickup device 321 is arranged as an image sensor behind the mechanical shutter 320 in the direction of the optical axis. The CCD image pickup device 321 converts subject light transmitted through the image taking lens 33 and formed on an acceptance surface into an electric image pickup signal, and outputs the signal based on a transfer pulse supplied by a drive circuit 325 to a CDS (correlated double sampling) circuit 322. A CMOS type image pickup device may be used as the image sensor instead of the CCD image pickup device 321.

The CDS circuit 322, which is driven based on a drive pulse outputted from the drive circuit 325, reduces noise in the image pickup signal outputted from the CCD image pickup device 321 and inputs the signal to an A/D converter circuit 323. The drive pulse of the drive circuit 325 is synchronized with the pulse signal from the operation control section 348. The A/D converter circuit 323 converts an inputted analog image pickup signal into digital image data, and inputs the data into the operation control section 348. Various image processing is performed on the image data, which is then inputted to a compression/expansion section 328. The compression/expansion section 328 compresses inputted image data and converts the same into a data format such as JPEG. The operation control section 348 records the compressed image data into a recording medium 326. For the recording medium 326, a media that is widely used for digital cameras such as an SD memory card or a Compact Flash (registered trademark) and the like for storing data of taken images, or an HDD (hard disc drive) may be applied.

As described earlier, the mode selection switch 36 is used for switching among four operating modes. The operation control section 348 performs operations corresponding to the operating mode set by the mode selection switch 36, and upon power activation and operating mode change, the operation control section 348 instructs an inter-apparatus communication processing section 327 to transmit an operating mode change notification to the wireless communication apparatus 4. The operating key 37 is used for determining various settings of the digital camera 3 as described above, and outputs signals corresponding to operations to the operation control section 348. Upon receiving these signals, the operation control section 348 performs appropriate processing such as displaying a menu on the display 38 or establishing settings and the like.

As described above, the display 38 is used for displaying settings menus or taken images and the like corresponding to an output from the operation control section 348.

The inter-apparatus communication processing section 327 is used to process communication with the wireless communication apparatus 4, and is primarily used to achieve functions prescribed by the USB standard. The inter-apparatus communication processing section 327 processes communication with an inter-apparatus communication processing section 434 of the wireless communication apparatus 4 via the USB port 39 and the USB connector 40 which are mutually connected. More specifically, the inter-apparatus communication processing section 327 performs transmission processing of image data, an operating mode change notification, an instruction of wireless transmission of image data, and a conversion setting notification, to be described later, under instructions from the operation control section 348, and conversely receives image data that has been received by the wireless communication apparatus 4 from an external device. When there are no instructions from the operation control section 348 or, in other words, during an idling state, the inter-apparatus communication processing section 327 inputs/outputs a predetermined pattern between the inter-apparatus communication processing section 434 of the wireless communication apparatus 4. This enables the digital camera 3 and the wireless communication apparatus 4 to recognize that mutual communication may be performed normally in an idling state.

A digital camera-side battery 330 is a power source of the digital camera 3, and is realized by a lithium ion battery and the like. Current from the digital camera-side battery 330 is inputted to the power switch 34, and power activation may be performed by turning on the power switch 34 while power cutoff may be performed by turning off the same. Current outputted from the power switch 34 is supplied as power to each section inside the digital camera 3. On the other hand, this current is inputted to an attachment/detachment determination section 431 of the wireless communication apparatus 4, a switchover state determination section 440, a charge control section 444, and a second remaining level monitoring section 447, to be described later, via the mutually connected USB port 39 and USB port 40. This enables the wireless communication apparatus 4 to detect an attachment/detachment state to the digital camera that is a mobile device main body, and an on/off state of the power switch 34, and also enables monitoring of a remaining level of the digital camera-side battery 330 and charging of its own wireless communication apparatus-side battery 443.

The operation control section 348 is used to supervise and control processing according to the operating mode set by the mode selection switch 36. During image taking mode, the operation control section 348 outputs necessary instructions to the lens drive section 324 and the mechanical shutter 320, detects pressing of the release switch 35 and performs image taking processing, compresses image data received from the A/D converter circuit 323 at the compression/expansion section 328, and records the data onto the recording medium 326. During playback mode, the operation control section 348 reads out image data from the recording medium 326, plays back and displays the same on the display 38, and according to settings, transfers the image data to the inter-apparatus communication processing section 327 for wireless transmission. During communication mode, the operation control section 348 displays menus necessary for communication operations on the display 38, and according to input from the operation key 37, performs wireless transmission of image data in the same manner as in the playback mode. The operation control section 348 also receives image data from an external device via the wireless communication apparatus 4. During setting mode, the operation control section 348 displays menus necessary for setting operations on the display 38 as described earlier, and establishes image taking settings, environmental settings, and settings for image size conversion, which will be described later.

The USB port 39 is a universal port that adheres to the USB standards. By inserting the USB connector 40, which is also a universal item that is provided at the wireless communication apparatus 4, into the USB port 39, the digital camera 3 and the wireless communication apparatus 4 will be electrically connected. The USB port 39 and the USB connector 40 are provided with data lines that connect the inter-apparatus communication processing sections 327 and 434, and power lines that draw current from the battery 30 of the digital camera 3 into the wireless communication apparatus 4.

Next, the wireless communication apparatus 4 will be described. The inter-apparatus communication processing section 434 performs transmission/reception processing of image data and the like according to instructions from an operation control section 436, in the same manner as the digital camera 3. In addition, as described above, a predetermined signal pattern is detected in an idling state. When a non-signal state continues over a predetermined period of time, notifications are issued to the attachment/detachment determination section 431 and the switchover state determination section 440. As described above, the operation type selection section 412 is a switch that enables selection between having the wireless communication apparatus 4 operate as a memory and having the wireless communication apparatus 4 operate as a wireless communicator. According to the selection, the operation control section 436 switches over control methods for the wireless communication processing section 437 and the image data storage section 432.

The image data storage section 432 is a memory that stores image data received from the digital camera 3, and is realized by a universal non-volatile memory such as a flash ROM. The image data storage section 432 is managed and controlled by the operation control section 436. The image data storage section 432 operates as an overwritable memory when a memory operation is selected by the operation type selection section 412, and as an overwritable temporary storage buffer when a wireless communication operation is selected. A detailed description will be provided later.

The conversion setting retaining section 433 is a memory that saves a conversion setting of image sizes, which will be described later. This setting has been established during the setting mode of the digital camera 3, and was transmitted as a conversion setting notification to the wireless communication apparatus 4. The received conversion setting notification is saved in the conversion setting retaining section 433 by the operation control section 436, and is read out when performing image size conversion.

The image size conversion section 439 changes the image size of image data received from the operation control section 436 according to this conversion setting, and outputs the image data to the operation control section 436. A detailed description will be provided later.

The operating mode determination section 438 receives from the operation control section 436 an operating mode change notification received from the digital camera 3, and determines the operating mode. The operating mode determined at this point is notified to a first power control section 442 for power-on/off control, which will be described later, and to a charge control section 444 for charge control, which will be described later.

The wireless communication processing section 437 outputs the image data inputted under instructions from the operation control section 436 to the antenna 411, and conversely outputs image data and the like received from the antenna 411 to the operation control section 436. The antenna 411 is the same as that implemented in a mobile telephone or the like, and performs transmission and reception of wireless data with an external device such as a printer 50.

The communication state detection section 441 detects existence of a wireless communication through the wireless communication processing section 437, and notifies the same to a second power control section 445.

As described above, the attachment/detachment determination section 431 is notified by the inter-apparatus communication processing section 434 that no signals have been inputted from the digital camera 3 via the data line over a certain period of time, and determines a presence of a current flowing through the power line from the digital camera-side battery 430. If neither signal nor current are present, the attachment/detachment determination section 431 determines that the wireless communication apparatus 4 has been detached from the digital camera 3, and notifies the second power control section 445 and the charge control section 444, which will be described later. The absence of signal input via the data line signifies that an input voltage from the inter-apparatus communication processing section 327 is neither at a high level nor at a low level, and is in a state of high impedance with absolutely no electrical input.

While the switchover state determination section 440 has the same actual functions as the attachment/detachment determination section 431, when it is detected that there are no signal inputs via the data line from the inter-apparatus communication processing section 434 and a determination is made that a current is flowing through the power line, the switchover state determination section 440 determines that the power switch 34 of the digital camera 3 has been turned off, and notifies the second power control section 445 and the charge control section 444, which will be described later.

The wireless communication apparatus-side battery 443 supplies power to each section of the wireless communication apparatus 4. The power of the wireless communication apparatus-side battery 443 is replenished by charging from the digital camera 3, which is performed by the charge control section 444 under given conditions. In addition, regarding power supplied to the wireless communication processing section 437, current output is commenced and suspended under given conditions by the first power control section 442 and the second power control section 445, which will be described later.

The first remaining level monitoring section 446 monitors a remaining level of power charged at the wireless communication apparatus-side battery 443, and more specifically, determines a full charge when charging current reaches or exceeds a predetermined value and notifies the charge control section 444, which will be described later. This predetermined value depends on the applied battery.

The second remaining level monitoring section 447 monitors a remaining level of power charged at the digital camera-side battery 330 that is mounted onto the digital camera 3, and more specifically, determines a low charge when charging voltage equals or falls below a predetermined value, and notifies the charge control section 444, which will be described later. This predetermined value depends on the applied battery.

The charge control section 444 is provided with a circuit that performs charging of the wireless communication apparatus-side battery 443 from the digital camera-side battery 330, and is capable of commencing and suspending charging under given conditions according to notifications from the attachment/detachment determination section 431, the switchover state determination section 440, the first remaining level monitoring section 446, the second remaining level monitoring section 447 and the operating mode determination section 438. A detailed description of the charge control will be provided later.

The first power control section 442 controls the power supply to the wireless communication processing section 437, and either commences or suspends supplying of power according to the operating mode type of the digital camera 3 that is notified from the operating mode determination section 438. A detailed description of this control will be provided later.

The second power control section 445 controls the power supply to the wireless communication processing section 437 in the same manner as the first power control section 442, and either commences or suspends supplying of power under given conditions according to notifications from the attachment/detachment determination section 431, the switchover state determination section 440 and the communication state determination section 441.

The operation control section 436 supervises and controls each processing. The operation control section 436 performs either a memory operation or a wireless communication operation in response to a notification from the operation type selection section 412, and when a memory operation is selected, performs only an operation for saving image data received from the inter-apparatus communication processing section 434 into the image data storage section 432. On the other hand, in a case of a wireless communication operation, the operation control section 436 outputs image data received from the inter-apparatus communication processing section 434, together with conversion settings that have been stored in advance into the conversion setting retaining section 433, to the image size conversion section 439 for size conversion, and saves the size-converted data into the image data storage section 432. Upon receiving a transmission instruction of image data from the digital camera 3, image data is read out from the image data storage section 432 and outputted to the wireless communication processing section 437. In addition, when an operating mode change notification is received from the inter-apparatus communication processing section 434, the notification is transferred to the operating mode determination section 438.

Next, power-on/off control according to the present invention will be described. An outline of this processing is shown in FIG. 30 as a flowchart.

Figure 30:
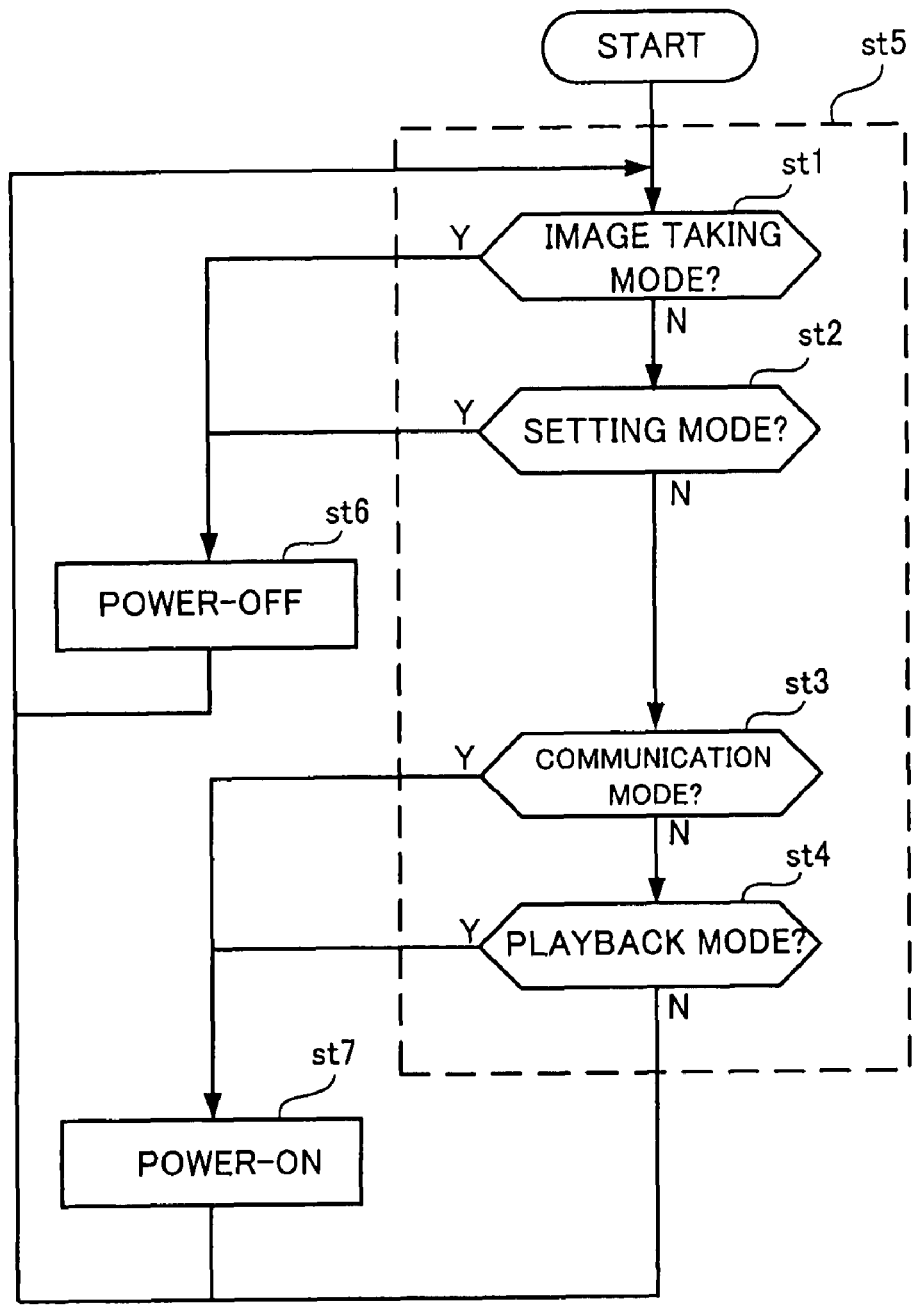
FIG. 30 is a flowchart of a power-on/off control processing of a wireless communication apparatus.

FIG. 30 is a flowchart of a power-on/off control processing of a wireless communication apparatus.

As described earlier, the digital camera 3 transmits an operating mode change notification to the wireless communication apparatus 4 upon power activation and upon a mode change performed via an operation of the mode selection switch 36.

The operating mode determination section 438 determines an operating mode after the change notification. Upon receiving the result of the determination, in the event that the mode is either the image taking mode or the setting mode (st1, st2), the first power control section 442 turns off (st6) the power of the wireless communication apparatus 4 since there is no need to perform wireless communication. On the other hand, in the event that the mode is either the communication mode or the playback mode (st3, st4), the first power control section 442 turns on the power (st7) since transmission and reception of image data must be performed via wireless communication. This series of determination processing is repetitively performed (st5).

As seen, power consumed by the wireless communication apparatus 4 may be suppressed by turning the power of the wireless communication processing section 437 on or off according to the operating mode of the digital camera 3.

Next, a wireless communication connection control according to the present invention will be described. An outline of this processing is shown in FIG. 31 as a flowchart.

Figure 31:
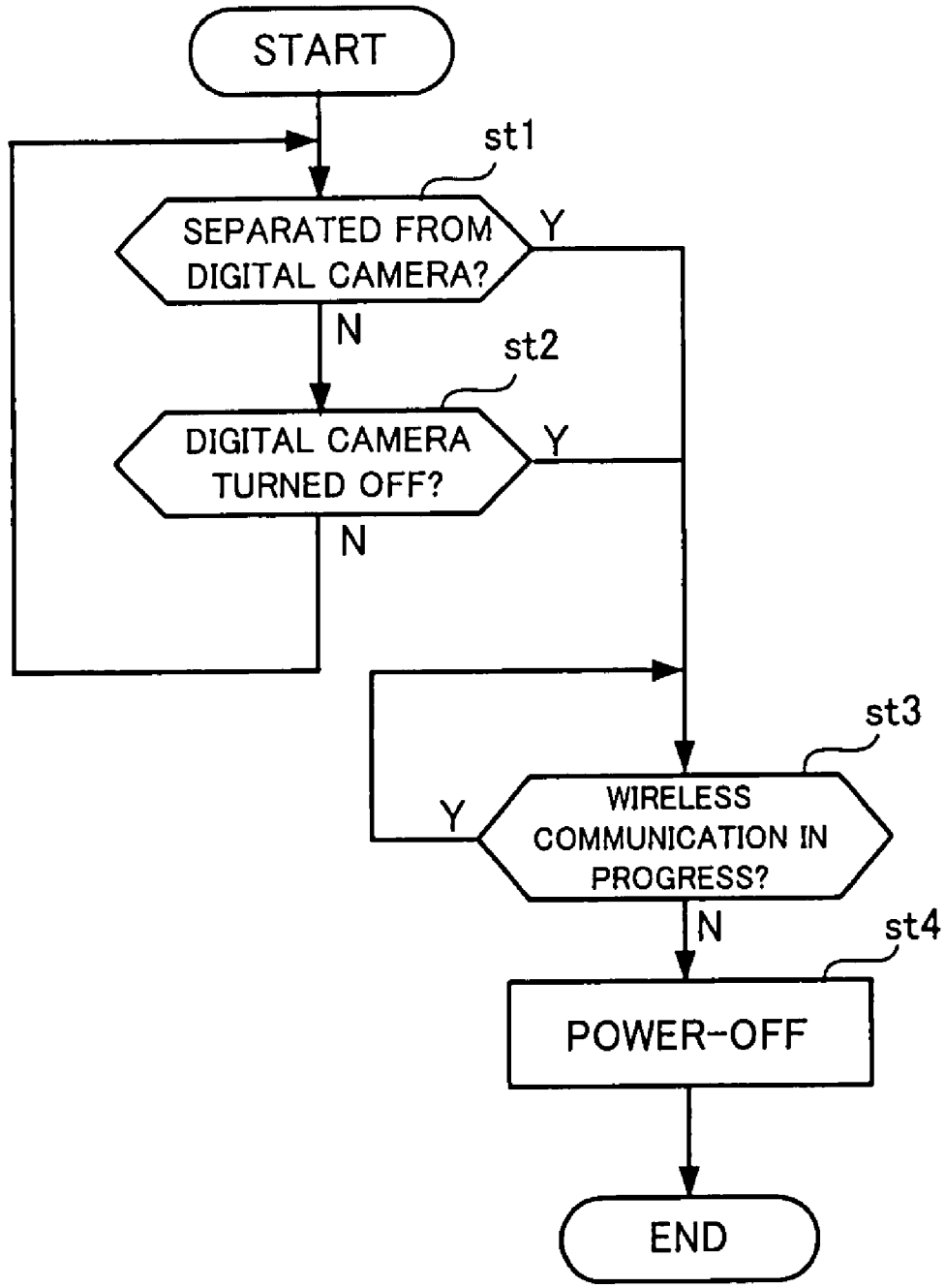
FIG. 31 is a flowchart of wireless communication connection processing of the wireless communication apparatus.

FIG. 31 is a flowchart of wireless communication connection processing of the wireless communication apparatus.

In the event that the attachment/detachment determination section 431 determines a separation (st1) or the switchover state determination section 440 determines a power-off of the digital camera 3 (st2), the second power control section 445 maintains a power-on state of the wireless communication processing section 437 as long as the communication state detection section 441 is detecting that the communication is in progress (st 3), and turns off power when it is detected that communication is not in progress (st4).

As seen, if wireless communication is in progress when either the digital camera 3 is separated from the wireless communication apparatus 4 or the power switch 34 of the digital camera 3 is turned off, the communication in progress may be continued until completed without having to cut off by automatically turning off the power of the wireless communication processing section 437 after completion of communication.

Next, a charge control according to the present invention will be described. An outline of this processing is shown in FIG. 32 as a flowchart.

Figure 32:
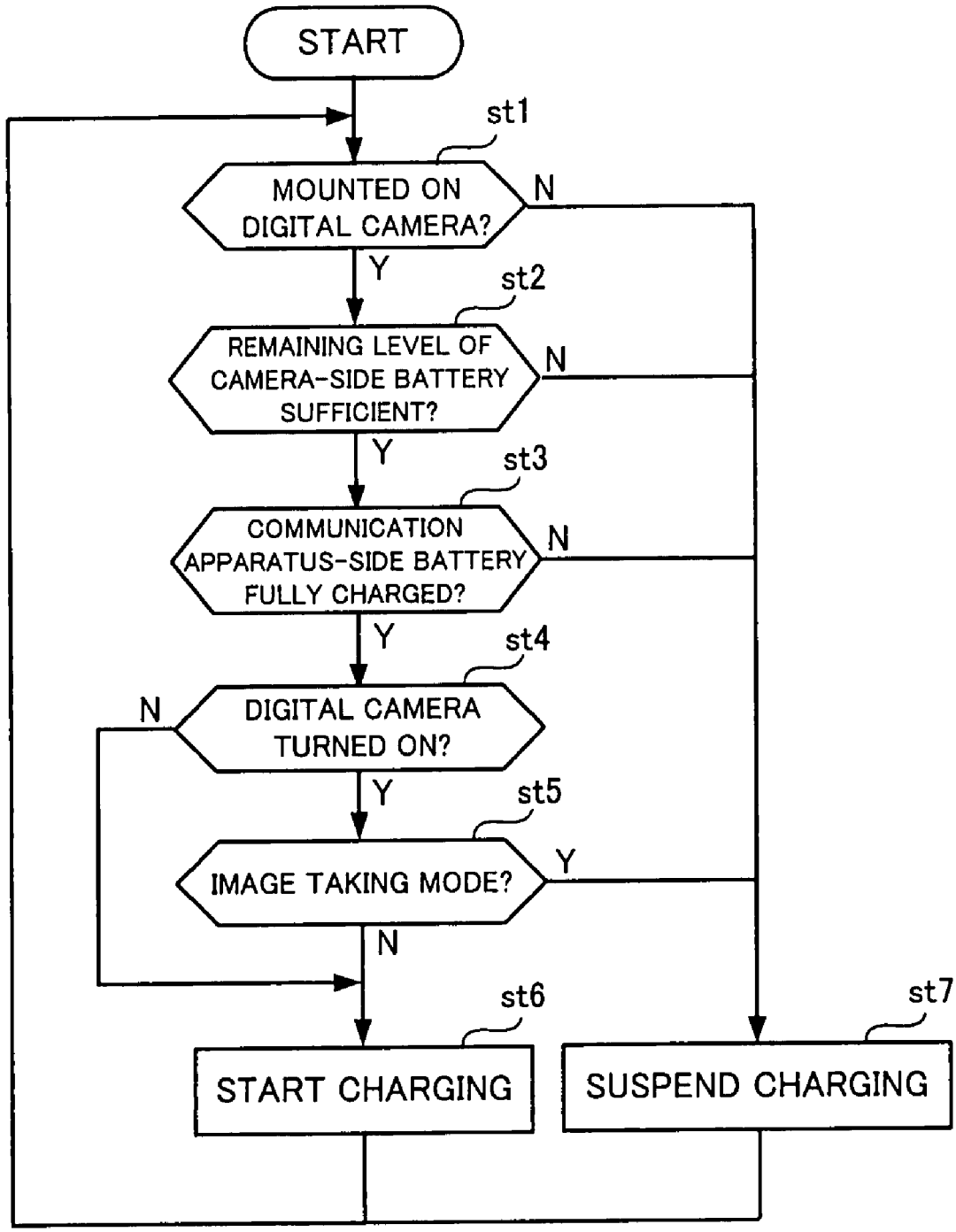
FIG. 32 is a flowchart of charge control processing of the wireless communication apparatus.

FIG. 32 is a flowchart of charge control processing of the wireless communication apparatus.

The charge control section 444 suspends charging of the wireless communication apparatus-side battery 443 in the event that either: the attachment/detachment determination section 431 determines a separation (st1); the second remaining level monitoring section 447 determines that the remaining level of the digital camera-side battery 330 is extremely low (st2); or the first remaining level monitoring section 446 determines that the wireless communication apparatus-side battery 443 is fully charged (st3). On the other hand, in the event that the attachment/detachment determination section 431 detects mounting (st1), the second remaining level monitoring section 447 determines that the remaining level of the digital camera-side battery 330 is sufficient (st2) and the first remaining level monitoring section 446 determines that the wireless communication apparatus-side battery 443 is not fully charged (st3), the charge control section 444 commences charging when the switchover state determination section 440 detects that the power switch 34 of the digital camera 3 has been turned off (st4, st6). In addition, when a power-on of the power switch 34 of the digital camera 3 is detected (st4), the operating mode determination section 438 further determines whether the mode is the operating mode or the image taking mode (st5). Charging is commenced when the mode is not the image taking mode (st6), while charging is suspended when the mode is the image taking mode (st7). At this point, charging is not performed during image taking mode because power is consumed in this mode not only by the CCD image pickup device 321 and the lens drive unit 324 but also due to flash firing, resulting in an overload of the digital camera-side battery 330.

As seen, by commencing and suspending charging in an appropriate manner according to the state of the digital camera 3, downsizing of the battery 443 that is mounted onto the wireless communication apparatus 4 may be achieved.

Figure 33:
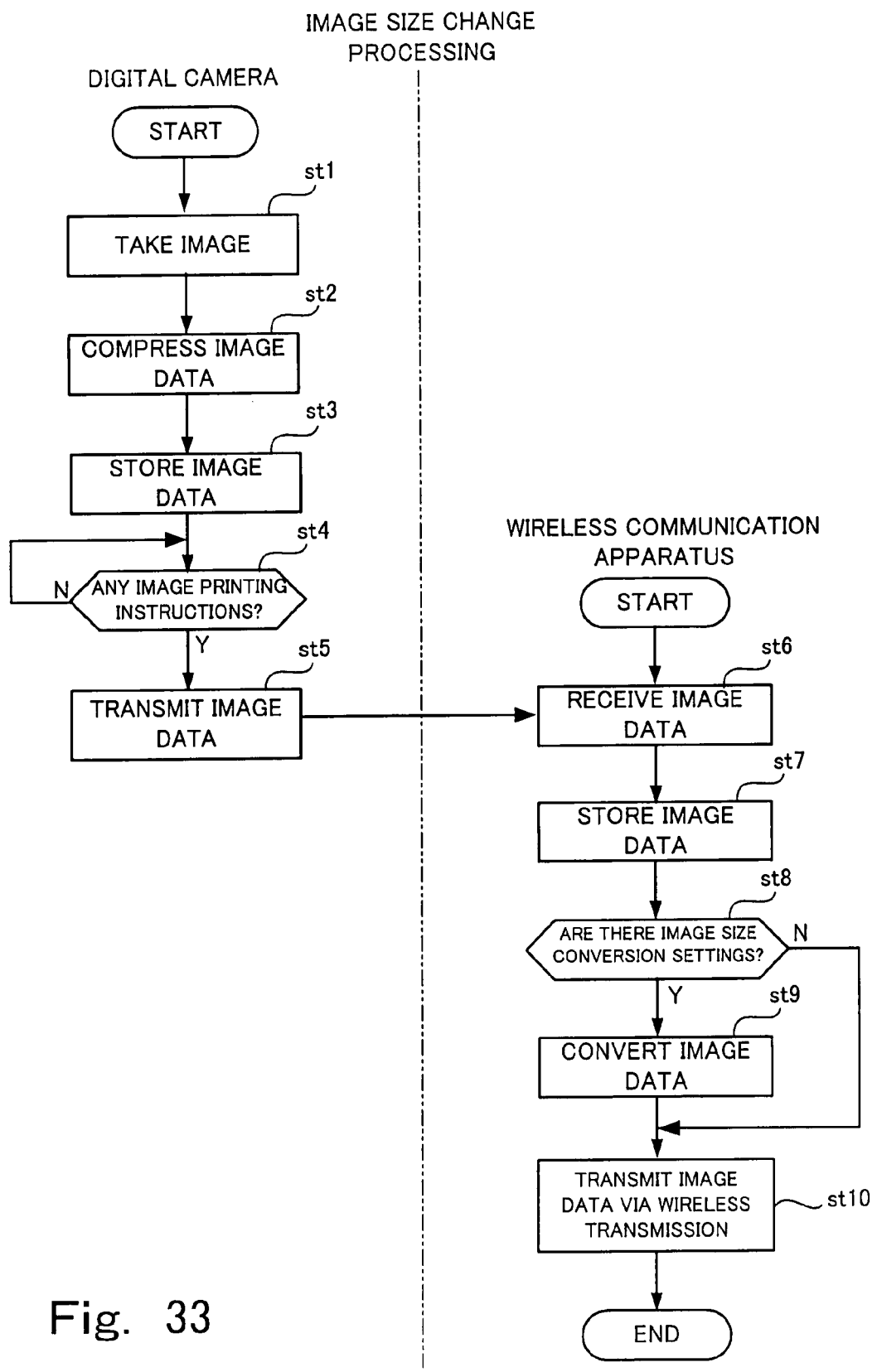
FIG. 33 is a flowchart of image size conversion processing of the wireless communication apparatus.

Next, image size conversion processing according to the present invention will be described. An outline of this processing is shown in FIG. 33 as a flowchart. With the digital camera 3, when image taking is performed (st1), the operation control section 348 compresses the image data at the compression/expansion section 328 (st2), and stores the data into the recording medium 326 (st3). Then, during the communication mode or the playback mode, in the event that the user issues an instruction on an operating screen displayed on the display 38 using the operating key 37 to print image data (st4), at the digital camera 3, the operation control section 348 transmits image data using the inter-apparatus communication processing section 327 to the wireless communication apparatus 4 (st5). At the wireless communication apparatus 4, the image data is received by the inter-apparatus communication processing section 434, and the operation control section 436 temporarily stores the image data into the image data storage section 432 (st7). Next, the operation control section 436 reads out conversion settings retained in advance at the conversion setting retaining section 433, and identifies the presence of appropriate conversion settings for the image data (st8).

TABLE 1

Example of conversion settings according to paper size

| Paper size | Size after conversion |
|---|---|
| ID photo | 1M size |
| L print | 2M size |
| 2L print | 4M size |
| Other | Unconverted |

TABLE 2

Example of conversion settings according to printer type

| Printer type | Size after conversion |
|---|---|
| Portable printer | 2M size |
| Dye sublimation printer | 4M size |
| Inkjet printer | Unconverted |

Table 1 shows an example of conversion settings according to paper size, while Table 2 shows an example of conversion settings according to printer type. When performing the settings of Table 1, a screen such as that shown in FIG. 34 is displayed on the display 38 during the setting mode of the digital camera 3.

Figure 34:
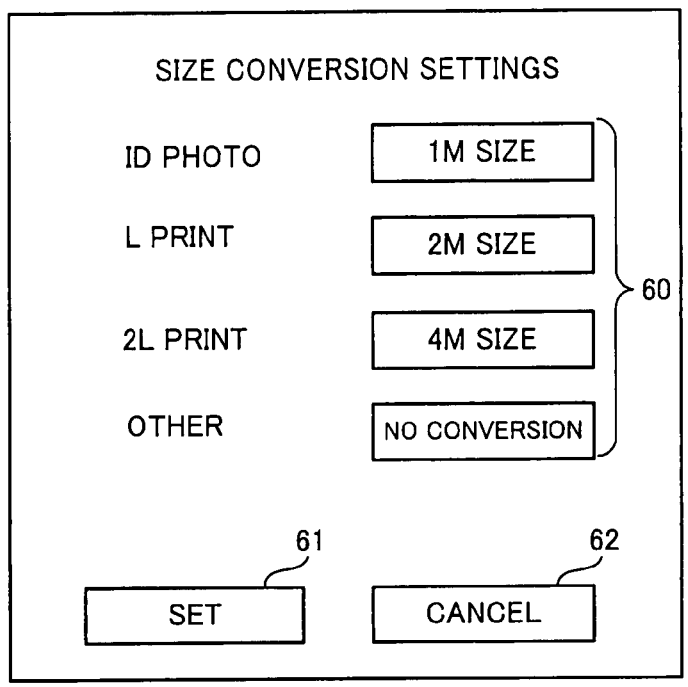
FIG. 34 is a setting screen for image size conversion displayed on a display of an image pickup apparatus.

FIG. 34 is a setting screen for image size conversion, which is displayed on the display 38 of the digital camera 3.

On the screen shown in FIG. 34, in a conversion size setting field 60, an arbitrary paper size maybe selected to determine settings by operating the operating key 37, and the settings may be finalized by using a setting button 61. In addition, settings may be cancelled by using a cancel button 62. The operation control section 436 outputs relevant image data to the image size conversion section 439, and notifies an appropriate conversion size according to the settings. After size conversion of the image data is performed by the image size conversion section 439 (st9), the image data is outputted by the operation control section 436 to the wireless communication processing section 437, and then outputted from the antenna 411 to the printer 50 (st10). In the event that no conversion settings correspond to the image data to be transmitted via wireless communication, such wireless transmission will be performed without size conversion (st8, st10).

Incidentally, assuming that the latest USB standard is to be applied, the inter-apparatus communication speed between the digital camera 3 and the wireless communication apparatus 4 is around 480 Mbps. Meanwhile, assuming that the latest Bluetooth standard (registered trademark: a standard for short-range wireless communication) is to be applied, the wireless communication speed from the wireless communication apparatus 4 to an external device such as the printer 50 is around 2 Mbps. Since the two communication speeds are significantly different, unless a large-capacity memory is provided as the image data storage section 432 of the wireless communication apparatus 4, there is a risk that a situation may arise in which image data is fully written into the image data storage section 432. In addition, even if the image data storage section 432 is not full, retention of a large volume of image data will result in low communication efficiency. However, by reducing the size of image data as described above, processing time of wireless transmission may be reduced, and the amount of data retained in the image data storage section 432 of the wireless communication apparatus 4 may be reduced, thereby enabling improvement of communication efficiency.

While the conversion setting retaining section 433 and the image size conversion section 439 have been provided at the wireless communication apparatus 4 in the above arrangement, the sections may also be provided at the digital camera 3. In this case, since size conversion of image data will be performed in advance at the digital camera 3, the amount of data transmitted from the inter-apparatus communication processing section 327 to the wireless communication apparatus 4 will be reduced, thereby achieving the same advantages as described earlier.

Additionally, while the wireless communication apparatus 4 is arranged to be mounted on the digital camera 3 in the present embodiment, since the contents of the present invention is not specific to camera functions, the present invention may be applied to image retaining apparatuses other than a digital camera such as a dedicated server for image storage. Furthermore, while an example in which image data is transmitted from the wireless communication apparatus 4 to the printer 50 is provided for the present embodiment, the transmission destination of the image data is not limited to a printer, and the transmission destination may be other external devices such as a personal computer connected to a wireless LAN (local area network) device.

Next, a description will be provided on wireless communication operations and memory operations of the wireless communication apparatus 4 selected by the operation type selection section 412 according to the present invention. Firstly, when a memory operation is selected via the operation type selection section 412, the wireless communication processing section 437 will not be operated since no wireless communication will be performed. The operation control section 436 then performs memory management on image data already stored in the image data storage section 432 so as to prevent overwriting.

Figure 35:
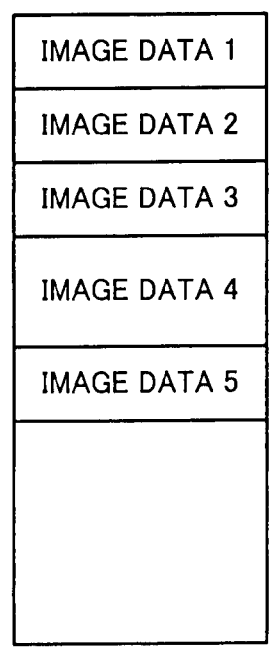
FIG. 35 shows a memory space configuration of the wireless communication apparatus (when not full)
Figure 36:
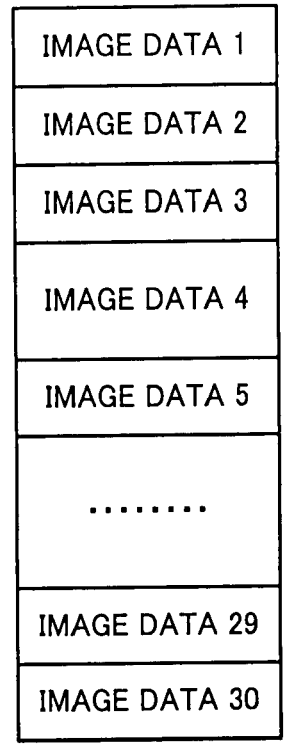
FIG. 36 shows a memory space configuration of the wireless communication apparatus (when full)

FIG. 35 shows a memory space configuration of the wireless communication apparatus (when not full), while FIG. 36 shows a memory space configuration of the wireless communication apparatus (when full).

More specifically, when image data is stored in a memory space of the image data storage section 432 as shown in FIG. 35, in the event that the memory space becomes full of image data as shown in FIG. 36, further writing is prevented until any of the image data is deleted and sufficient capacity for writing is secured. This enables the wireless communication apparatus 4 to operate as a dedicated memory for image data storage.

On the other hand, when a wireless communication operation is selected by the operation type selection section 412, the wireless communication processing section 437 performs communication with an external device such as the printer 50 or the like, as already described. In addition, the operation control section 436 performs memory management on image data already stored in the image data storage section 432 so as to allow overwriting.

Figure 37:
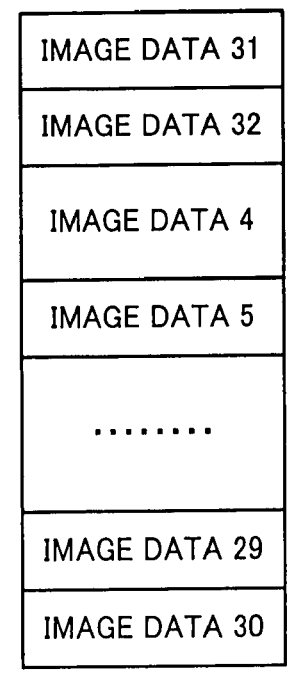
FIG. 37 shows a memory space configuration of the wireless communication apparatus (during overwriting).

FIG. 37 shows a memory space configuration of the wireless communication apparatus (during overwriting).

More specifically, when the memory space of the image data storage section 432 is full with image data 1 to 30 that are stored in an ascending order of their respective numbers as shown in FIG. 36, in the event that image data 31 and 32 are further received from the digital camera, image data 31 and 32 are stored by overwriting the same onto image data 1 to 3, which are the oldest written image data in the memory space as shown in FIG. 37. In other words, older written image data will preferentially be targeted for overwriting. This enables the image data storage section 432 to perform operations corresponding to a transmission buffer in wireless communication operations, and allows the wireless communication apparatus 4 to operate as a wireless communicator.

As seen, usability may be improved by using the wireless communication apparatus in uses other than communication as a storage memory for image data.

In the event that the memory space becomes full with image data during a memory operation, a notification of the full memory space may be transmitted to the digital camera 3 via the inter-apparatus communication processing section 434, and the operation control section 348 that received the notification may display the same on the display.

Furthermore, while the operation type selection section 412 has been provided on the wireless communication apparatus 4, the operation type selection section 412 may alternatively be provided on the digital camera 3. However, in this case, selection information must be transmitted upon activation of the digital camera 3 to the wireless communication apparatus 4 via the inter-apparatus communication processing section 327.

In the present embodiment, since the wireless communication apparatus 4 is equipped with the wireless communication apparatus-side battery 443, the wireless communication apparatus 4 may be equipped with a function to independently perform wireless communication when separated from the digital camera 3. In this case, in order to enable the user to perform wireless communication operations, the wireless communication apparatus 4 must be equipped with operation keys and a display or the like in the same manner as the digital camera 3. Additionally, functions for transmitting image data selected by the user on the display to an external device and for receiving image data from an external device must be provided at the operation control section 436. Furthermore, a power switch will also be required to enable power-on/off operations to be in dependently performed. As for the operation type selection section 412, wireless communication may not be performed unless a wireless communication operation is selected.

As seen, usability may be improved by providing the wireless communication apparatus 4 with a function that enables wireless communication to be independently performed when separated from the digital camera 3.

In addition, while the present embodiment has been configured so that the digital camera 3 and the wireless communication apparatus 4 is connected by an interface based on the USB standard to gain the advantages of high versatility, other standards may be used. Furthermore, nonstandard interfaces may also be used. Moreover, while the wireless communication apparatus 4 is configured to be mounted onto the digital camera 3, image pickup apparatuses other than a digital camera may be applied.

What is claimed is:

1. A mobile device having a transmitting section that transmits data, the device comprising:
   a power operating section that performs power-on/off operations;
   a power supply control section that supplies power to each section of the mobile device, including the transmitting section, which are activated when power is supplied, in response to a power-on operation by the power operating section, and cuts off supply of power to each section in response to a power-off operation by the power operating section,
   wherein when data is being transmitted by the transmitting section, the power supply control section causes the transmitting section to continue data transmission by continuously supplying power even when a power-off operation is received from the power operating section, and cuts off the power supply to the transmitting section upon completion of data transmission by the transmitting section; and
   a transmission result notification section that detects, in response to a power-on operation of the power operating section, whether data transmission was performed by the transmitting section after the previous power-off operation of the power operating section, detects whether the data transmission is completed or not when the data transmission was performed, and notifies a user of a transmission result.

2. The mobile device according to claim 1, wherein the power supply control section cuts off power supply to each section including the transmitting section in the event that data transmission is not performed by the transmitting section when a power-off operation by the power operating section is received.

3. The mobile device according to claim 1, further comprising a state transition notification section that notifies a user of a transition to a transmission-during-power-off mode in which the transmitting section performs data transmission after a power-off operation by the power operating section.

4. The mobile device according to claim 1, further comprising a transmission completion notification section that notifies a user of a completion of data transmission in a transmission-during-power-off mode in which the transmitting section performs data transmission after a power-off operation by the power operating section.

5. The mobile device according to claim 1, wherein the mobile device is a device having a function of a digital camera that generates image data of a subject image in response to image taking operations.

6. The mobile device according to claim 5, wherein the transmitting section transmits all unsent image data in data transmission.

7. A mobile device having a transmitting section that transmits data, the device comprising:
   a power operating section that performs power-on/off operations; and
   a power supply control section that supplies power to each section of the mobile device, including the transmitting section, which are activated when power is supplied, in response to a power-on operation by the power operating section, and cuts off supply of power to each section in response to a power-off operation by the power operating section,
   wherein the transmitting section commences data transmission in response to a power-off operation of the power operating section,
   the power supply control section causes the transmitting section to perform data transmission by supplying power thereto when receiving a power-off operation from the power operating section, and cuts off the power supply to the transmitting section upon completion of data transmission by the transmitting section; and
   a transmission result notification section that detects, in response to a power-on operation of the power operating section, whether data transmission was performed by the transmitting section after the previous power-off operation of the power operating section, detects whether the data transmission is completed or not when the data transmission was performed, and notifies a user of a transmission result.

8. The mobile device according to claim 7, wherein the power supply control section maintains a cut-off state of power to the transmitting section in the event that no unsent data exists when a power-off operation by the power operating section is received.

9. The mobile device according to claim 7, further comprising a state transition notification section that notifies a user of a transition to a transmission-during-power-off mode in which the transmitting section performs data transmission after a power-off operation by the power operating section.

10. The mobile device according to claim 7, further comprising a transmission completion notification section that notifies a user of a completion of data transmission in a transmission-during-power-off mode in which the transmitting section performs data transmission after a power-off operation by the power operating section.

11. The mobile device according to claim 7, wherein the mobile device is a device having a function of a digital camera that generates image data of a subject image in response to image taking operations.

12. A mobile device having a transmitting section that transmits data, the device comprising:
- a power operating section that performs power-on/off operations; and
- a power supply control section that supplies power to each section of the mobile device, including the transmitting section, which are activated when power is supplied, in response to a power-on operation by the power operating section, and cuts off supply of power to each section in response to a power-off operation by the power operating section,
- wherein when data is being transmitted by the transmitting section, the power supply control section causes the transmitting section to continue data transmission by continuously supplying power even when a power-off operation is received from the power operating section, and cuts off the power supply to the transmitting section upon completion of data transmission by the transmitting section,
- wherein the transmitting section transmits data via wireless,
- wherein the transmitting section comprises an antenna having a fixed antenna primary radiating element and a movable antenna secondary element that controls at least a directivity of communication by the antenna primary radiating element, and
the mobile device comprises an antenna drive section that moves the antenna secondary element so that the directivity of the communication by the antenna primary radiating element spreads in a direction that approximates omni-directivity, in response to a transition to the transmission-during-power-off mode in which the transmitting section performs data transmission after a power-off operation of the power operating section.

13. The mobile device according to claim 12, further comprising a power saving control section that performs power saving while maintaining receiver sensitivity in the transmission-during-power-off mode in which the transmitting section performs data transmission after a power-off operation of the power operating section.

14. The mobile device according to claim 13, wherein the power-saving control section performs power saving by spreading a transmission and reception interval of probe signals used for searching communication destinations.

15. The mobile device according to claim 13, wherein the power-saving control section performs power saving by limiting frequencies used for communication.

16. The mobile device according to claim 12, further comprising a communication function limiting section that limits a communication function of the transmitting section, wherein the communication function limiting section lifts limitations on the communication function of the transmitting section in response to a transition to the transmission-during-power-off mode in which the transmitting section performs data transmission after a power-off operation of the power operating section.

17. A mobile device having a transmitting section that transmits data, the device comprising:
- a power operating section that performs power-on/off operations; and
- a power supply control section that supplies power to each section of the mobile device, including the transmitting section, which are activated when power is supplied, in response to a power-on operation by the power operating section, and cuts off supply of power to each section in response to a power-off operation by the power operating section,
- wherein when data is being transmitted by the transmitting section, the power supply control section causes the transmitting section to continue data transmission by continuously supplying power even when a power-off operation is received from the power operating section, and cuts off the power supply to the transmitting section upon completion of data transmission by the transmitting section, further comprising a lens unit having an image taking optical system and an image pickup device to generate image data, and a main body unit, to which the lens unit is detachably mounted, that receives image data from the lens unit to perform image processing,
- wherein the power operating section interprets a detachment of the lens unit from the main body unit as a power-off operation,
- wherein the transmitting section suspends data transmission in response to a mounting of the lens unit when performing data transmission in a state in which the lens unit is detached from the main body unit.

* * * * *